US011971238B2

(12) United States Patent
Czarnecki et al.

(10) Patent No.: US 11,971,238 B2
(45) Date of Patent: Apr. 30, 2024

(54) DETERMINATION OF ROUND COUNT BY HALL SWITCH ENCODING

(71) Applicant: Magpul Industries Corp., Austin, TX (US)

(72) Inventors: Erin Czarnecki, Broomfield, CO (US); Jeffrey Holt, Austin, TX (US); Michael Leighton, Broomfield, CO (US); Donald McKelvey, Erie, CO (US); Steven Dunbar, Lafayette, CO (US); Timothy Eric Roberts, Broomfield, CO (US); Nicholas Kielsmeier, Denver, CO (US); Eric Chow, Highlands Ranch, CO (US); Kyle Kellner, Austin, TX (US); Joe Deppong, Austin, CO (US)

(73) Assignee: Magpul Industries Corp., Austin, TX (US)

( * ) Notice: Subject to any disclaimer, the term of this patent is extended or adjusted under 35 U.S.C. 154(b) by 137 days.

(21) Appl. No.: 17/157,680

(22) Filed: Jan. 25, 2021

(65) Prior Publication Data

US 2021/0215446 A1  Jul. 15, 2021

Related U.S. Application Data

(63) Continuation-in-part of application No. 16/635,692, filed as application No. PCT/US2019/057460 on Oct. 22, 2019, now Pat. No. 11,015,890.

(Continued)

(51) Int. Cl.
*F41A 9/62* (2006.01)
*G05B 15/02* (2006.01)

(52) U.S. Cl.
CPC ............... *F41A 9/62* (2013.01); *G05B 15/02* (2013.01)

(58) Field of Classification Search
CPC ............ F41A 9/62; F41A 19/01; G05B 15/02
(Continued)

(56) References Cited

U.S. PATENT DOCUMENTS

| 579,943 A | 3/1897 | Kempshall |
|---|---|---|
| 2,303,479 A | 12/1942 | Lesnick |

(Continued)

FOREIGN PATENT DOCUMENTS

| CN | 101126615 A | 2/2008 |
|---|---|---|
| CN | 108534595 A | 9/2018 |

(Continued)

OTHER PUBLICATIONS

International Preliminary Report on Patentability Chapter I received for International PCT Application Serial No. PCT/US2019/057460 dated May 6, 2021, 9 pages.

(Continued)

*Primary Examiner* — Joshua E Freeman
*Assistant Examiner* — Benjamin S Gomberg
(74) *Attorney, Agent, or Firm* — Neugeboren O'Dowd PC

(57) ABSTRACT

This disclosure describes systems, methods, and apparatus for detecting and displaying a number of rounds in a firearm magazine comprising a maximum number of N rounds. The magazine may comprise a follower, magnets on the follower, and <N magnetic switches arranged along a path of the magnets when the follower moves along a length of the magazine, the switches configured to activate based on a magnetic field exceeding a threshold, and a first antenna arranged on an inside of the magazine and parallel to a firing direction of the firearm, and configured to wirelessly transmit a round count indication to a second antenna on the firearm, the round count indication based on the round count (Continued)

data, the second antenna affixed to an inside of a magazine well of the firearm and mostly overlapping with the first antenna.

20 Claims, 48 Drawing Sheets

Related U.S. Application Data

(60) Provisional application No. 63/003,041, filed on Mar. 31, 2020, provisional application No. 62/965,761, filed on Jan. 24, 2020, provisional application No. 62/748,602, filed on Oct. 22, 2018.

(58) Field of Classification Search
USPC .......................................................... 42/1.02
See application file for complete search history.

(56) References Cited

U.S. PATENT DOCUMENTS

| | | | |
|---|---|---|---|
| 4,001,961 A | 1/1977 | Johnson et al. | |
| 5,005,307 A * | 4/1991 | Horne | F41A 9/62 42/1.02 |
| 5,052,138 A * | 10/1991 | Crain | F41A 9/62 42/1.02 |
| 5,142,805 A | 9/1992 | Horne et al. | |
| 5,303,495 A * | 4/1994 | Harthcock | F41A 17/06 42/70.11 |
| 5,406,730 A | 4/1995 | Sayre | |
| 5,425,299 A | 6/1995 | Teetzel | |
| 5,519,953 A | 5/1996 | Villani | |
| 5,566,486 A | 10/1996 | Brinkley | |
| 5,592,769 A | 1/1997 | Villani | |
| 5,642,581 A * | 7/1997 | Herold | F41A 9/62 42/1.02 |
| 5,735,070 A | 4/1998 | Vasquez et al. | |
| 5,799,432 A * | 9/1998 | Wright, Sr | F41A 9/62 42/1.02 |
| 5,826,360 A * | 10/1998 | Herold | F41A 9/62 42/1.02 |
| 5,918,304 A | 6/1999 | Gartz | |
| 6,062,208 A | 5/2000 | Seefeldt et al. | |
| 6,094,850 A * | 8/2000 | Villani | F41A 9/62 42/49.01 |
| 6,321,478 B1 | 11/2001 | Klebes | |
| 6,360,468 B1 | 3/2002 | Constant et al. | |
| 6,397,508 B1 | 6/2002 | Constant et al. | |
| 6,412,207 B1 | 7/2002 | Crye et al. | |
| 6,421,944 B1 | 7/2002 | Klebes et al. | |
| 6,430,860 B1 | 8/2002 | Constant et al. | |
| 6,493,977 B1 | 12/2002 | Liebenberg et al. | |
| 6,643,968 B2 | 11/2003 | Glock | |
| 6,785,996 B2 | 9/2004 | Danner et al. | |
| 6,802,147 B2 | 10/2004 | Haefeli et al. | |
| 6,898,890 B2 | 5/2005 | Gaber | |
| RE38,794 E | 9/2005 | Danner | |
| 6,941,693 B2 | 9/2005 | Rice et al. | |
| 7,143,644 B2 | 12/2006 | Johnson et al. | |
| 7,158,167 B1 | 1/2007 | Yerazunis et al. | |
| 7,234,260 B2 | 6/2007 | Acarreta | |
| 7,356,956 B2 | 4/2008 | Schinazi et al. | |
| 7,509,766 B2 | 3/2009 | Vasquez | |
| 7,661,217 B2 | 2/2010 | Pikielny | |
| 7,669,356 B2 | 3/2010 | Joannes et al. | |
| 7,716,863 B1 | 5/2010 | Johnson et al. | |
| 7,730,654 B2 * | 6/2010 | Kim | F41A 9/70 42/1.02 |
| 7,802,391 B2 | 9/2010 | Quinn et al. | |
| 7,810,273 B2 | 10/2010 | Koch et al. | |
| 7,926,219 B2 | 4/2011 | Reimer | |
| 7,927,102 B2 | 4/2011 | Jones et al. | |
| 8,009,060 B2 | 8/2011 | Kramer et al. | |
| 8,019,278 B2 | 9/2011 | Baraz et al. | |
| 8,046,946 B2 | 11/2011 | Packer et al. | |
| 8,166,698 B2 | 5/2012 | Raviv et al. | |
| 8,176,667 B2 | 5/2012 | Kamal et al. | |
| 8,186,086 B2 * | 5/2012 | Gur-Ari | F41A 9/62 42/1.01 |
| 8,191,297 B2 * | 6/2012 | Gwillim, Jr. | F41A 9/65 42/50 |
| 8,196,331 B2 | 6/2012 | Chen et al. | |
| 8,215,044 B2 | 7/2012 | Arbouw | |
| 8,223,019 B2 | 7/2012 | August et al. | |
| 8,290,747 B2 | 10/2012 | Hamel et al. | |
| 8,325,041 B2 | 12/2012 | August et al. | |
| 8,339,257 B2 | 12/2012 | Cazanas et al. | |
| 8,387,295 B2 | 3/2013 | Glock | |
| 8,418,388 B2 | 4/2013 | Ferrarini et al. | |
| 8,459,552 B2 | 6/2013 | Arbouw | |
| 8,464,451 B2 * | 6/2013 | McRae | F41A 9/53 42/122 |
| 8,464,452 B2 | 6/2013 | Harper | |
| 8,485,085 B2 | 7/2013 | Goree et al. | |
| 8,528,244 B2 | 9/2013 | Scallie et al. | |
| 8,571,815 B2 | 10/2013 | Bar-David et al. | |
| 8,601,733 B2 | 12/2013 | Gabay et al. | |
| 8,656,820 B1 | 2/2014 | Kertis, Jr. et al. | |
| 8,660,491 B1 | 2/2014 | Tran | |
| 8,720,092 B2 | 5/2014 | Gussalli Beretta et al. | |
| 8,733,006 B2 | 5/2014 | Williams et al. | |
| 8,733,007 B2 | 5/2014 | Hatfield | |
| 8,738,330 B1 | 5/2014 | DiMartino et al. | |
| 8,770,978 B2 | 7/2014 | Botten | |
| 8,793,294 B2 | 7/2014 | Steele, Jr. | |
| 8,826,575 B2 | 9/2014 | Ufer et al. | |
| 8,827,706 B2 * | 9/2014 | Hogan, Jr. | G09B 19/00 434/18 |
| 8,850,730 B2 | 10/2014 | Clark et al. | |
| 8,875,433 B2 * | 11/2014 | Beckman | F41A 9/83 89/1.4 |
| 8,936,193 B2 | 1/2015 | McHale et al. | |
| 8,973,294 B2 | 3/2015 | Delgado Acarreta | |
| 8,991,084 B2 * | 3/2015 | Williams | F41A 9/62 42/50 |
| 9,068,785 B2 | 6/2015 | Ball | |
| 9,212,857 B2 | 12/2015 | Loreman | |
| 9,273,918 B2 | 3/2016 | Amit et al. | |
| 9,293,927 B2 | 3/2016 | Soar | |
| 9,303,937 B2 * | 4/2016 | Acarreta | F41A 9/62 |
| 9,316,461 B1 | 4/2016 | Gwillim, Jr. | |
| 9,331,495 B2 | 5/2016 | Soar | |
| 9,335,109 B2 | 5/2016 | Bensayan et al. | |
| 9,397,726 B2 | 7/2016 | Dobyns | |
| 9,435,594 B2 | 9/2016 | Davison et al. | |
| 9,435,598 B2 | 9/2016 | Seckman | |
| 9,472,971 B2 | 10/2016 | Soar | |
| 9,530,555 B2 | 12/2016 | Teggatz et al. | |
| 9,557,130 B2 | 1/2017 | Shneorson et al. | |
| 9,612,068 B2 | 4/2017 | Burden | |
| 9,658,012 B2 | 5/2017 | Stewart et al. | |
| 9,677,852 B2 | 6/2017 | Tikochinski | |
| 9,759,505 B2 | 9/2017 | Al Abdouli et al. | |
| 9,784,511 B2 * | 10/2017 | Faughn | F41A 9/62 |
| 9,784,513 B2 | 10/2017 | Zimmer | |
| 9,797,667 B2 | 10/2017 | Demierre et al. | |
| 9,811,079 B2 | 11/2017 | Theiss | |
| 9,835,395 B2 | 12/2017 | Ruby et al. | |
| 9,857,131 B1 | 1/2018 | Rose | |
| 9,866,039 B2 | 1/2018 | Adolf et al. | |
| 10,175,016 B2 | 1/2019 | Keys | |
| 10,197,349 B2 | 2/2019 | Delgado Acarreta et al. | |
| 10,317,160 B2 | 6/2019 | Righi et al. | |
| 10,323,894 B2 | 6/2019 | Imbriano et al. | |
| 10,359,246 B2 | 7/2019 | Faughn | |
| 10,459,678 B2 | 10/2019 | Samo | |
| 10,476,160 B2 | 11/2019 | Leem | H01Q 1/38 |
| 10,557,676 B2 * | 2/2020 | Masarik | G01D 5/12 |
| 10,584,929 B2 | 3/2020 | Masarik et al. | |
| 10,619,958 B2 | 4/2020 | Masarik et al. | |
| 10,727,592 B2 * | 7/2020 | Leem | H04B 5/00 |
| 10,845,142 B2 | 11/2020 | Flood | |
| 11,015,890 B2 | 5/2021 | Czarnecki et al. | |

(56) References Cited

U.S. PATENT DOCUMENTS

| | | | |
|---|---|---|---|
| 11,519,692 B2* | 12/2022 | Thomele | F41G 1/065 |
| 11,768,047 B2* | 9/2023 | Canty | H04N 5/28 |
| | | | 348/211.4 |
| 2003/0195046 A1 | 10/2003 | Bartsch | |
| 2006/0042142 A1 | 3/2006 | Sinha | |
| 2007/0000483 A1 | 1/2007 | Tsurumoto | |
| 2008/0028660 A1 | 2/2008 | Gussalli Beretta | |
| 2008/0127538 A1 | 6/2008 | Barrett | |
| 2008/0131848 A1 | 6/2008 | Wilson et al. | |
| 2008/0276517 A1* | 11/2008 | Delgado Acarreta | F41A 9/62 |
| | | | 42/1.02 |
| 2009/0084015 A1 | 4/2009 | Compton et al. | |
| 2009/0255160 A1 | 10/2009 | Summers | |
| 2010/0031808 A1 | 2/2010 | Whitlow et al. | |
| 2010/0258101 A1 | 10/2010 | Campo et al. | |
| 2010/0281725 A1* | 11/2010 | Arbouw | F41A 9/62 |
| | | | 342/357.51 |
| 2010/0299985 A1 | 12/2010 | Delgado Acarreta | |
| 2011/0078936 A1 | 4/2011 | Gates | |
| 2011/0252682 A1 | 10/2011 | Delgado Acarreta | |
| 2011/0308125 A1* | 12/2011 | Gabay | F41A 9/62 |
| | | | 42/1.02 |
| 2012/0131828 A1 | 5/2012 | August et al. | |
| 2012/0152103 A1 | 6/2012 | Testa et al. | |
| 2012/0167423 A1* | 7/2012 | Kindt | G01G 19/52 |
| | | | 177/25.17 |
| 2013/0108991 A1 | 5/2013 | Walls | |
| 2013/0125438 A1 | 5/2013 | Delgado Acarreta | |
| 2013/0180143 A1 | 7/2013 | Delgado Acarreta | |
| 2013/0219762 A1 | 8/2013 | Delgado Acarreta | |
| 2014/0210406 A1* | 7/2014 | Na | H02J 50/80 |
| | | | 320/108 |
| 2014/0311003 A1 | 10/2014 | Loreman | |
| 2015/0075047 A1 | 3/2015 | August et al. | |
| 2015/0077296 A1* | 3/2015 | An | H01Q 7/00 |
| | | | 320/108 |
| 2015/0267981 A1* | 9/2015 | Faughn | F41A 9/62 |
| | | | 42/1.02 |
| 2015/0369553 A1 | 12/2015 | Stussak | |
| 2015/0369559 A1 | 12/2015 | Del Rosario | |
| 2015/0377572 A1* | 12/2015 | Darragjati | F41A 9/65 |
| | | | 42/50 |
| 2015/0381239 A1* | 12/2015 | Shostak | H01Q 1/243 |
| | | | 343/720 |
| 2016/0069629 A1 | 3/2016 | Seckman | |
| 2016/0169602 A1 | 6/2016 | Demierre et al. | |
| 2016/0169608 A1 | 6/2016 | Schulz et al. | |
| 2016/0172876 A1 | 6/2016 | Stewart et al. | |
| 2016/0195351 A1 | 7/2016 | Burden | |
| 2016/0305740 A1 | 10/2016 | O'Donnell et al. | |
| 2016/0334177 A1 | 11/2016 | Green | |
| 2017/0040105 A1* | 2/2017 | Peralta | H01F 38/14 |
| 2017/0051993 A1* | 2/2017 | Imbriano | F41A 19/01 |
| 2017/0155269 A1 | 6/2017 | Swift | |
| 2017/0176139 A1 | 6/2017 | Zhang et al. | |
| 2017/0227310 A1 | 8/2017 | Gorza et al. | |
| 2017/0336160 A1* | 11/2017 | Walther | F41A 9/62 |
| 2018/0128563 A1* | 5/2018 | Righi | F41A 9/62 |
| 2018/0172377 A1 | 6/2018 | Keys | |
| 2018/0196628 A1 | 7/2018 | Samo | |
| 2018/0299217 A1 | 10/2018 | Hedeen et al. | |
| 2019/0170463 A1 | 6/2019 | Walther et al. | |
| 2020/0355450 A1 | 11/2020 | Masarik et al. | |
| 2021/0010769 A1 | 1/2021 | Czarnecki et al. | |
| 2021/0254916 A1 | 8/2021 | Czarnecki et al. | |
| 2023/0332853 A1* | 10/2023 | Cline | F41A 9/62 |

FOREIGN PATENT DOCUMENTS

| | | |
|---|---|---|
| DE | 3911804 C2 | 7/1993 |
| DE | 4022038 C2 | 3/1999 |
| DE | 102010054245 A1 | 6/2012 |
| GB | 2182424 A | 5/1997 |
| GB | 2397128 A | 7/2004 |
| GB | 2528472 A | 1/2016 |
| GB | 2560744 A | 9/2018 |
| JP | H1089894 A | 4/1998 |
| JP | 2002277193 A | 9/2002 |
| JP | 2008064406 A | 3/2008 |
| JP | 2008175526 A | 7/2008 |
| JP | 4298615 B2 | 7/2009 |
| JP | 4395357 B2 | 1/2010 |
| JP | 4594334 B2 | 12/2010 |
| JP | 4923749 B2 | 4/2012 |
| JP | 4923750 B2 | 4/2012 |
| JP | 4996963 B2 | 8/2012 |
| JP | 2012215373 A | 11/2012 |
| JP | 2013130373 A | 7/2013 |
| KR | 100914270 B1 | 8/2009 |
| KR | 20110035058 A | 4/2011 |
| KR | 20140046853 A | 4/2014 |
| RU | 2360208 C2 | 6/2009 |
| TW | 201700945 A | 1/2017 |
| WO | 2009151713 A3 | 12/2009 |
| WO | 2013104807 A1 | 7/2013 |
| WO | 2014184875 A1 | 11/2014 |
| WO | 2016181234 A1 | 11/2016 |
| WO | 2016181235 A1 | 11/2016 |
| WO | 2016187713 A1 | 12/2016 |
| WO | 2017/001054 A1 | 1/2017 |
| WO | 2017031426 A1 | 2/2017 |
| WO | 2019/173791 A1 | 9/2019 |
| WO | 2020/086598 A1 | 4/2020 |

OTHER PUBLICATIONS

Notice of Allowance received for U.S. Appl. No. 16/635,692 dated Feb. 17, 2021, 70 pages.

Office Action received for Taiwanese Patent Application Serial No. 110102748 dated Jun. 20, 2022, 12 pages.

Requirement for Restriction received for U.S. Appl. No. 16/635,692 dated Nov. 19, 2020, 17 pages.

Young, Lee, "International Search Report and Written Opinion Regarding International Application No. PCT/US2019/57460", dated Jan. 17, 2020, p. 10, Published in: US.

Griffinmods, "Review: Aliens Ammo Counter! From Blasterparts—AKA the Most Awesome Accessory Ever!", Nov. 23, 2013, p. 2, Publisher: Retrieved from https://www.youtube.com/watch?v=N7U3xAo6obE on May 22, 2020.

Rade Technologias S.L., "Ammocontrol Digital Counter", "Known to exist as early as Dec. 29, 2020", p. 1, Publisher: Retrieved from https://web.archive.org/web/20141229064416/http://www.radetec.com:80/index.php?id=40 on May 25, 2020.

Rade Technologias S.L., "Ammocontrol Digital Counter for 1911", 2013, p. 1, Publisher: Retrieved from https://www.radetec.com/portfolio-item/20-video-ammocontrol-digital-counter-for-1911-assembly/ downloaded on May 25, 2020.

Semiconductor Componens Industries, "AND9209/D Chameleon Technology Enables Low-Cost Battery Free Wireless Sensors", Apr. 2016, p. 4, No. Rev. 3, Publisher: Semiconductor Components Industries, LLC.

Zur et al., "Application of Mechanical Springs as Inductive Position Sensors", "AMA Conferences 2013", 2013, p. 3, Publisher: Retrieved from https://www.ama-science.org/proceedings/getFile/ZGH5AN==.

Garcia-Diego et al., "Array of Hall Effect Sensors for Linear Positioning of a Magnet Independently of Its Strength Variation. A Case Study: Monitoring Milk Yield During Milking in Goats", "Sensors", 2013, pp. 8000-8012, vol. 2013, No. 13, Publisher: Retrieved from http://www.mdpi.com:8080/1424-8220/13/6/8000/pdf.

Michael Ciuffo, "Bullet Counter 2.0", Mar. 24, 2011, p. 2, Publisher: retrieved from https://www.youtube.com/watch?v=cnx9yT5py8E on May 25, 2020.

Clevertec, "Introducing Clevertec", Known to exist as early as May 20, 2020, p. 6, Publisher: Retrieved from https://www.cleverteckip.com.

Cobalt Kinetics, "Aliens Meets Coablat Kinetics, Shot 2017, CK Smart Display—TFB", Known to exist as early May 8, 2020, p. 4, Publisher: Retrieved from https://www.cobaltkinetics.com/tag/ammo-round-counter.

(56) References Cited

OTHER PUBLICATIONS

Frenzel, Louis E., "A Dozen Top Applications for Mesh Networks", Sep. 14, 2005, p. 13, Publisher: Retrieved from https://www.electronicdesign.com/markets/energy/article/21750433/a-dozen-top-applications-for-mesh-networks.

Farsens, "Battery Free RFID Sensors", Known to exist as early May 8, 2020, p. 8, Publisher: Retrieved from www.farsens.com/en/products/battery-free-rfid-sensors/.

Browne, Jack, "Harvesting Energy From RF Sources", Dec. 30, 2016, p. 2, Publisher: Retrieved from https://www.mwrf.com/home/whitepaper/21847914/harvesting-energy-from-rf-sources-pdf-download.

Kasemsadeh, Ben, "Inductive Sensing: How to Sense Spring Compression", Jul. 13, 2015, p. 2, Publisher: Retrieved from https://e2e.ti.com/blogs_/b/analogwire/archive/2015/07/13/inductive-sensing-how-to-sense-spring-compression.

Lage Manufacturing, LLC, "Lage Manufacturing Max 41A Real Aliens Pulse Rifle", Jan. 26, 2014, p. 2, Publisher: Retrieved from https://www.youtube.com/watch?v=XT90YzPIhVE on May 25, 2020.

Evanczuk, Stephen, "Low-Frequency RFIC Solutions for Tire-Pressure-Monitoring Systems", Mar. 29, 2012, p. 7, Publisher: Retrieved from https://www.digikey.com/en/articles/low-frequency-rfic-solutions-for-tire-pressure-monitoring-systems.

Magcount LLC, "Magcount Ammunition Counting Technology Demonstration", Oct. 13, 2010, p. 2, Publisher: Retrieved from https://www.youtube.com/watch?v=6YWYs0bvt6Q on May 25, 2020.

Meprolight USA, "Mepro Foresight", Known to exist as early May 8, 2020, p. 3, Publisher: Retrieved from https://www.digikey.com/en/articles/low-frequency-rfic-solutions-for-tire-pressure-monitoring-systems.

Tactical Life, "Meprolight Foresight Optic Will Soon Feature On-Screen Shot Counter", Dec. 3, 2019, p. 3, Publisher: Retrieved from https://www.tactical-life.com/gear/optics/meprolight-foresight-app/.

D4rk354b3r, "Full-Auto Nerf Rayven", Apr. 22, 2013, p. 2, Publisher: Retrieved from https://www.youtube.com/watch?v=44IWL_NJOQ8 on May 25, 2020.

Alanson Sample, "NFC-WISP: a Wirelessly Powered Bistable Display Tag", Known to exist as early May 8, 2020, p. 3, Publisher: Retrieved from www.alansonsample.com/research/NFC-WISP.html.

Sarah Clark, "NFC Goes Green: New ST Chips Use Energy Harvesting to", Nov. 8, 2011, p. 4, Publisher: Retrieved from https://www.nfcw.com/2011/11/08/311126/nfc-goes-green-new-st-chips-use-energy-harvesting-to-replace-the-need-for-batteries/.

Radetec, "RISC", Known to exist as early May 8, 2020, p. 8, Publisher: Retrieved from https://www.radetecusa.com/risc/.

SHOTPM, "Weapon Shot Counter (WSC) for Preventative Maintenance and Inventory Management Using Radio—Requency Identification (RFID) Active Technology", Known to exist as early May 8, 2020, p. 4, Publisher: Retrieved from https://www.shotpm.com.

Radetec, "Smart Slide", Known to exist as early May 8, 2020, p. 8, Publisher: Retrieved from https://www.adetecusa.com/smart-slide/.

www.st.com, "ST25DV-Discovery", Known to exist as early May 8, 2020, p. 5, Publisher: Retrieved from https://www.st.com/content/st_com/en/products/evaluation-tools/product-evaluation-tools/st25-nfc-rfid-eval-tools/st25-nfc-rfid-eval-boa.

Lourens et al., "Tire Pressure Monitoring (TPM) System", 2009, p. 12, Publisher: Microchip Technology Inc., Published in: US.

Zhang et al., "A Review of Passive RFID Tag Antenna-Based Sensors and Systems for Structural Health Monitoring Applications", "Sensors", Jan. 29, 2017, p. 33, vol. 2017, No. 17.

Ex Parte Quayle Action received for U.S. Appl. No. 17/238,411 dated Jan. 23, 2023, 47 pages.

Notice of Allowance received for U.S. Appl. No. 17/238,411 dated Mar. 17, 2023, 7 pages.

TIPO, Office Action issued in Taiwan Patent Application No. 112127598, Mar. 5, 2024, 14 pages.

\* cited by examiner

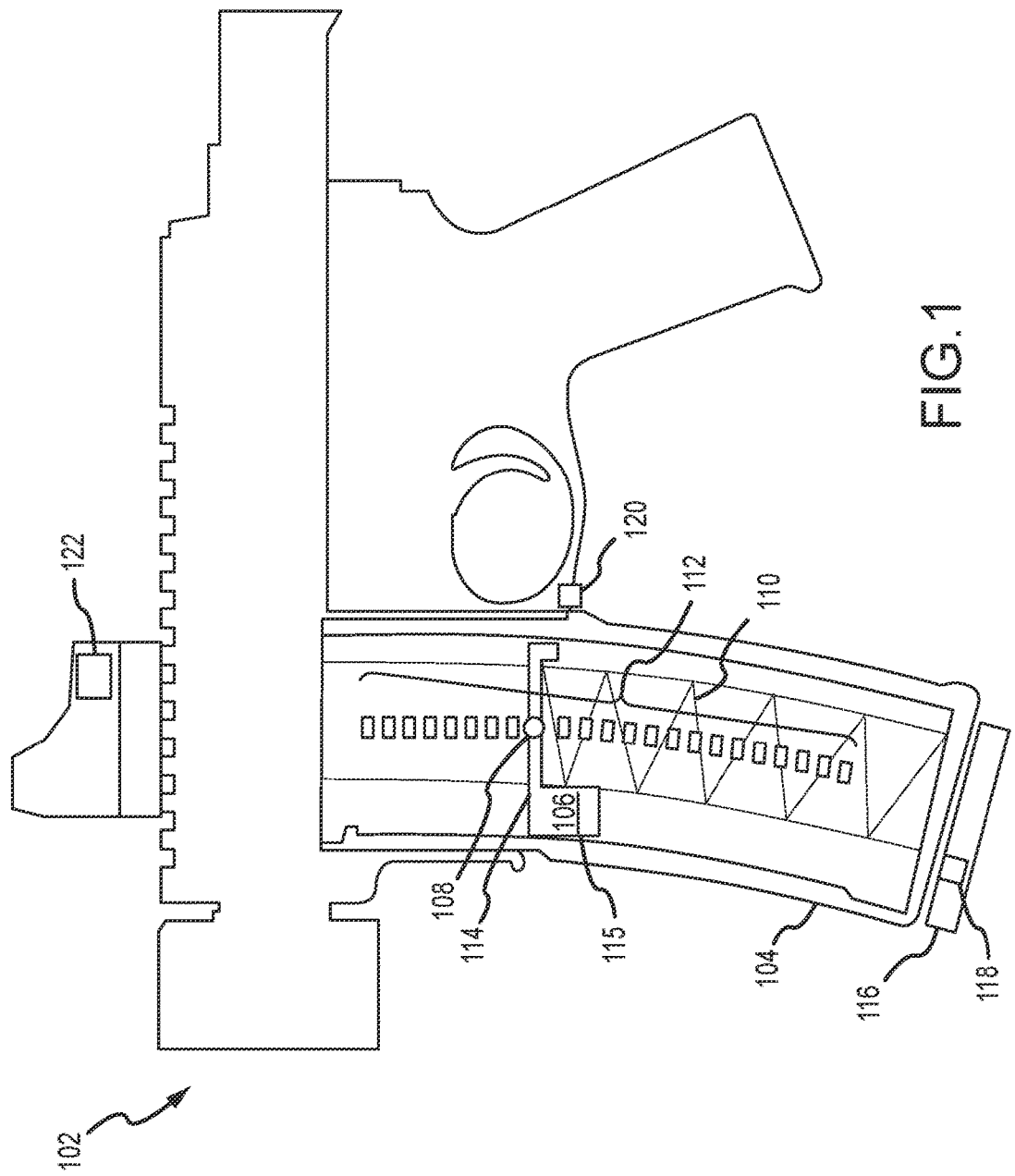

DETERMINATION OF ROUND COUNT BY HALL SWITCH ENCODING

CLAIM OF PRIORITY UNDER 35 U.S.C. § 119

The present application for Patent claims priority to U.S. Provisional Application No. 63/003,041 entitled "Determination of Round Count by Hall Switch Encoding" and filed Mar. 31, 2020, and claims priority to U.S. Provisional Application No. 62/965,761 entitled "Determination of Round Count by Hall Switch Encoding" and filed Jan. 24, 2020. The present application for Patent is also a Continuation-in-Part of U.S. patent application Ser. No. 16/635,692 entitled "Determination of Round Count by Hall Switch Encoding" and filed Jan. 31, 2020, which is a National Stage application under 35 U.S.C. 371 of PCT Application No. PCT/US2019/057460 entitled "Determination of Round Count by Hall Switch Encoding," filed Oct. 22, 2019, and published as WO2020/086598, which claims priority to U.S. Provisional Application No. 62/748,602 entitled "Determination of Round Count by Hall Switch Encoding" and filed, Oct. 22, 2018. All of the above applications are assigned to the assignee hereof and are hereby expressly incorporated by reference herein.

FIELD OF THE DISCLOSURE

The present disclosure relates generally to firearms round/ammunition counting. In particular, but not by way of limitation, the present disclosure relates to systems, methods and apparatuses for wirelessly counting a number of rounds remaining in a magazine.

DESCRIPTION OF RELATED ART

U.S. Pat. No. 9,612,068 discloses a magnet (180) that can be coupled to the spring supporting a magazine follower along with a signaling element (145) coupled to the magazine or another portion of the firearm and configured to detect a proximity of the magnet (180). For instance, the signaling element (145) can include a reed switch or Hall effect sensor. The proximity of the magnet (180) is converted by the signaling element (145) to a signal indicative of the ammunition status of the firearm (105). The signaling element (145) can then send a wired or wireless signal to a reporting element (130, 135) to display a remaining round count to the firearm user. There are no sensors within the magazine.

U.S. Pat. No. 9,784,511 discloses a magnet (33) on the follower (38) or compression spring (34) that causes physical displacement of tactile indicators (44) on an outside of the magazine to thereby provide a tactile indication of the follower position within the magazine.

U.S. Pat. No. 8,215,044 discloses a gray encoded ferromagnetic strip arranged along the magazine to indicate a location of the follower and thus round count of a magazine.

International Application No. WO2018172738 discloses a round-counting device for monitoring the number of ammunition rounds contained in a firearm magazine. The system includes a magnet mounted to the follower and a plurality of reed switches arranged in a spaced apart arrangement along a length of the magazine. When the follower is in a given position, adjacent reed switches are activated, and provide a signal indicative of the number of rounds in the magazine.

U.S. Pat. No. 5,303,495 discloses a handgun with a grip that fully-encloses a magazine. The firearm also includes a permanent magnet (92) mounted on a top rung of a magazine spring 93 and a series of Hall effect switches (94) that are surface mounted on a mylar substrate (95) in the hollow handle of the firearm. The number of Hall effect switches (94) is equal to the number of cartridges to be counted and the switches (94) are positioned one cartridge diameter apart at positions where the magnet (92) will be located directly adjacent to a switch 94 as each round is fired. One Hall effect switch (94) at a time is activated. There are no sensors in the magazine.

United States Publication No. 20110252682 discloses receptor means (41) (e.g., Hall effect sensors) in a pistol grip or magazine well of a long firearm that sense a magnetic field strength of a magnet (24) positioned on a cartridge lifter (22). In the case of the long firearm, this disclosure suggests that there is only a need to monitor the last cartridges in the magazine (21), and therefore receptor means (41) are placed in an area adjacent to the upper part of the magazine (21) (i.e., in the magazine well). There are no sensors in the magazine.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a round counting system for a firearm with a detachable magazine, the system comprising: a magazine, a follower, the follower comprising one or more magnets, and the magazine comprising: magnetic switches arranged substantially along a path of the one or more magnets when the follower moves along a length of the magazine, the magnetic switches configured to activate based on a position of the one or more magnets relative to the magnetic switches and a respective magnetic field at the magnetic switches exceeding a threshold; and a first antenna arranged in a region of the magazine that is configured to fit at least partially within a magazine well of the firearm and parallel to a firing direction of the firearm, the first antenna configured to wirelessly transmit at least one of an indication of one or more active magnetic switches of the magnetic switches, round count data, or a round count indication to a second wireless antenna on the firearm, wherein the first antenna wirelessly receives power from the firearm, and wherein the power from the firearm is used to power the magnetic switches; and wherein the second antenna is configured to be affixed to an inside of a magazine well of the firearm and having an area that mostly overlaps with an area of the first antenna.

Another embodiment of the disclosure may be characterized as a method of retrofitting a magazine with a round counting system, the magazine comprising a follower, the method comprising: installing one or more magnets on the follower; arranging <N magnetic switches substantially along a path of the one or more magnets when the follower moves along a length of the magazine, where N is a maximum number of cartridges that can be loaded in the magazine, the magnetic switches configured to activate based on a position of the one or more magnets relative to the <N magnetic switches and a respective magnetic field at the magnetic switches exceeding a threshold; arranging a first antenna in a region of the magazine that is configured to fit at least partially within a magazine well of the firearm and parallel to a firing direction of the firearm, the first antenna configured to wirelessly transmit at least one of an indication of one or more active magnetic switches of the <N magnetic switches, round count data, or a round count indication, to a second antenna on the firearm, wherein the first antenna is arranged such that an area of the first antenna, defined by a height and width, primarily aligns with an area of the second antenna coupled to an inside of a magazine well of the firearm.

Yet another embodiment of the disclosure may be characterized as a method of manufacturing a magazine with a round counting system, the magazine comprising a follower, wherein the follower comprises one or more magnets, the method comprising: arranging <N magnetic switches substantially along a path of the one or more magnets when the follower moves along a length of the magazine, where N is a maximum number of cartridges that can be loaded in the magazine, the magnetic switches configured to activate based on a position of the one or more magnets relative to the <N magnetic switches and a respective magnetic field at the magnetic switches exceeding a threshold; arranging a first antenna in a region of the magazine that is configured to fit at least partially within a magazine well of the firearm, the first antenna configured to wirelessly transmit at least one of an indication of one or more active magnetic switches of the <N magnetic switches, round count data, or a round count indication to a second wireless antenna on the firearm, wherein the first antenna wirelessly receives power from the firearm, and wherein the power from the firearm is used to power the <N magnetic switches, wherein the first antenna is arranged such that an area of the first antenna, defined by a height and width, primarily aligns with an area of the second antenna coupled to an inside of a magazine well of the firearm.

Still another embodiment of the disclosure may be characterized as a non-transitory, tangible computer readable storage medium, encoded with processor readable instructions to perform a method for detecting and displaying a number of cartridges remaining in one or more firearm magazines, each firearm magazine comprising: a follower, the follower comprising one or more magnets, magnetic switches arranged substantially along a path of the one or more magnets when the follower moves along a length of the magazine, the magnetic switches configured to activate based on a respective magnetic field at the magnetic switches exceeding a threshold, the method comprising: assigning one or more unique identifiers to one or more first antennas, wherein each unique identifier is associated with one first antenna; identifying, for each firearm magazine inserted into the magazine well of the firearm, a respective round count indication; registering, for each firearm magazine inserted into the magazine well of the firearm, the respective round count indication and unique identifier assigned to the first antenna of the respective firearm magazine, wherein a second antenna is configured to receive the unique identifier upon insertion of the respective firearm magazine into the magazine well; and displaying respective round count indications for the one or more firearm magazines on a user interface on the firearm, wherein the user interface is selected from the group consisting of: a number displayed on a red dot scope or a targeting display, a frequency of a blinking light; a color of one or more lights; a number displayed on a multi-pixel display; a number of LED lights lit up on an LED display; an audible signal; a fuel gauge indicator, or a bar graph indicator. The user interface may also reside off-firearm, for instance in augmented reality glasses, or a commanders display, to name two non-limiting examples.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 1 is a side view of a firearm receiver and a detachable magazine, illustrating an embodiment of a magnetic sensor-based round counting system.

FIG. 10 also illustrates placement of the battery in the pistol grip of the firearm, according to an alternate embodiment of the disclosure.

DETAILED DESCRIPTION

Figure 2A:
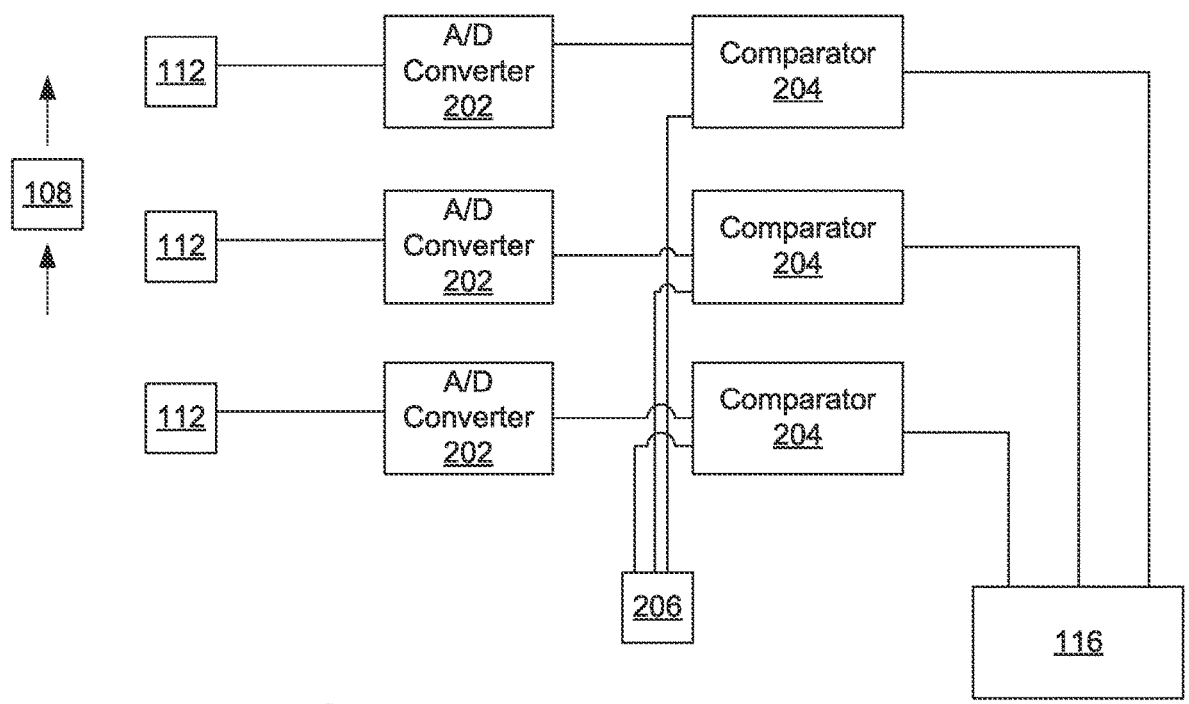
FIGS. 2A and 2B are high-level circuit diagrams of the magnetic sensor-based round counting system illustrating hall effect sensors, analog-digital-converters (ADC), comparators, and magnetic processing circuitry.

Although decades have been spent trying to develop an accurate, durable, low-cost, and reliable round counting system for small arms (this application references early round counting systems dating to as early as 1992), no solution has yet mastered all challenges so as to become commercially viable. For instance, RADETEC (Rade Tecnologias) has developed two primary lines of round counters: one that is part of a pistol grip and uses a magnet on the follower and magnetic field sensors in the pistol grip to estimate distance of the magnet from those sensors and thereby estimate a position of the follower and hence a number of rounds in the magazine; the second is directed to long gun platforms, such as the AR-15, and this system again uses a magnet on the follower, but a magnetic field sensor in the magazine well or receiver to detect a distance between the magnet and the sensors. Both systems rely on analog magnetic field sensors that are prone to low signal to noise ratios and thus erroneous readings. Furthermore, both these systems also use "long distance" magnetic field sensing. Magnetic field strength drops off exponentially with distance (e.g., $r^2$) and thus even small increases in distance have a profound influence on field strength. By locating the magnet inside the magazine, and the sensors outside the magazine, either in the pistol grip or in the receiver, the magnetic field is greatly diminished by the time it reaches the sensors. Additionally, in the case of the long gun version, since sensors are only arranged on the magazine well or receiver, the magnet is even further away for fully loaded and near-fully-loaded magazines. What is more, layers of material (e.g., metal) between the magnet and the sensors can further interfere with and degrade the magnetic field detected at the sensors, and often the thickness of this material is not consistent along a length of the magazine. For instance, in the long gun version, the magazine well does not extend down the entire length of the magazine, meaning that different materials and thicknesses of material are interposed between the magnet and the sensor(s) for different follower positions. All of these factors lead to a system that suffers from high and varying signal to noise ratios and ultimately to inaccurate round counts. From an ease-of-use standpoint, the Radetec technology also requires the user to calibrate the system before use, and such calibration is undesirable.

In some aspects, the current disclosure alleviates some of the problems that have faced the industry unresolved for over thirty years via a combination of some or all of the following: (1) use of Hall effect switches rather than Hall effect sensors; (2) arranging Hall effect switches along a full length of the follower path so that there is consistent signal strength and high signal-to-noise for each cartridge position;

(3) arranging magnetic sensors or switches within the magazine where they are close to the magnet on the follower thereby maximizing magnetic field strength at the magnetic sensors or switches; (4) arranging a flat or 'thin' (e.g., ~2-6 mm thick) Near Field Communication (NFC) antenna within the magazine well; (5) arranging a processor within the magazine to process sensor signals before transmission across the wireless connection; and (6) energy harvesting from a power source, such as a battery, on the firearm through the NFC connection.

(1) Hall Effect Switches

Most systems rely on Hall effect sensors rather than Hall effect switches to detect a magnet in a follower since these more advanced sensors can better determine a position of a magnet when used singularly (e.g., a Hall effect sensor provides an analogue signal proportional to magnetic field strength and hence to distance, whereas a single Hall effect switch provides either a high or low signal as a function of a threshold magnetic field). For the purposes of this disclosure, a "Hall effect switch" is a magnetic switch configured to provide a digital or at least pulsed or square wave output, as compared to a fluctuating or sinusoidal analogue output by a "Hall effect sensor". In some circumstances, Hall effect sensors are susceptible to many of the variables noted above relative to the Radetec platform. Systems using Hall effect sensors often require user calibration due to their susceptibility to such variables. Furthermore, Hall effect sensors may also require an analogue to digital converter (ADC) to process their signals, which may increase the computational complexity of a system using such sensors. The inventors of the current disclosure unexpectedly found that the simpler Hall effect switch, when used in an array having <N magnetic switches (or N/2) (where N=maximum number of cartridges in the magazine), avoids the need for an ADC and calibration and can provide more accurate follower position than an array of Hall effect sensors equal to or greater than the number of cartridge positions in the magazine.

To implement a Hall effect switch array where the number of magnetic switches is <N, a processor may be used to assess the signals from the array and look for two scenarios: (1) where only a single magnetic switch or Hall effect switch is active, the follower is likely closely aligned with that magnetic switch or Hall effect switch; and (2) where two magnetic switches or Hall effect switches are active, the follower is likely roughly between the two magnetic switches. Using these two scenarios, the processor can distinguish between each and every cartridge position, even though <N or N/2 or N/3 or N/4 magnetic or Hall effect switches are used. In some cases, reducing the number of switches may also serve to decrease cost and complexity.

Another advantage of using magnetic or Hall effect switches is that the processor can analyze the switch outputs and determine a number of cartridges without storing any state or other data in memory. Thus, a processor with less or no cache/memory can be implemented in some embodiments. Alternatively, this implementation may allow a processor with cache/memory to optimize use of the cache/memory for round count processing.

(2) Sensors Arranged Along a Full-Length of the Magazine

While Hall effect sensors can be used to estimate distance to a moving magnet using a single sensor, such systems can also introduce errors since each cartridge position must be associated with a unique magnetic field strength. By positioning magnetic-field-sensing sensors along a full length of the magazine, the sensors can be arranged such that each cartridge position can be associated with a consistent magnetic field strength, thereby greatly reducing errors. This also helps to avoid the calibration challenges seen in the prior art.

(3) Sensors within the Magazine

Most existing systems use sensors outside of the magazine as this simplifies manufacturing and design. This also avoids the challenge of having to wirelessly convey data from the magazine to the firearm. In some instances, however, these systems are not accurate enough for practical implementation, which may be overcome by choosing the more complex route of locating sensors within the magazine. For instance, U.S. Pat. No. 9,612,068 vaguely notes that round count information can be wirelessly transmitted to a display, but provides no enabling details surrounding this so-called wireless embodiment. WO2018172738 also vaguely suggests that a wireless chip can be implemented but makes no further discussion regarding details needed to implement this wireless embodiment. Thus, the challenges associated with getting round count data from the magazine to the firearm have still not been addressed in detail in the art. Aspects of the present disclosure relate to achieving more consistent magnetic field strength measurements, for instance, by providing little to no material between the follower's magnet and the magnetic-field-strength sensors. Also, by locating the sensors or switches closer to the follower than the prior art, the strongest magnetic field possible may be picked up, which may also serve to minimize errors.

(4) Antenna within the Magazine Well

In practice, wireless communication between the magazine and the firearm is fraught with a number of challenges neither recognized nor addressed by known systems. For one, most wireless technologies are power hungry. Power requires batteries, which are heavy, and thus power-hungry wireless systems lead toward heavy firearms—something that is not conducive to in-field usage. While there are known low-power wireless protocols, such as near field communication (NFC), these protocols only operate over very short distances and often have difficulty with signals that pass through anything but air (for instance passing through components of a firearm could lead to errors in data transmission). Also, since a firearm is a high tolerance device and designed to fit into the smallest space available, extraneous space for inserting or arranging antennas on a firearm is severely limited. However, the inventors discovered that there are two unused areas of a firearm that are in close proximity, such that they do not require any metal components between them, which turned out to be an ideal location for two interoperable flat NFC antennas. Namely, in the forward part of a magazine where the magazine tapers, there is room in a polymer magazine that can be carved out to fit a flat NFC antenna without compromising the magazine's structural integrity. There is also a depression in the left side of an AR-15 magazine well that does not contact the magazine and is just deep enough (e.g., Depth: 0.0175+/−0.0075 inches (0.44+/−0.19 mm), Width: 1.77 inches (45 mm), Height: 2 inches (50.8 mm)) to fit a thin (e.g., thickness: 0.010 inches (0.25 mm), Height: 1.6 inches (40.64 mm), W: 1.050 inches (26.67 mm)) flat NFC antenna without interfering with magazine insertion and removal. In some cases, the NFC antenna may be a microstrip patch antenna fabricated on a dielectric substrate (e.g., ROGERS RT/DUROID or RO3000 or DiClad series composite/laminate, Gallium Arsenide (GaAs), GaN, epoxy, or any other composite or substrate for use in high frequency applications).

Even after the inventors discovered a solution to getting a low power wireless system into the magazine well that avoided metal interference between the antennas, this solution generated a new problem—how to provide wiring access between the antenna inside the magazine well to a display that is on the outside of the receiver. Again, the high tolerances of a firearm do not leave much if any room to run wiring between these two components. Unexpectedly, the substrate of the flat NFC antenna is flexible, and the inventors recognized that a portion of the NFC circuit board could be flexed around a bottom of the magazine well and then stuck to an outside of the magazine well (e.g., see FIGS. 14, 16, and 17) where a connection to an RF cable could be made, in this way avoiding having to drill/machine any openings in the receiver to provide a wiring path for a traditional cable.

In some embodiments, an antenna can be arranged within the magazine well of a slightly thicker dimensions such as greater than 2 mm, but less than 6 mm or less than 10 mm. In some cases, an antenna can be embedded into a wall of the magazine well, for instance a front wall of the magazine well near the trigger guard. In some instances, an antenna can be built into a portion of the trigger guard adjacent to the magazine well, or partially built into the trigger guard and partially extending into the magazine well as far as tolerances allow.

(5) Processor within Magazine

Another challenge of placing the sensors within the magazine is minimizing the bandwidth requirements of the wireless connection. The prior art uses a processor within or on the firearm (e.g., receiver) to process raw data signals from the one or more sensors. If this same technique were applied to the inventor's Hall effect switch approach, then upwards of thirty separate data streams would be wirelessly passed through the NFC connection. To avoid this burden on the NFC connection, the inventors found that placing a processor on the magazine to process the Hall effect switch signals allowed a single indication of round count to be passed across the NFC connection, thereby greatly reducing the throughput needs of the NFC connection.

(6) Wireless Power Transmission to Magazine

Reducing cost and weight means minimizing the number of batteries needed for the round counting system. Fewer batteries not only reduces cost and complexity, but also logistics and maintenance concerns. Prior art systems have included a battery on the firearm, but typically not for powering any components on the magazine. Where a magazine does draw power, the prior art uses a second on-magazine battery. The inventors have realized a system with a single battery, but also capable of providing power to the magazine. Specifically, the NFC connection can unexpectedly pass both data and power allowing the magazine to upload round count data to the firearm while passing power in the opposite direction, back to the magazine.

As seen, an effective round counting system for firearms with a magazine that is insertable into a magazine well, such as an AR-15 and most semi-automatic long guns, is a complex challenge that requires more than mere design choices. A holistic approach that overcomes a vast set of challenges, was needed. Each inventive discovery often led to a new challenge to be solved, and an inventive balancing of various interests had to be discovered to arrive at a system-level solution. The industry has searched for an effective, reliable, and accurate solution to round counting for over 30 years, with little progress over that time (e.g., U.S. Pat. No. 5,303,495 used a sensor for each cartridge in 1992). Despite this decades-old challenge, no one has yet conceived of a solution as elegant, low power, light weight, accurate, and reliable as the one herein disclosed.

Alternatives

In some cases, reed switches may be a viable alternative to Hall-effect switches. Like Hall-effect switches, reed switches may be examples of electrical switches operated using an applied magnetic field. Reed switches may primarily come in two variants: always on and always off switches. An always on reed switch may disconnect or turn off under the influence of a magnetic field, whereas always off (or closed) reed switches, such as those seen in flip phones or laptops may start flowing current in a magnetic field. In some cases, an always off reed switch may be implemented in a round counting system. For instance, an always off reed switch is activated when a magnet on a follower is adjacent to the reed switch. In such cases, a magnetic processing circuit connected to a plurality of reed switches (e.g., N/2+1) lining the inside of the magazine may identify which of the reed switches has been activated, and from this determine the position of the follower (and the round count). Such an embodiment would enable a lower-power application since reed switches do not need external power to operate.

In some circumstances, capacitive strip encoders may be utilized in a round counting system. Capacitive strip encoders may measure a change in capacitance as a measure of displacement (i.e., linear or rotational) using a high-frequency reference signal. By analyzing the change in capacitance as the follower moves through the magazine, a round count may be determined. In one example, capacitive sensors, such as those seen in digital calipers, may line the inside of the magazine. In some cases, the follower may comprise a circuit board, and a plurality of rectangular notches (or grates) may be engraved onto a metallic strip inside the magazine. In some cases, the circuit board and the grates on the metallic strip may form a grid of capacitors. Further, as the follower moves along the inside of the magazine, the rectangular notches may align and misalign with the circuit board, causing the capacitance to change. In some cases, a processor within the magazine, or the firearm may determine a position of the follower within the magazine (and a round count) based on analyzing this varying capacitance.

In another example, spring inductance may be used to determine a follower position, which may then be used to determine a number of remaining rounds. For instance, as the follower moves and compresses or relaxes the spring, the spring inductance changes. A coil inductance detector, or another device configured to measure an inductance may detect the spring inductance and correlate the spring inductance to a known follower position and hence a number of remaining rounds. Additionally or alternatively, a capacitance value may be measured to determine a follower position. In one example, the follower and magazine floor plate may each comprise a metal plate on their bottom and top sides, respectively. In this way, the plates separated by the air gap may form a capacitor, where air is the dielectric material. In some cases, the capacitance of a capacitor formed by two metal plates with a dielectric material between the two plates (i.e., a parallel plate capacitor) is given by: $C=\varepsilon_0 k A/d$ where $\varepsilon_0=8.854\times10^{-12}$ F/m (permittivity of space), k=relative permittivity of the dielectric material between the plates (1 for free space, approximately 1 for air, >1 for other media), A=area of the plates, d=distance separating the plates. In some embodiments, the capacitance may vary as the distance between the plates of the follower and magazine floor plate varies (i.e., capacitance decreases as the distance increases), since the other factors are constant. In such cases, a capacitance detector or another processor may correlate the capacitance to a known follower position and determine a number of remaining rounds in the magazine.

In some circumstances, Radio Frequency Identification (RFID) tags may be utilized in a round counting system. For instance, a RFID tag may be placed on the follower in order to accurately determine its location within the magazine. In some examples, a RFID reader may be placed on the weapon (e.g., on the magazine well, trigger guard, or elsewhere on the receiver), and the follower's location may be determined based on a time delay of signals received from the RFID tag. In some other cases, unique RFID tags may be embedded within each round of the magazine (e.g., attached to or within each cartridge), and the magazine round counting system may determine the number of rounds expended (or remaining) based on the RFID reader scanning the rounds remaining in the magazine. Thus, the RFID reader may also be used to identify an empty state of the magazine if no RFID tags are identified.

In some embodiments, the processing may be performed on the firearm side, the magazine side, or split between the magazine side and the firearm side. For instance, a processor on the firearm side (herein referred to as a "firearm processor") or the magazine side (herein referred to as a "magazine processor") may be configured to receive an indication of a capacitance of a parallel plate capacitor similar to the one described above. The firearm and/or magazine processor may use this single capacitance reading to first determine a distance between the follower and the floor plate of the magazine, based on which it may determine a number of rounds remaining in the magazine. Similarly, the firearm and/or magazine processor may receive a single inductance reading for the spring coupling the follower to the floor plate of the magazine. Based on the inductance, the processor may determine a distance between the follower and the floor plate, as well as a round count for the magazine. In yet other cases, the firearm and/or magazine processor may identify the active magnetic or Hall effect switches (i.e., switches outputting a positive or high signal based on the magnetic field strength at the switches exceeding the magnetic field threshold) to determine a follower position within the magazine. The follower position may then be used to determine a round count or number of rounds remaining in the magazine.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The following illustrations and detailed descriptions of the various embodiments will help the reader to understand and appreciate the inventive concepts noted above.

FIG. 1 is a side view of a firearm receiver and a detachable magazine, illustrating an embodiment of a magnetic sensor-based round counting system. The firearm 102 can include a magazine 104 having a follower 106, and one or more magnets 108 attached to the follower 106 or a compression spring 110. The magazine 104 can also include an array of magnetic sensors 112 (e.g., magnetic switches, such as Hall effect switches). The array 112 can span an entire height of the magazine 104 or some subset thereof. For instance, if the magnet(s) 108 is arranged at a platform 114 of the follower 106, the follower may have tines 115 that prevent the follower platform 114 from reaching a bottom of the magazine 104 when the magazine 104 is fully loaded. The bottom of the array 112 can be roughly aligned with a position of the magnet(s) 108, or roughly the follower platform 114 height above a bottom of the magazine 104. The array 112 can extend to a top of the magazine 104 or some position below a top of the magazine 104.

When the one or more magnets 108 are within a threshold detection range of one or more of the magnetic sensors 112, those sensors 112 can generate a detection signal and provide this to a magnetic sensor processing circuitry 116. The processing circuitry can compare signals from the sensors 112 to ascertain a position of the follower 106 and convert this position to a number of rounds remaining (or number of rounds expended). The round count can then be passed to transmitter 118, which wirelessly transmits the round count to a wireless receiver 120 and passes the round count to a display device 122. As illustrated, the display device 122 is a digital display affixed to an exterior of a red dot scope, but this is in no way limiting. For instance, the display device 122 can be arranged on the firearm (e.g., a digital display integrated within or affixed to an outside of a scope; a digital display coupled to an outside of the firearm receiver, a digital display arranged on a visible portion of the magazine 104, etc.), but may also be arranged on a user (e.g., in a display of glasses/goggles). The display device 122 can be part of a scope, such as a red dot scope, or iron sight but can also be a display separate from a sights/targeting means. Although the transmitter 118 and the receiver 120 are illustrated as being separated by a few inches, in other embodiments, these can be NFC interfaces and each can be arranged within a few millimeters, for instance with the transmitter just under the magazine well, and the receiver 120 on a portion of the trigger guard closest to a bottom of the magazine well.

A typical magnetic sensor 112 begins to detect the one or more magnets 108 at a distance, and the strength of this detection increases as the one or more magnets 108 get closer to the sensor 112. So, for instance, where each sensor 112 generates a voltage proportional to the magnetic field generated by the one or more magnets 108, this voltage will increase as the one or more magnets 108 approach the sensor 112. When the voltage exceeds a threshold, the processing circuitry 116 can determine that the follower 106 is proximal to the sensor 112 whose voltage exceeds the threshold.

Each sensor 112 can include an analogue to digital converter 202 followed by a digital comparator 204 that compares the digital signal from the digital converter 202 to a reference signal 206 or threshold. Where the digital comparator 204 finds that the signal from the digital converter 202 exceeds the reference signal 206, the detection signal can be generated and passed to the magnetic sensor processing circuitry 116.

Figure 2B:
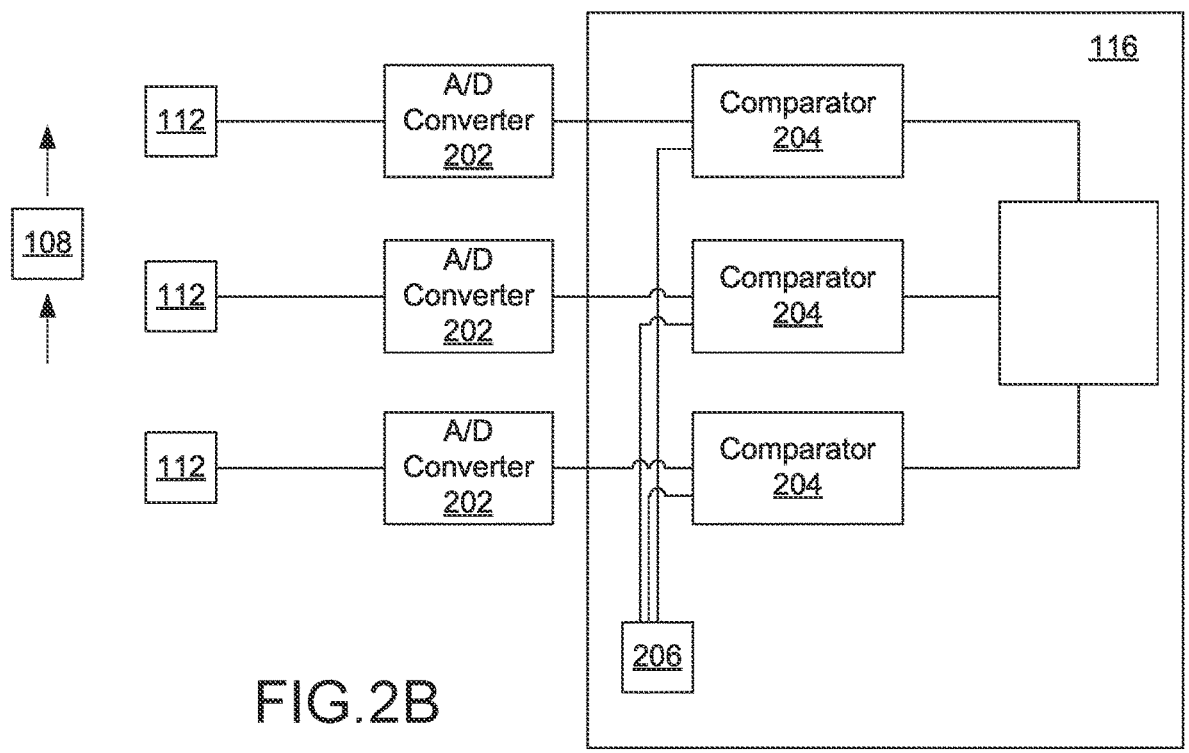

FIG. 2A shows a variation where each sensor 112 includes an analogue to digital converter 202, a reference signal 206, and a comparator 204, where the outputs of the comparators 204 are provided to the processing circuitry 116. FIG. 2B illustrates an embodiment where the outputs of each sensor 112 are converted to digital and then passed to the processing circuitry 116, and where comparators 204 of the processing circuitry 116 determine whether each signal exceeds the reference signal 206.

In an embodiment, the sensors 112, converters 202, comparators 204, and processor 116 can be arranged on a circuit board or other substrate affixed to an inside surface of a magazine. This can either be performed during fabrication of the magazine or during retrofitting of a magazine. For instance, an adhesive can be applied to a backside of the substrate and the substrate can be passed into the inside of the magazine and then pressed against a side of the magazine to secure it to the magazine via the adhesive. In one embodiment, a recess can be formed on an inside surface of the magazine, where the recess may be shaped and sized to allow the substrate to be affixed within the recess (i.e., the recess is slightly larger and/or deeper than the substrate). In some examples, a grinder, drill, or CNC head able to spin around an axis perpendicular to a direction of insertion of the tool head into the magazine can be used to laterally remove material from an inside of the magazine to form the recess.

Alternatively, a recess can be formed on an outer surface of the magazine, and the sensors 112, converters 202, comparators 204, and processor 116 can be arranged on a circuit board or other substrate affixed to a bottom of this recess. A thin cover plate could then be applied over the circuit board to protect it. Alternatively, the circuit board can be overmolded into an outer surface of a polymer magazine (e.g., a low-temperature overmold could be used).

In another embodiment, holes can be drilled through a magazine, where the holes may be spaced a distance from each other. In some embodiments, the sensors 112 can be secured within the holes (toward an inside of each hole). The converters 202, comparators 204, and the processor 116 can be affixed to the outside of the magazine and electrical leads can be formed between each of the sensors and the converters 202, comparators 204, and processor 116. The leads may be formed on an exterior surface of the magazine. Alternatively, a recess may be formed on an outside of the magazine. In such cases, the converters 202, comparators 204, and processor 116 may be affixed within the recess, and a covering layer can be applied atop the converters 202, comparators 204, and processor 116 to affix them to the magazine and protect them from damage. For instance, an epoxy or polymer having a relatively low melting temperature (e.g., lower than a melting point of solder used to make electrical connections to the converters 202, comparators 204, and processor 116), can be liquified and poured over the converters 202, comparators 204, and processor 116 to affix them to the magazine.

Figure 3A:
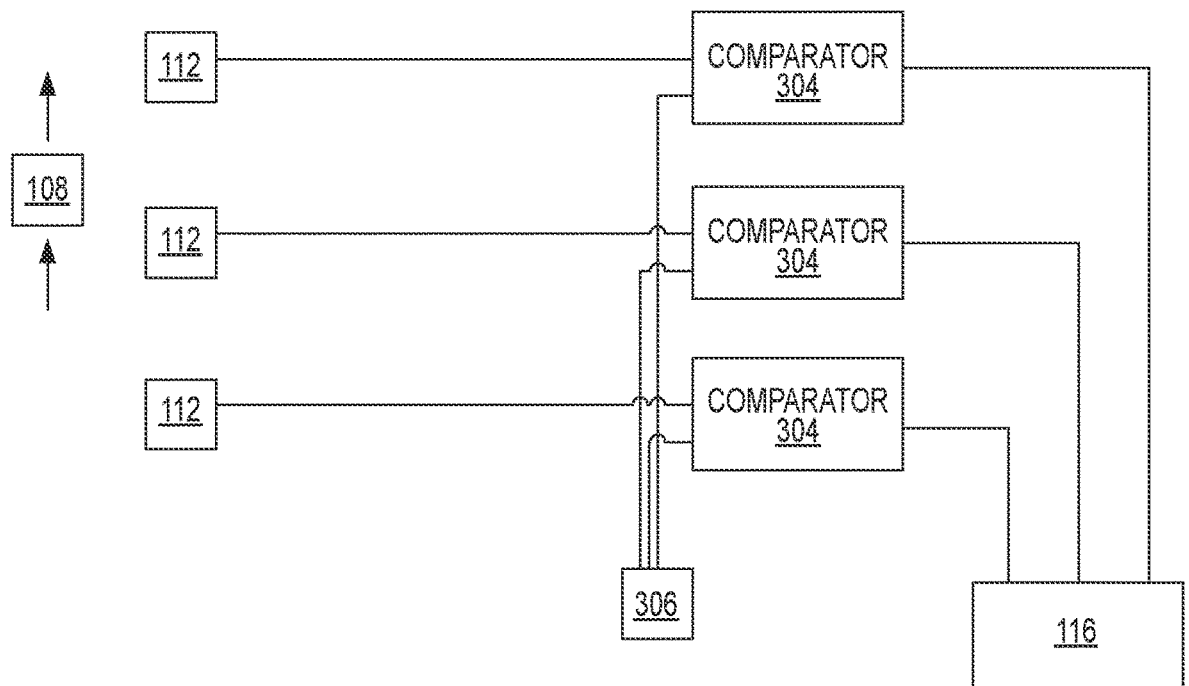
FIGS. 3A and 3B are high-level circuit diagrams of the magnetic sensor-based round counting system illustrating hall effect switches, comparators, and magnetic processing circuitry.
Figure 3B:
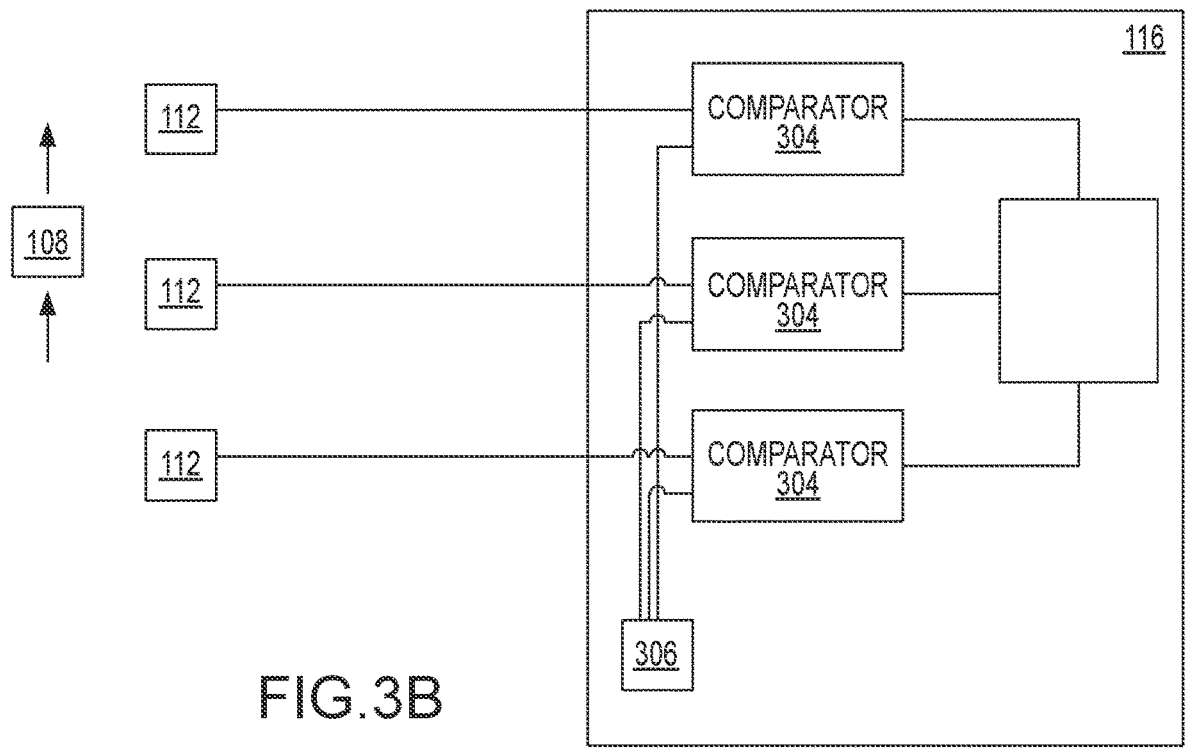

FIG. 3A shows a variation where each sensor 112 can include an analogue comparator 304 that compares the analogue output of the sensor 112 to a reference signal 306. Where the analogue comparator 304 finds that the signal from the sensor 112 exceeds the reference signal 306, the detection signal can be generated and passed to the magnetic sensor processing circuitry 116. FIG. 3B illustrates an embodiment where the outputs of each sensor 112 are passed to the processing circuitry 116, and where comparators 304 of the processing circuitry 116 determine whether each signal exceeds the reference signal 306.

In another embodiment, each sensor 112 can provide its signal in analogue or digital form (where an analogue to digital converter (ADC) is interspersed between the sensor and the magnetic sensor processing circuitry 116) to the magnetic sensor processing circuitry 116. The magnetic sensor processing circuitry 116 can then process these signals and ascertain a position of the follower 106. For instance, the magnetic sensor processing circuitry 116 may be programmed or wired to determine that a sensor 112 having the strongest signal is closest to the follower 106. The magnetic sensor processing circuitry 116 can be hardwired with data, or include data in memory, providing a position of each sensor 112.

In some examples, reference signal 206 may be a threshold with which the output value of the sensor 112 is compared to, prior to being passed to the magnetic sensor processing circuitry. In one embodiment, the threshold value may be slightly lower than an output value of the sensor(s) 112 when the magnet is roughly equidistant from two sensors. For instance, when a magnet is positioned between two adjacent sensors, and the output voltages from the sensors are 2 V and 2.1 V, respectively, the reference signal 206 may be set as <2 V (e.g., 1.95 V). In such cases, output readings from sensors that are further away may not be passed on to the processing circuitry (i.e., if <1.95 volts). In some embodiments, an operational amplifier (or op-amp) may be used as a voltage comparator. The polarity of an op-amp's output circuit depends on the polarity of the difference between the two input voltages (i.e., input voltage and reference voltage), and thus an op-amp may be used as a voltage comparator.

For instance, comparator 204 (or 304) may comprise an op-amp, where a first reference voltage (e.g., reference signal 206) is applied to an inverting input of the op-amp, and the voltage to be compared (i.e., output from sensor's 112) with the reference voltage is applied to the non-inverting input. In some examples, a resistive voltage divider (i.e., for constant reference), or a battery source, diode, or potentiometer (i.e., for variable reference) may be used to set the input reference voltage (i.e., reference signal 206 or 306) for the comparator. The output voltage of the op-amp may depend on the value of the input voltage relative to the reference voltage. For instance, if the input voltage is less than the reference voltage, the output voltage is negative; if equal to reference voltage, output voltage is zero; if greater than reference voltage, output voltage is positive. Thus, only signals exceeding the reference signal 206 (or 306) may be filtered and passed on to circuitry 116 for further processing, based on the polarity and/or magnitude of the output voltage from the comparator or op-amp.

The array 112 can include one sensor for each cartridge, where each sensor 112 is roughly arranged at a position where a cartridge will stop. However, in other embodiments, there may be one sensor 112 for every two cartridges: when a sensor 112 generates a strong signal and the two adjacent sensors 112 generate much weaker signals, then the magnetic sensor processing circuitry 116 may determine that the magnet(s) 108 is closest to the sensor 112 providing the strong signal; and when two adjacent sensors 112 provide roughly the same signal, then the magnetic sensor processing circuitry 116 may determine that the magnet(s) 108 is between those two sensors 112. This arrangement could decrease the number of sensors 112 and thus the complexity and cost of the array 112.

In an embodiment, rather than a distinct magnet(s) 108 being affixed to the follower 106, the follower 106 may be manufactured from a material that incorporates or is made from a magnetic material. For instance, a polymer follower 106 having magnetic threads or particles incorporated into the polymer before molding and/or curing may be utilized in some embodiments. In some other cases, sensors 112 may be positioned on the follower, and magnet(s) 108 may line the inside of the magazine.

In an embodiment, the sensors 112, comparators 304, and processor 116 can be arranged on a circuit board or other substrate affixed to an inside surface of a magazine. This can either be performed during fabrication of the magazine or during retrofitting of a magazine. For instance, an adhesive can be applied to a backside of the substrate and the substrate can be passed into the inside of the magazine and then pressed against a side of the magazine to secure it to the magazine via the adhesive. In one embodiment, a recess just larger and just deeper than the substrate can be formed on an inside surface of the magazine, such that the substrate can be affixed within this recess. For instance, a grinder, drill, or CNC head able to spin around an axis perpendicular to a direction of insertion of the tool head into the magazine can be used to laterally remove material from an inside of the magazine to form the recess.

In another embodiment, holes can be drilled through a magazine at a spaced distance from each other and the sensors 112 can be secured within the holes (toward an inside of each hole). The comparators and the processor can be affixed to the outside of the magazine and electrical leads can be formed between each of the sensors and the comparators and processor. The leads may be formed on an exterior surface of the magazine. Alternatively, a recess may be formed on an outside of the magazine, the comparators and processor may be affixed within the recess, and a covering layer can be applied atop the comparators and processor to affix them to the magazine and protect them from damage. For instance, an epoxy or polymer having a relatively low melting temperature (e.g., lower than a melting point of solder used to make electrical connections to the comparators and processor), can be liquified and poured over the comparators and processor.

Figure 4A:
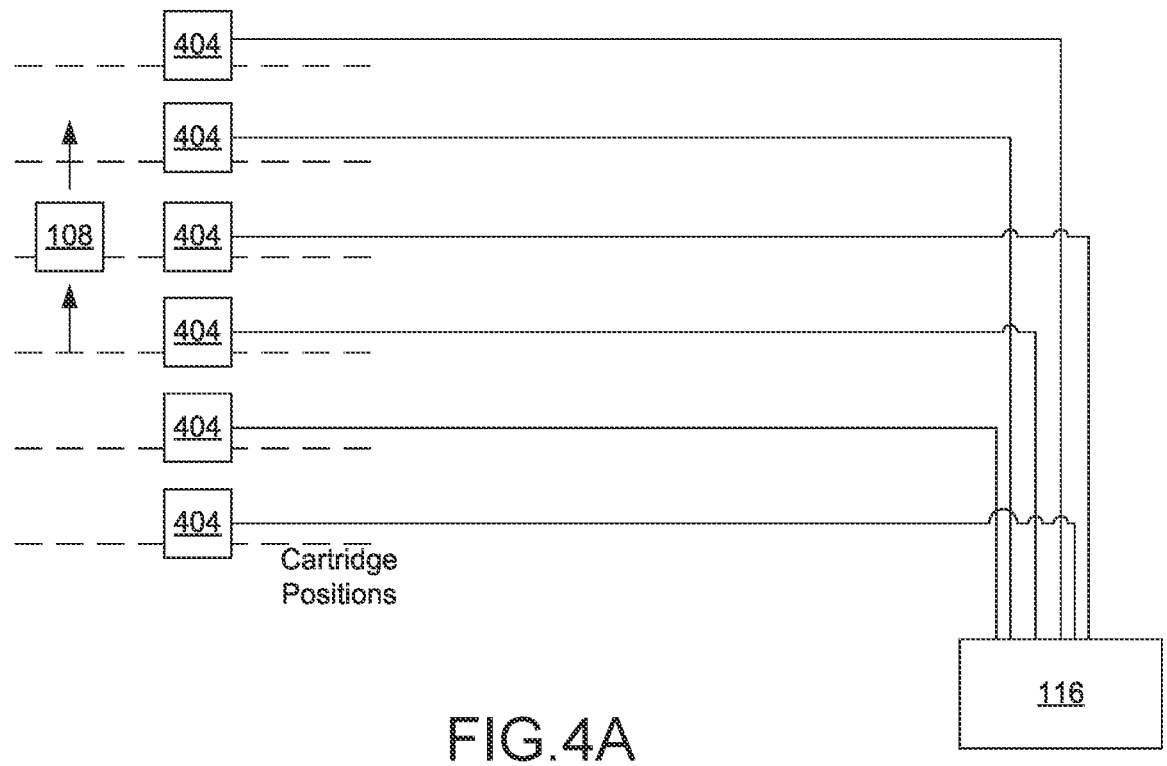
FIG. 4A illustrates a processor receiving signals from Hall effect switches, where there is one Hall effect switch for every cartridge position.

FIG. 4A illustrates a processor 116 receiving signals from Hall effect switches 404, where there is one Hall effect switch 404 for every cartridge position.

Figure 4B:
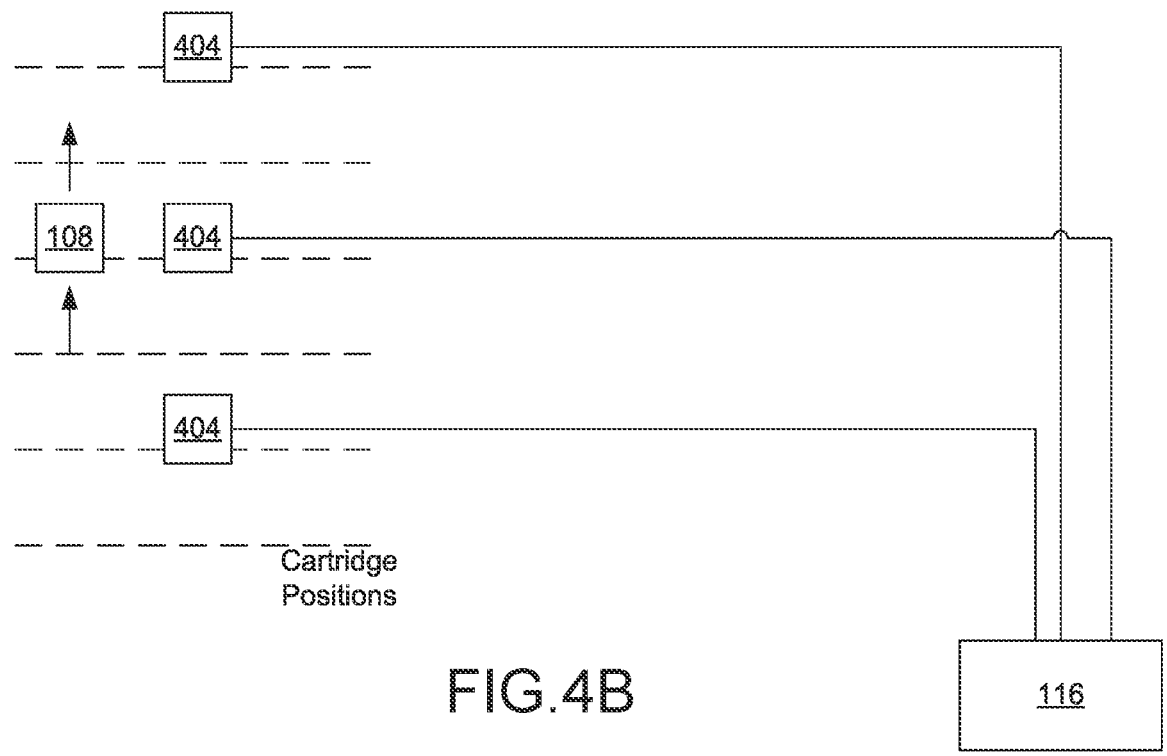
FIG. 4B illustrates a processor receiving signals from Hall effect switches, where there is one Hall effect switch for every two cartridge positions.

FIG. 4B illustrates a processor 116 receiving signals from Hall effect switches 404, where there is one Hall-effect switch 404 for every two cartridge positions and one extra Hall effect switch 404 (not shown), though the extra Hall effect switch 404 is not required. Typically, there is one more state to measure than a number of cartridges—namely the empty magazine state. For instance, for a seven-round magazine, there are seven cartridge positions, plus the empty magazine follower position. Thus, it may be desirable to have 'N+1' Hall effect switches 404, where 'N' is a number of rounds in the magazine. However, in some cases, merely using 'N' Hall effect switches 404 can also achieve the same result. For instance, where no Hall effect switch 404 is activated, the processor 116 may be encoded/programmed to determine that the follower is in the empty position. Thus, 'N' or 'N+1' Hall effect switches 404 can be implemented.

In both FIGS. 4A and 4B the dashed lines represent possible cartridge positions, although these are exemplary only, and in no way limiting. They are roughly aligned with a bottom half of each switch 404. However, in other embodiments, the cartridge positions could be aligned with a middle, top half, bottom, top, or even offset from the switches 404.

Although the magnet(s) 108 is illustrated as not quite aligned with the sensors 112 and Hall effect switches 404, in other embodiments, the magnets(s) 108 could be aligned with the sensors 112 and the Hall effect switches 404.

In an embodiment, the Hall effect switches 404 and processor 116 can be arranged on a circuit board or other substrate affixed to an inside surface of a magazine. This can either be performed during fabrication of the magazine or during retrofitting of a magazine. For instance, an adhesive can be applied to a backside of the substrate and the substrate can be passed into the inside of the magazine and then pressed against a side of the magazine to secure it to the magazine via the adhesive. In one embodiment, a recess can be formed on an inside surface of the magazine just larger and just deeper than the substrate, such that the substrate can be affixed within this recess. For instance, a grinder, drill, or CNC head able to spin around an axis perpendicular to a direction of insertion of the tool head into the magazine can be used to laterally remove material from an inside of the magazine to form the recess.

In another embodiment, holes can be drilled through a magazine at a spaced distance from each other and the switches 404 can be secured within the holes (toward an inside of each hole). The processor 116 can be affixed to the outside of the magazine and electrical leads can be formed between each of the switches 404 and the processor 116. The leads may be formed on an exterior surface of the magazine. Alternatively, a recess may be formed on an outside of the magazine, the processor 116 may be affixed within the recess, and a covering layer can be applied atop the processor 116 to affix them to the magazine and protect them from damage. For instance, an epoxy or polymer having a relatively low melting temperature (e.g., lower than a melting point of solder used to make electrical connections to the processor 116), can be liquified and poured over the processor 116.

Figure 5:
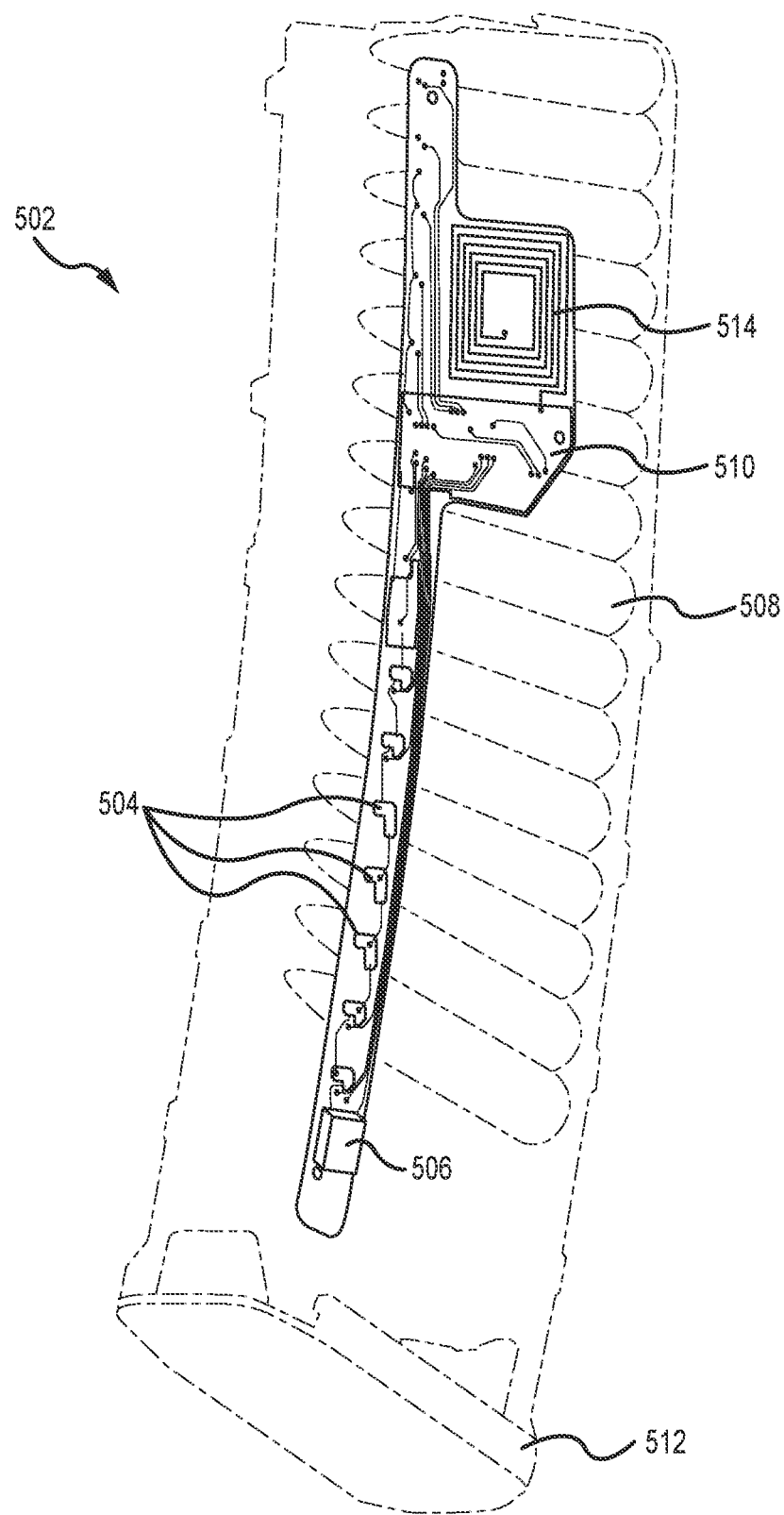
FIG. 5 is an isometric view of the detachable magazine in FIG. 1, illustrating an array of magnetic sensors, circuitry for processing signals from the sensors, cartridges, a follower, a magnet on the follower, and an NFC antenna.

FIG. 5 shows an isometric view of a magazine 502 implementing an array of magnetic sensors/switches 504, circuitry (not visible in FIG. 5, but see e.g., magnetic processing circuit 2702 in FIG. 27, such as a processor) for processing signals from the sensors/switches 504, cartridges 508, a follower, and at least one magnet on the follower. The array of switches 504 can be arranged on an inside or outside of the magazine 502 casing, or even integrated as a layer within the casing material. The circuitry can be arranged on a circuit board 510 (e.g., Printed Circuit Board (PCB)) or circuit assembly that can include electrical traces from the sensor or switch array 504. In the illustrated embodiment, the sensor or switch array 504 is arranged on the same circuit board or assembly as the circuitry, although in other embodiments the switch array 504 can be on one board and the circuitry can be on a second board. Alternatively, the circuitry can be on a circuit board or circuit assembly and the array 504 may not be arranged on a board (e.g., the sensors/switches and electrical traces can be integrated into or printed on the magazine 502 casing itself). In some other cases, the circuitry and the array 504 may be located exterior to the magazine, such as in a pistol grip of the firearm, or any other portion of the firearm. Although the circuitry is on a backside of the board in FIG. 5 (i.e., the side facing into the page), in other embodiments, the circuitry could be on the front side of the board (i.e., the side facing out of the page). The circuitry may provide a round count signal to a wireless transmitter (e.g., an NFC chip) that can wirelessly transmit the round count signal from the magazine 502 to a wireless receiver or transceiver, such as an antenna in a magazine well of the firearm, on the trigger guard, at a base of the magazine well, on an outside of the magazine well, or on another portion of the firearm. The circuitry 506 can be arranged next to the switch array 504, on a side of the magazine 502, or may be arranged proximal to or as part of a floorplate 512 of the magazine 502. In an embodiment, the wireless transmitter can be arranged in a top half or a top third or a top quarter of the magazine. In an embodiment, the wireless transmitter can be arranged in an upper region of the magazine that is configured to be arranged within a magazine well (e.g., see FIGS. 12 and 16A).

The switch array 504 may include one switch for each cartridge (e.g., 30 in a 30-round magazine). The switch array 504 may include one switch for each cartridge and then one additional switch (e.g., 31 in a 30-round magazine). Alternatively, the switch array 504 may include one switch for every two cartridges (e.g., 15 in a 30-round magazine) or one switch for every two cartridges plus one $$\left(\frac{N}{2}+1\right)$$

(e.g., 16 in a 30-round magazine). Whatever the configuration, an additional switch (N+1) can be used to detect the empty state, or processing algorithms can be used to identify the empty state based on an N number of switches, or $$\frac{N}{2}+1$$

number of switches. In some examples, magnetic-field sensing sensors, such as Hall effect sensors, may be utilized in place of the magnetic switches or Hall effect switches.

The circuit board 510 can be affixed to an inside surface of the magazine 502 during manufacturing of the magazine. For instance, a recess can be formed on an inside of the magazine 502 and the circuit board 510 can be adhered within the recess. Optionally a protective layer can then be formed over the circuit board, thin enough or made from a material that does not significantly impede magnetic fields. In some embodiments, the circuit board or assembly may be overmolded by a material used to form the magazine, where the material may be transparent or substantially transparent to magnetic fields, for instance. The layer of material overlying the circuit board may also be selected to be as thin as possible, thereby optimizing magnetic field transmission through this layer. Alternatively, a magazine can be retrofitted to include the circuit board 510. Again, a recess can be formed on an inside of the magazine 502, and the circuit board 510 can be adhered within the recess. However, in another embodiment, the circuit board 510 can be fabricated to be thin enough (e.g., less than 0.5 mm or less than 0.1 mm) to be inserted into the magazine 502 and adhered to an inside surface of the magazine 502, without impeding movement of the magazine's follower. While the spiral NFC antenna 514 is shown on the circuit board 510 within the magazine, in other embodiments, the NFC antenna 514 could be formed on or adhered to an outside surface of the magazine 502 and electrically coupled to the circuit board 510 via one or more electrical vias passing through the magazine 502 wall. Although the NFC antenna 514 will later be described as operating in conjunction with another NFC antenna within a magazine well (e.g., FIG. 14), it should be understood that other NFC antenna configurations and locations can also be implemented (e.g., an NFC antenna on an outside of the magazine well or outside of the receiver).

Figure 6:
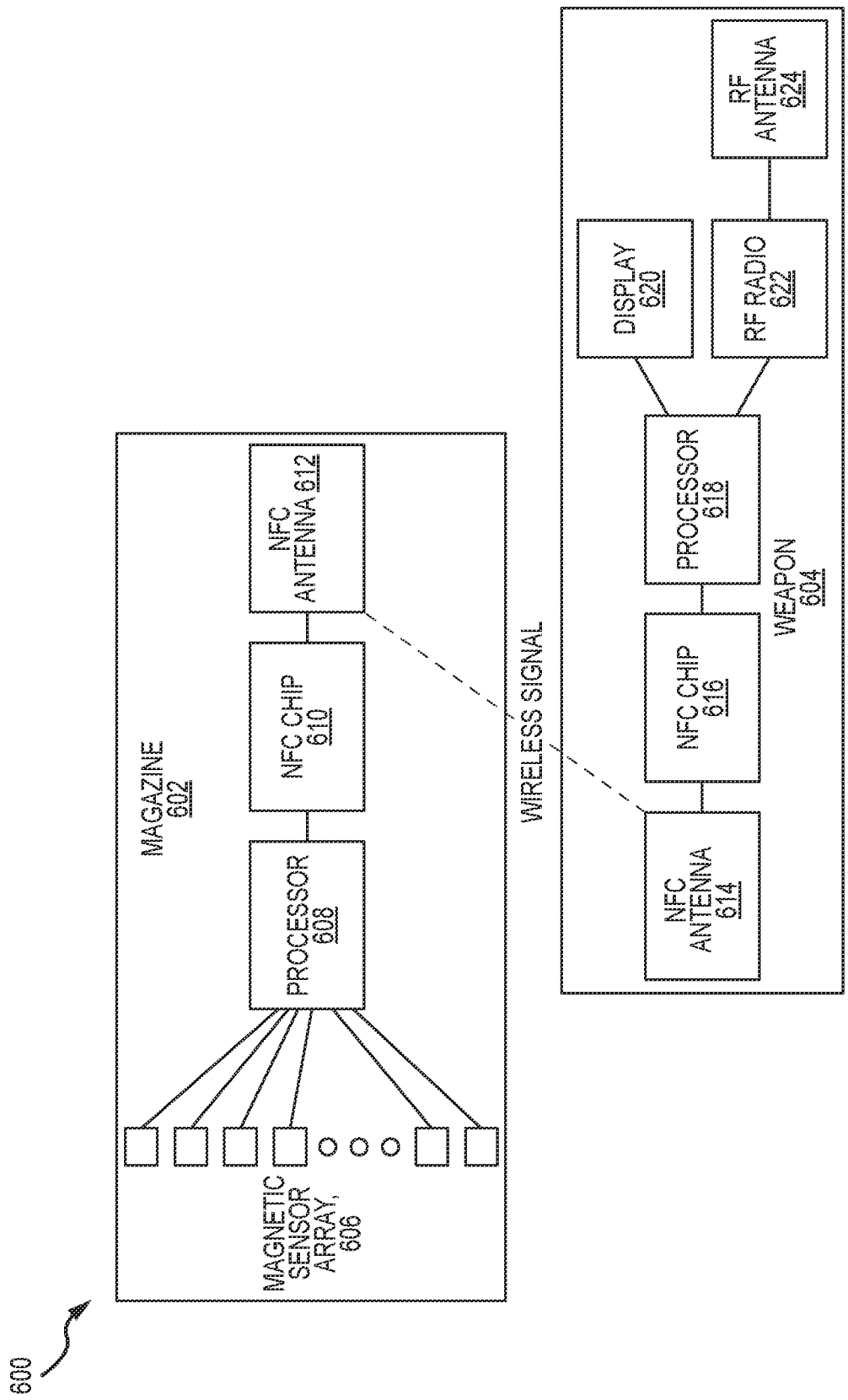
FIG. 6 is a circuit diagram for the magnetic sensor-based round counting system.

FIG. 6 illustrates an embodiment of a circuit diagram for a magnetic sensor-based round counting system 600. The system 600 includes a magazine 602 and a weapon system 604. The magazine can include a follower having one or more magnets, where the magnets travel along a straight or curved path as the number of rounds/cartridges in the magazine changes. An array of magnetic sensors 606 (e.g., magnetic switches, such as Hall effect switches) can be arranged along the path of the one or more magnet's travel, such that the one or more switches 606 closest to the one or more magnets produce a strongest signal. Each switch 606 is in communication with a processor 608 (e.g., microprocessor or microcontroller) that receives the signals from the switches 606 and determines a location of the follower based on these signals. In some cases, a microcontroller is a compact integrated circuit designed to govern a specific operation in an embedded system. A typical microcontroller includes a processor, memory and input/output (I/O) peripherals on a single chip.

The processor 608 then ascertains a number of rounds remaining in the magazine 602 based on the position of the follower and passes this data to a near field communications (NFC) chip 610. In some embodiments, the magnetic switches 606 can have a binary output. For instances, the magnetic switches 606 may be configured to activate based on a position of the one or more magnets relative to the magnetic switches and a respective magnetic field at the magnetic switches 606 exceeding a magnetic field threshold. In some cases, the magnetic switches 606 may output a high (i.e., when magnetic field exceeds threshold) or low signal (i.e., when magnetic field is under a threshold) in the form of a digital or square wave or pulsed output. The NFC chip 610 then communicates with an NFC chip 616 on the weapon 604 via NFC antennas 612 and 614. The NFC chip 616 then processes the wireless signal and passes the resulting output to a second processor 618 on the weapon 604. The processor 618 can be configured to display the round count on a display 620 and/or optionally pass the round count to an optional RF radio 622 that passes the round count to other devices (e.g., a display on glasses of the user) via an optional RF antenna 624. In some embodiments, the NFC antenna 612 in the magazine 602 may be parallel to a firing direction of the firearm. In other words, the NFC antenna 612 may be arranged along a side of the magazine rather than its spine or along a side of the magazine that is longer than two ends are wide. Additionally or alternatively, the processor 608 may also be arranged along a side of the magazine and parallel to a firing direction.

In an embodiment, the NFC chips 610, 616 can also pass power from the weapon 604 to the magazine 602. In other words, they can pass data and power simultaneously and in opposite directions. Various known protocols can be utilized to pass power and data via this wireless channel. For instance, a battery can store power in the handle or grip of the weapon 604, and the NFC interface can pass power (e.g., wirelessly) from the battery to the magazine 602 to power the processor 608 and optionally the magnetic sensor array 606. It should be noted that, Hall effect switches typically use an external power source, while Reed switches do not need external power.

Figure 7:
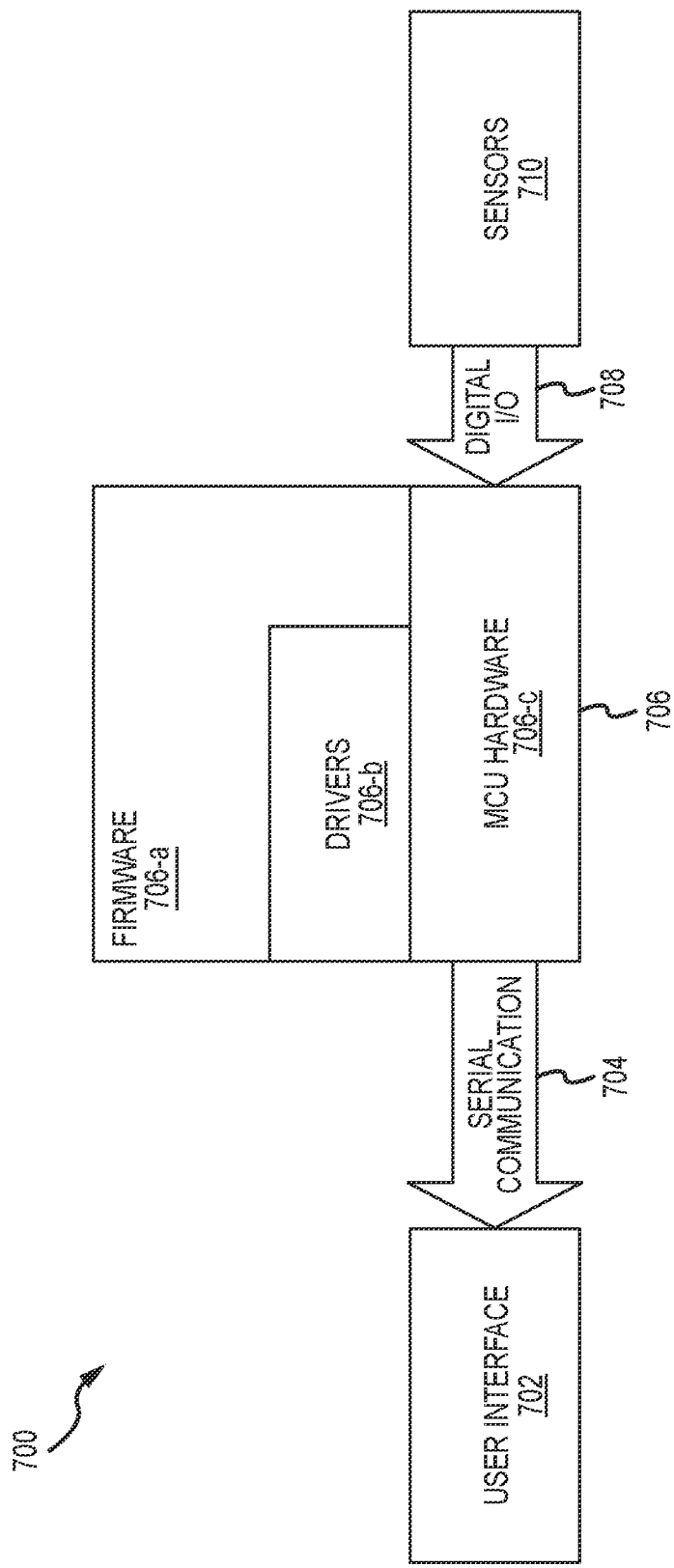
FIG. 7 is a block diagram of a media access controller (MAC) that controls the processor in FIG. 6, according to an embodiment of the disclosure.

FIG. 7 illustrates an embodiment of a block diagram for a media access controller (MAC) 700 that controls microcontroller hardware responsible for interacting with the wired, optical, and/or wireless transmission mediums. A board 706 (e.g., a printed circuit board, embedded systems board, etc.) may comprise hardware for a microcontroller unit (MCU) 706-*c*, one or more drivers 706-*b*, and firmware 706-*a* (i.e., software/code providing low level control of device hardware). In some cases, the MCU hardware 706-*c* may be in serial communication 704 with user interface 702 of a firearm. The user interface 702 may be used to display a round count for a firearm magazine, the number of rounds expended, level of battery remaining, etc. In some cases, the user interface may be an example of the user interface and display housing, further described with reference to FIGS. 21 and 22. In one embodiment, the magazine may include the user interface 702, for instance, in the form of an LCD display presenting round count to the user. The LCD display may receive power when the value changes, but may otherwise be non-powered, thereby allowing the LCD to operate whether the magazine is coupled to the firearm or not. Additionally or alternatively, the user interface 702 may be configured to display round counts for a plurality of magazines registered by the firearm, with or without aggregating a total loadout associated with the firearm, described later in this disclosure.

The MCU hardware 706-*c* may also receive digital input/output (I/O) streams 708 from one or more sensors 710 located in the magazine of the firearm. In some cases, the sensors 710 may be Hall effect switches, Hall effect sensors, Reed switches, etc. As previously described, a Hall effect switch may provide a digital or at least pulsed or square wave output, whereas Hall effect sensors may provide an analogue output and therefore may require an analogue to digital converter (ADC) (not shown), as described in FIG. 2.

Figure 8:
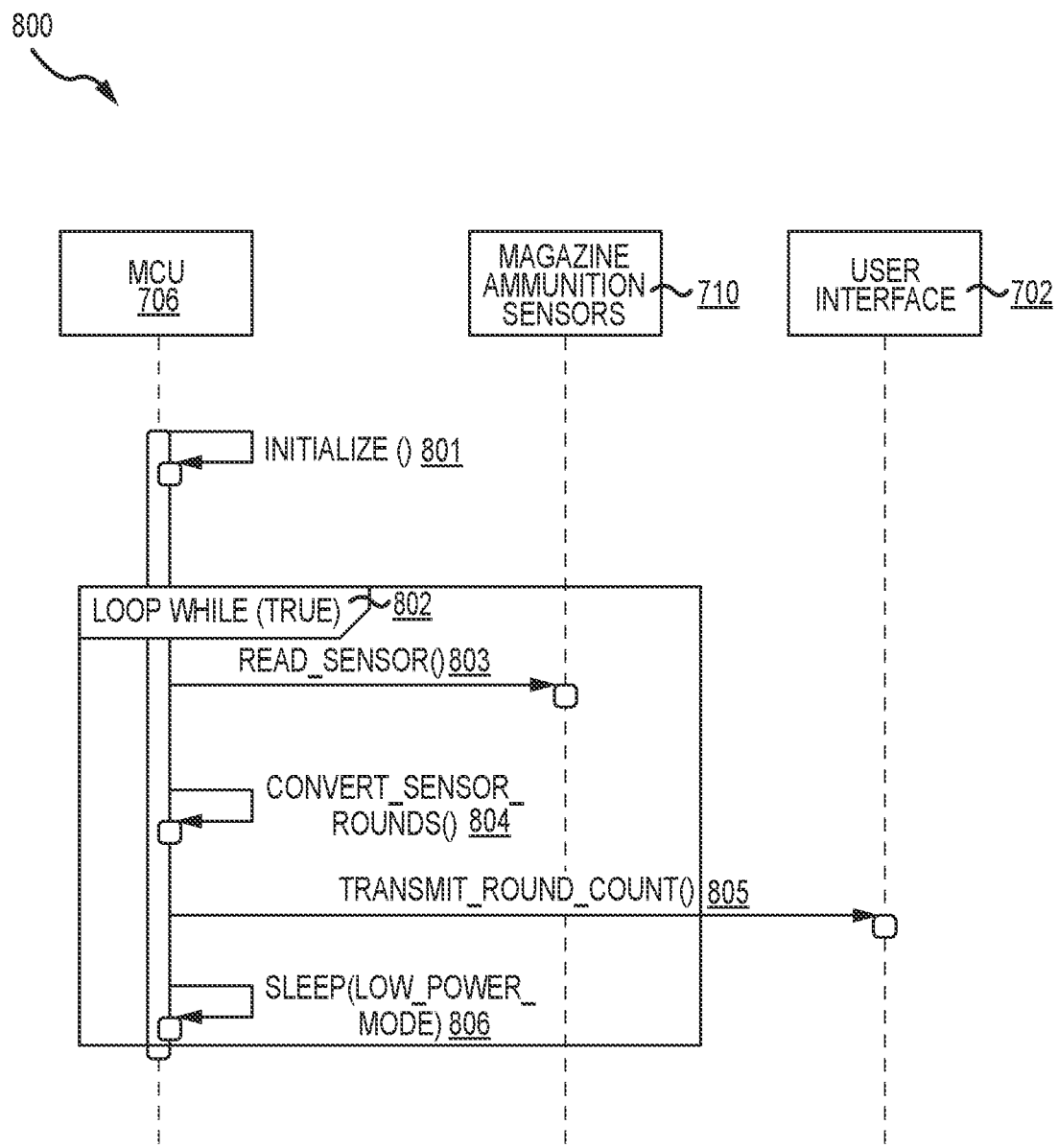
FIG. 8 is sequence diagram of the MAC in FIG. 7.

FIG. 8 is a sequence diagram 800 illustrating an embodiment of communications between the MCU 706, magazine ammunition sensors 710 (e.g., magnetic field-sensing sensors or magnetic switches), and the user interface 702 (e.g., screen/display for displaying round count) in FIG. 7. MCU 706 may be in serial communication with the user interface 702 and may receive digital I/O streams from one or more magazine sensors 710. In some cases, the one or more magazine sensors 710 may be substantially evenly spaced out from one another and may line an inside of the magazine. The MCU 706 may be exemplified by the processor 608 in FIG. 6.

At 801, the MCU 706 may initialize. In some cases, the initialization may be in response to the round counting system being turned on, an accelerometer within the magazine (or firearm) being triggered due to motion of the firearm, or any other user action. If the MCU 706 or sensors 710 are not in sleep mode (i.e., while system is still initialized) at 802, the MCU 706 may start reading and processing the output (i.e., round count data) from the magazine sensors 710 at 803. At 804, the MCU 706 may convert the round count data to a round count indication. For instance, the round count data may include an indication of the number of active magnetic-field sensing sensors (e.g., Hall effect switches or sensors, reed switches, etc.), based on which the MCU 706 may be able to determine a position of the follower comprising a magnet within the magazine and the round count indication.

At 805, the MCU 706 may transmit the round count 805 to the user interface 702. In some cases, the MCU 706 may be coupled to a first flat antenna (e.g., microstrip patch antenna, or any other antenna fabricated on a PCB) and the first flat antenna may transmit the round count indication to a second flat antenna on the firearm (e.g., located inside a magazine well of the firearm). The user interface 702 may be in communication with the second flat antenna via one or more RF cables and connectors (e.g., see FIG. 15).

In some other cases, the MCU 706 may be located on the firearm side, as opposed to the magazine side. In such cases, the round count data may be transferred wirelessly between the two antennas prior to being processed. In some circumstances, the two antennas may also transfer power via an NFC connection, for instance, if the battery or power source for the round counting system is on the firearm. In one example, the battery may be located within the grip of the firearm. The power may be pulsed across the NFC connection to conserve power, and a wake-up algorithm may be implemented to conserve power while the firearm is not being used. Such an algorithm may be based on movement, e.g., sensed via an accelerometer. When not in use, the round counter can drop in to a lower power mode.

After receiving the round count indication 805, the user interface 702 may display the round count for the user. At 806, if the MCU 706 is not receiving any further I/O from the magazine sensors 710 (e.g., firearm is not in use, or after a certain level of inactivity), the MCU 706 and/or sensors may switch to low power/sleep mode. Unlike Reed switches, Hall effect switches or sensors require external power to operate, thus, a sleep mode may serve to conserve power.

Figure 9:
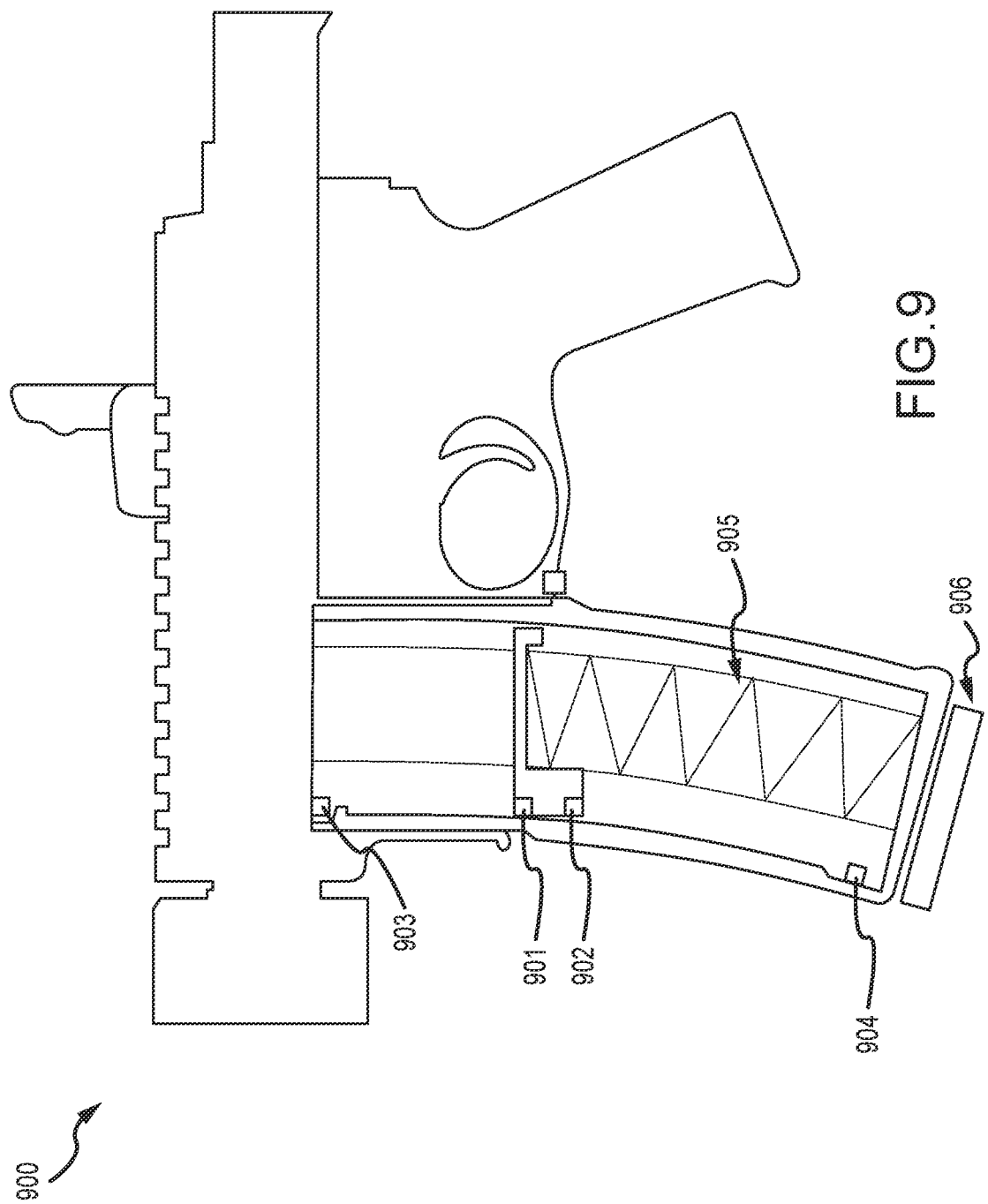
FIG. 9 is a side view of a firearm receiver and a detachable magazine where the compression spring is utilized as part of the counting system, according to an alternative embodiment of the disclosure.

FIG. 9 illustrates an alternative embodiment of a round counting system 900. Here, the compression spring 905 is used as part of the counting system. As the follower moves and compresses or relaxes the spring 905, the spring inductance changes. A coil inductance detector 906 in the base of the magazine or located elsewhere on the magazine, can detect this inductance and correlate this to a known follower position and hence a number of remaining rounds. The follower may also include a first and second reference contact 901, 902 and the magazine can include a third and fourth reference contact 903, 904. These contacts can be used to calibrate the sensing. For instance, when the first and third contacts 901, 903 come into contact, the system can know that the follower is at a full-height position, that is, no rounds being in the magazine. When the second and fourth contacts 902, 904 come into contact, the system can know that the follower is at a minimum-height position, that is, fully loaded. In another embodiment, the first and second reference contacts 901, 902 can be a single contact or a portion or all the follower can be conductive and thereby operate as a contact.

In one embodiment, the limits of inductance can be tracked to self-calibrate the unit when empty, the spring 905 will be longest and have the largest inductance. When fully loaded the spring 905 will be shortest and have the least inductance. In this way the detection circuitry may be able to "adapt" and learn the full/empty limits and deduce intermediate values between the full and empty extremes.

In an embodiment, a helical wire can be inserted inside the main magazine spring 905 or fabricated into the spring 905 or attached thereto. This helical wire can be coupled to a top of the main magazine spring 905 and thereby create a return loop to enhance inductance measurements. In an embodiment, the detection circuitry 906 can inject current into the spring 905 or the return wire to enhance the inductance that can be measured. The helical wire can be wound in the same direction as the main spring 905 so that it will also contribute inductance to the measurement, thereby making the measurement more sensitive.

In another embodiment, a multi-layered spring can be used (e.g., conductor-insulator-conductor), which integrates the return wire function within the main spring itself. The two conductor layers would be electrically connected at the top end near the follower, but electrically isolated during the journey from the top to the bottom of the magazine.

In some other cases, the spring 905 may be coated with an insulator (e.g., an oxide layer) to prevent the conductive portions of the spring from contacting each other when compressed. In some examples, such a system may need to be calibrated for different round sizes and weights, since the compression and inductance of the spring may vary.

Figure 10:
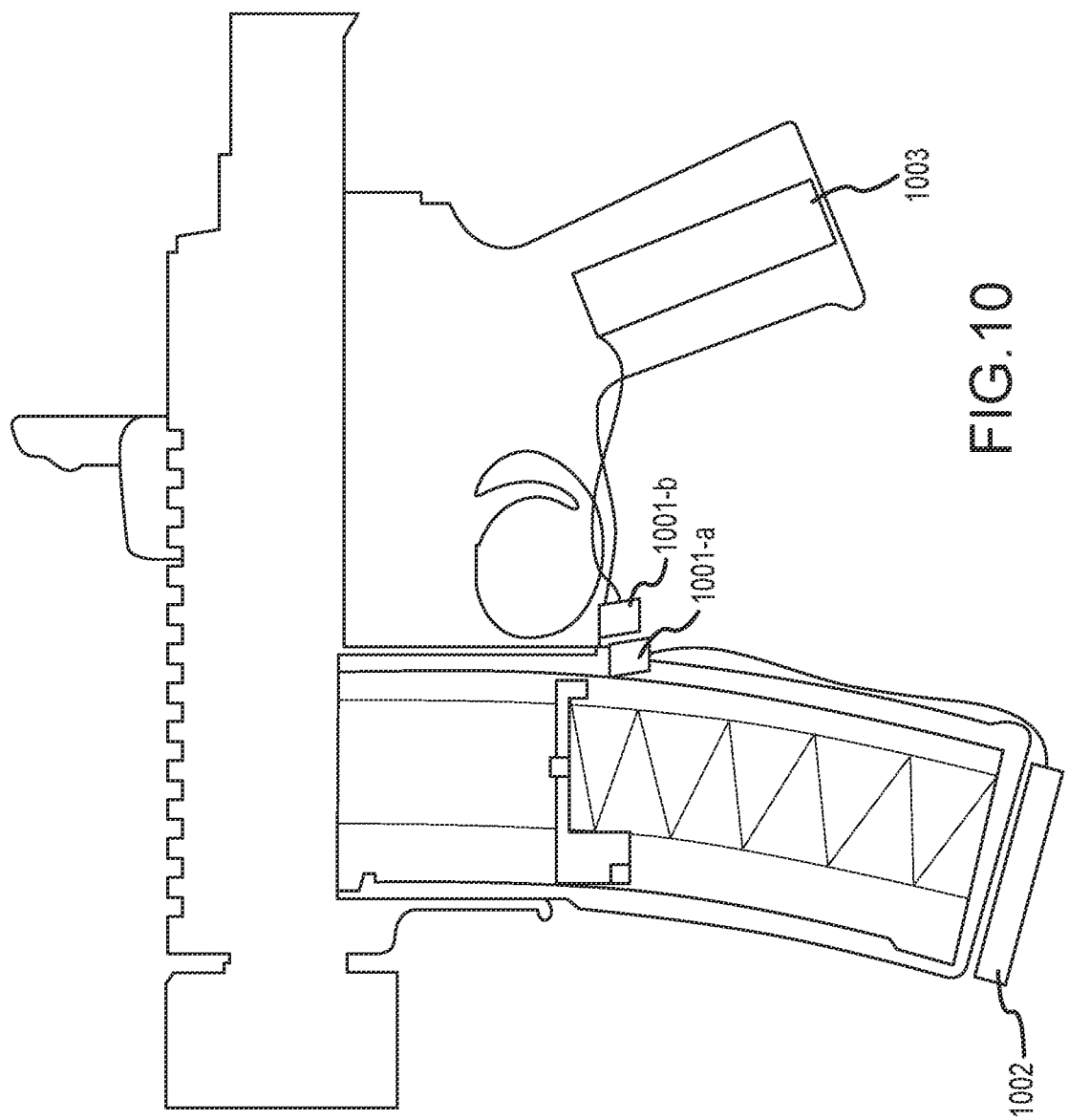
FIG. 10 is a side view of a firearm receiver and a detachable magazine where an NFC interface may be used to transmit round count information from the magazine to the weapon.

FIG. 10 illustrates a round counting system 1000 where an NFC interface is used to pass information from the magazine sensing circuitry to the weapon, for instance, a display on the weapon or to a more powerful wireless transmitter on the weapon that can pass the round count to a receiver/display on a user or other remote entity. In some cases, the NFC interface may comprise two NFC inductive coupling antennas 1001-*a* and 1001-*b*. As shown, the NFC interface can be arranged near a bottom of the magazine well and the trigger guard. One half of the interface can be affixed to the weapon (e.g., any side of the trigger guard) and the other half can be integrated into each magazine to be used with the weapon. In this way, each magazine can convey round count information to the weapon. The NFC interface can also be coupled to a power source on the weapon (e.g., a battery or weapon system circuitry 1003), and this interface can wirelessly transmit power from the weapon to the magazine and its sensing circuitry 1002. The trigger-guard side of the interface can either be attached to or integral with the trigger guard. Additionally, the trigger guard can then provide a wiring path from this side (i.e., trigger-guard side) of the NFC interface to a processor and/or battery in the grip or stock (e.g., weapon system circuitry 1003).

In an embodiment, an NFC chip can have a unique ID (e.g., a 64-bit ID or 128-bit ID). This ID gives each magazine a unique identification or serial number that can be used for tracking and inventory, among other purposes. Alternatively, a serial number can be coded or hardwired into the processor or microcontroller. Alternatively, a serial number can be distributed between the processor and the NFC chip. In yet other cases, a first substantially flat antenna (i.e., NFC antenna) of the magazine can be assigned a unique ID, and a second substantially flat antenna (i.e., NFC antenna) on an inside of the magazine well of the firearm, for instance, may be configured to read the unique ID associated with the first substantially flat antenna upon insertion of the magazine into the magazine well of the firearm. In some embodiments, the firearm processor and optionally the magazine processor may be configured to store the unique ID and the round count for the magazine upon insertion of the magazine into the magazine well. In this way, the firearm processor may be configured to register each magazine as it is inserted into the magazine well and store both the round count indications and unique identifiers for a plurality of magazines. In some cases, the round count indication for any magazine previously inserted into the magazine well or registered by the processor may be displayed via a user interface of the firearm.

In some embodiments, the firearm or magazine processor may be configured to display a warning on the firearm display, for instance, when a total round count for a plurality of magazines is under a threshold. In some instances, the round counting system may be configured to display a last recorded magazine round count for each of a plurality of magazines used in a firearm, thereby providing a loadout for the user even for magazines that are not currently in the firearm.

In some circumstances, eddy currents may be induced within a conductor (e.g., the NFC antenna 1001-*a*) due to the motion of the magnet on the follower relative to the NFC antenna 1001-*a*. In some embodiments, the eddy current may also be used to power the NFC connection and processing of these signals can occur on the weapon. Alternatively, the eddy current signals can be processed on the magazine and passed to the weapon via the NFC connection.

Although this disclosure often refers to a substantially flat antenna, in some embodiments, other antenna shapes may be used. For instance, the magazine may include a substantially flat antenna while the firearm (e.g., the magazine well) includes a non-flat antenna, such as a coil antenna that coils around a longitudinal axis (e.g., TC0502HF NFC SMD antenna made by PREMO). Such an antenna could have dimensions on the order of a few millimeters in each axis, for instance, less than 6 mm per side, and a capacitance of 10-100 pF. The magazine-side antenna may also have different locations, such as embedded within or extending from the trigger guard or embedded within or partially extending from the magazine over-insertion stop. In other words, the magazine-side antenna can be arranged on the spine of the magazine, rather than a side of the magazine.

Figure 11:
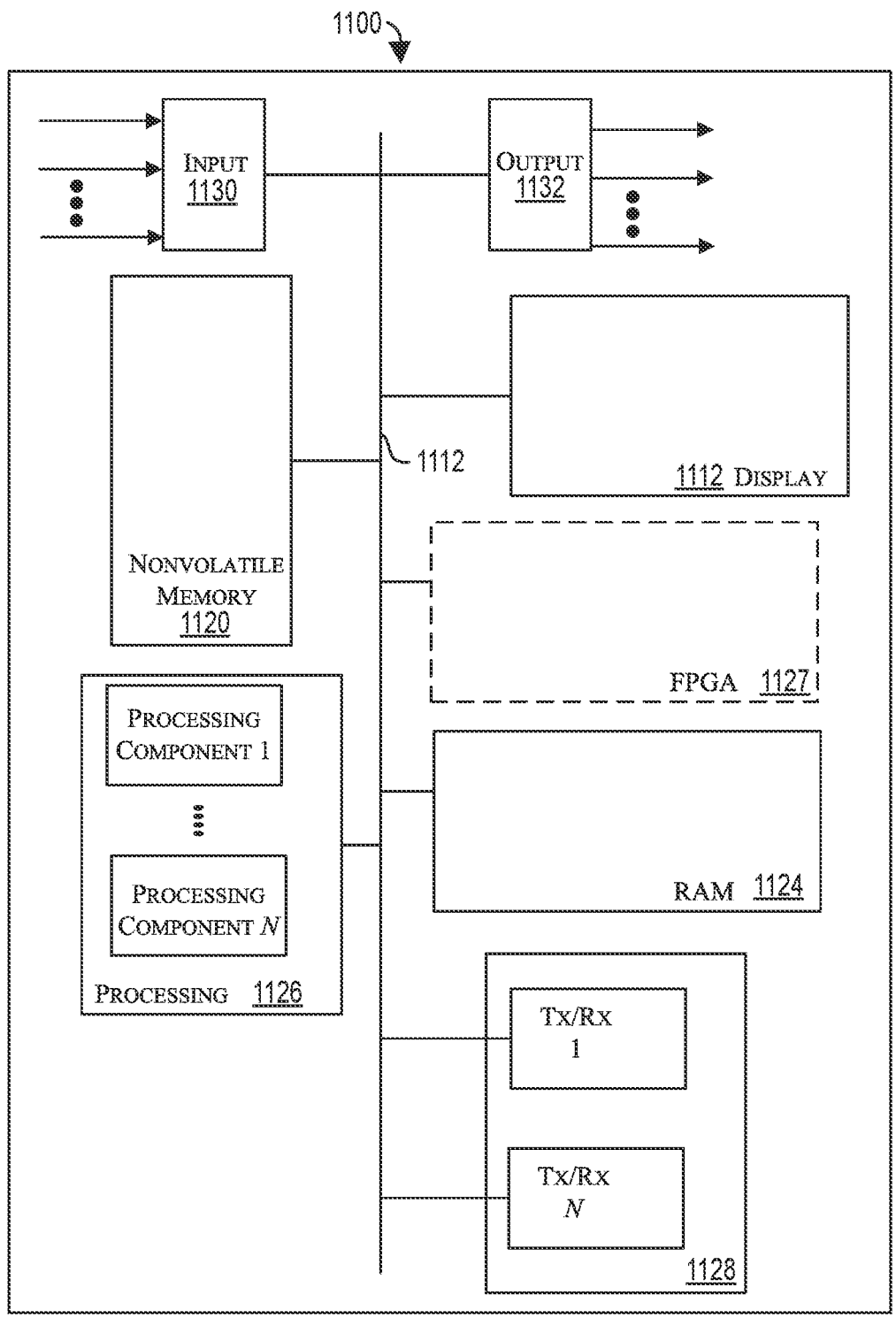
FIG. 11 is a block diagram illustrating a computer system according to various embodiments of the disclosure.

The methods described in connection with the embodiments disclosed herein may be embodied directly in hardware, in processor-executable code encoded in a non-transitory tangible processor readable storage medium, or in a combination of the two. Referring to FIG. 11 for example, shown is a block diagram depicting physical components that may be utilized to realize a round counter (and the processor 116 or Hall switch encoding circuitry 116 generally or the processor in FIG. 33) according to an exemplary embodiment. As shown, in this embodiment a display portion 1112 and nonvolatile memory 1120 are coupled to a bus 1122 that is also coupled to random access memory ("RAM") 1124, a processing portion (which includes N processing components) 1126, an optional field programmable gate array (FPGA) 1127, and a transceiver component 1128 that includes N transceivers. Although the components depicted in FIG. 11 represent physical components, FIG. 11 is not intended to be a detailed hardware diagram; thus, many of the components depicted in FIG. 11 may be realized by common constructs or distributed among additional physical components. Moreover, it is contemplated that other existing and yet-to-be developed physical components and architectures may be utilized to implement the functional components described with reference to FIG. 11.

Figure 21:
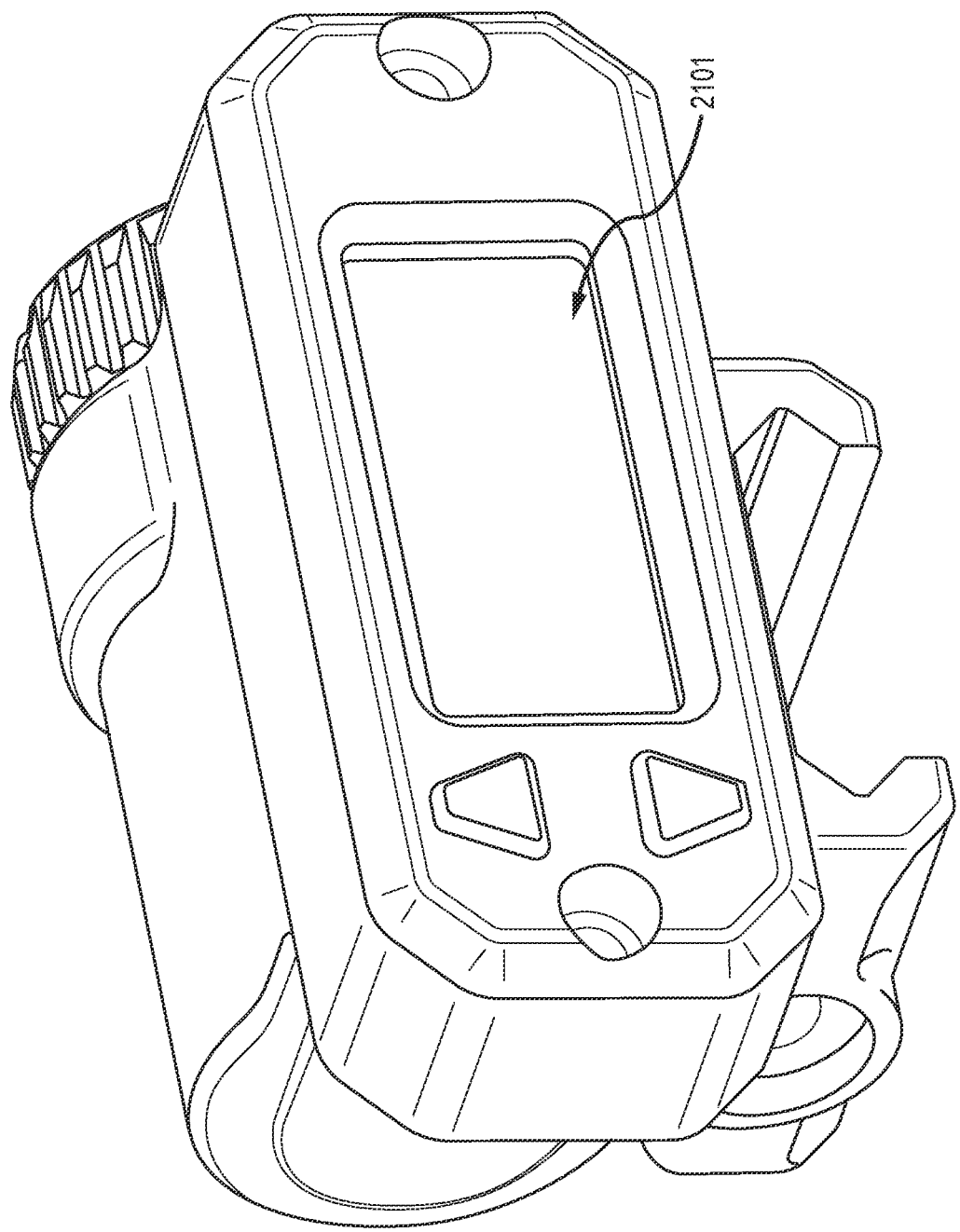
FIG. 21 illustrates a display housing for mounting on the weapon, according to an embodiment of the disclosure.
Figure 22:
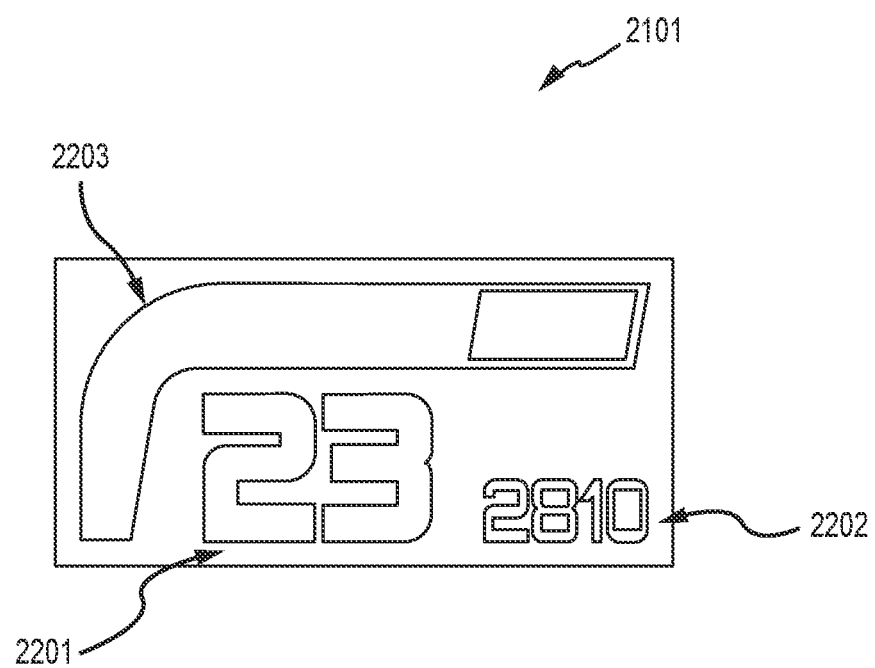
FIG. 22 illustrates an example of a user interface in the display housing of FIG. 21, for displaying the round count.
Figure 28A:
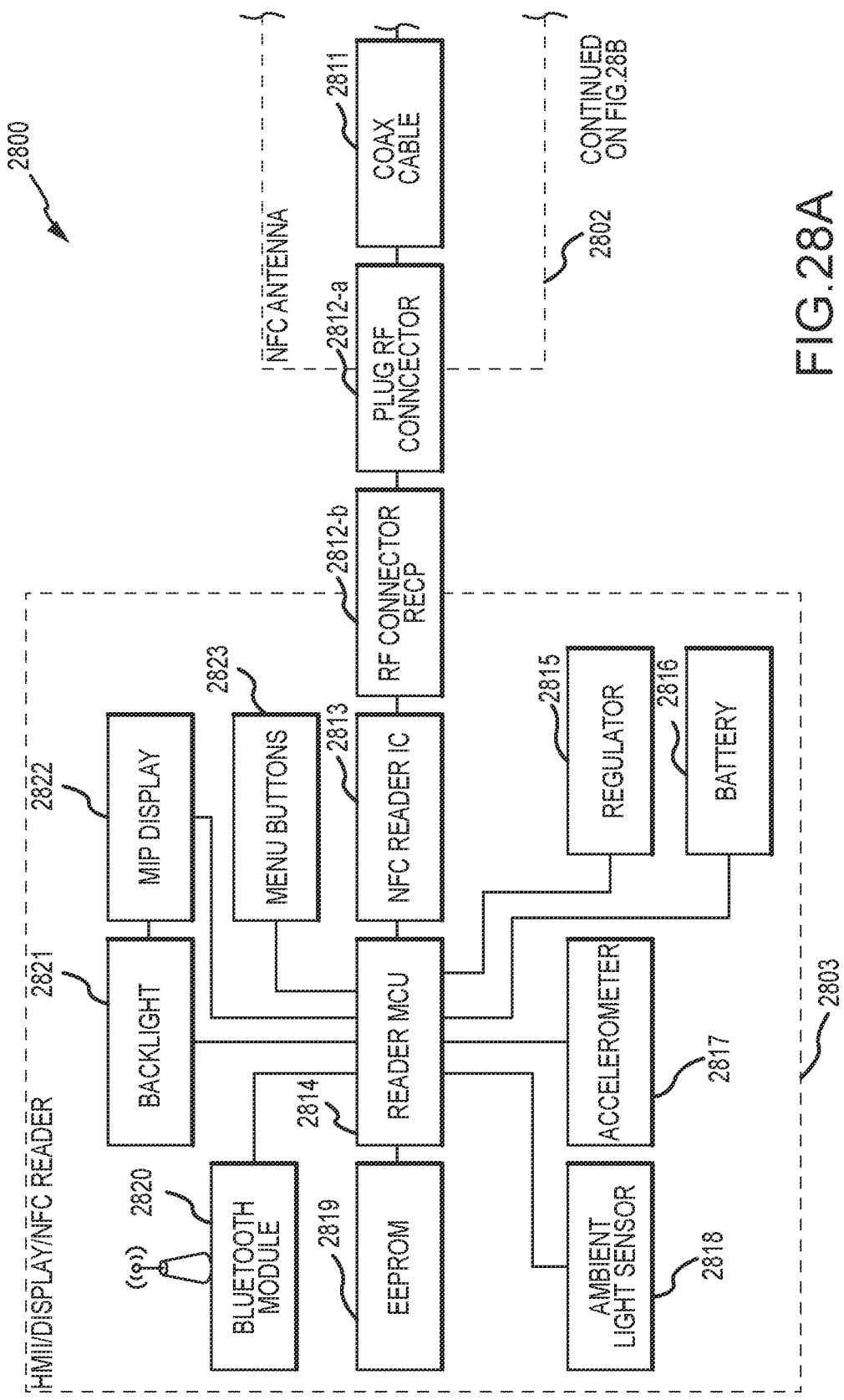
FIG. 28A is a first part of a high-level system block diagram, according to an embodiment of the disclosure.
Figure 28B:
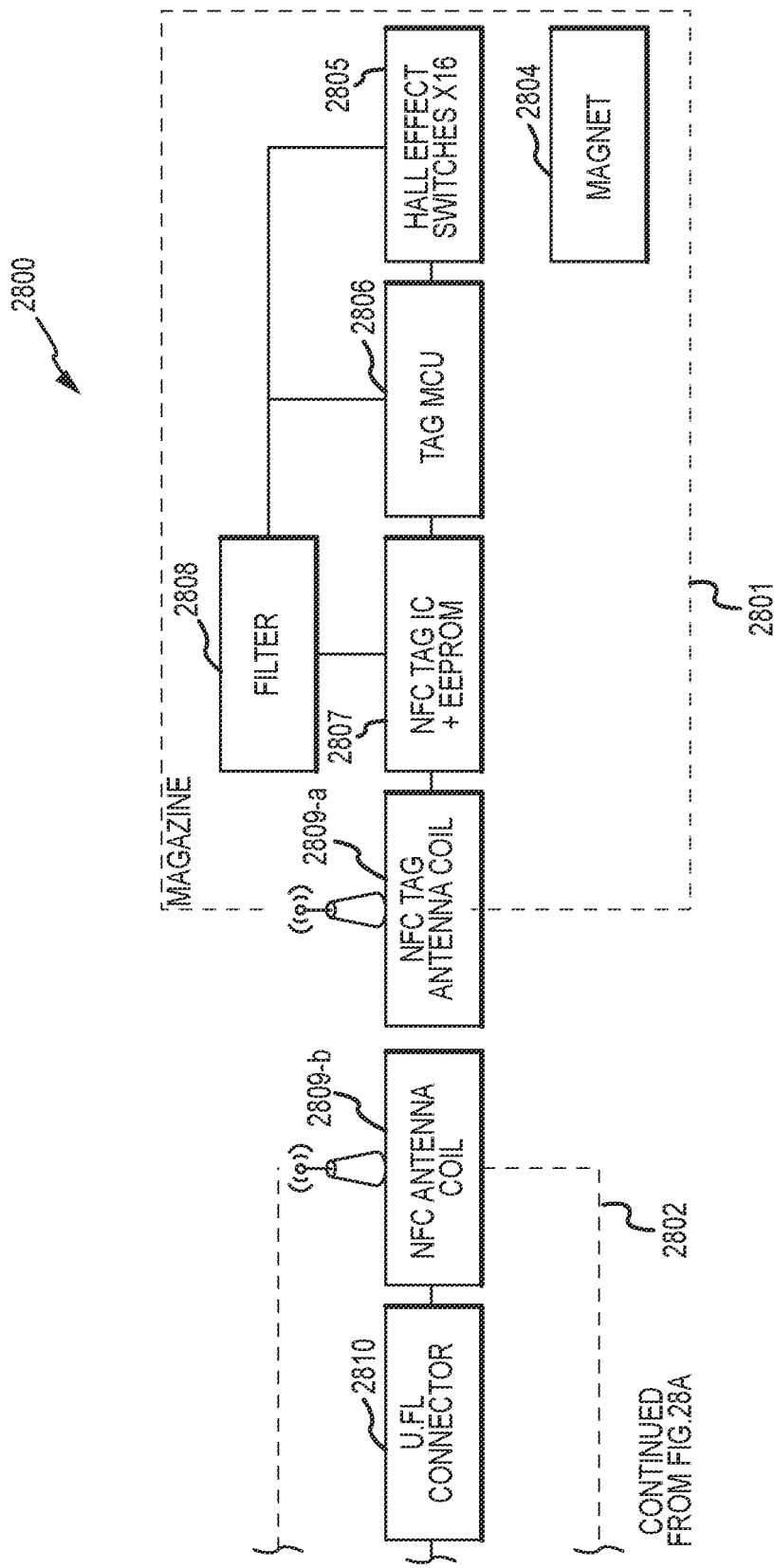
FIG. 28B is a second part of the high-level system block diagram of FIG. 28A.

This display portion 1112 (e.g., FIGS. 21 and 22, Memory in Pixel (MIP) 2822 in FIG. 28) generally operates to provide a user interface for a user, and in several implementations, the display is realized by a firearm's scope, an LCD/LED display mounted to a firearm, a set of goggles or spectacles worn by a user of the firearm, electronic paper (e.g., e-ink) affixed to a weapon or user, and a touchscreen display. In general, the nonvolatile memory 1120 is non-transitory memory that functions to store (e.g., persistently store) data and processor-executable code (including executable code that is associated with effectuating the methods described herein). In some embodiments for example, the nonvolatile memory 1120 includes bootloader code, operating system code, file system code, and non-transitory processor-executable code to facilitate the execution of processing of the signals from the magnetic sensors described further herein (e.g., FIGS. 31-33 and/or 41-45).

In many implementations, the nonvolatile memory 1120 is realized by flash memory (e.g., NAND or ONENAND memory), but it is contemplated that other memory types may be utilized as well. Although it may be possible to execute the code from the nonvolatile memory 1120, the executable code in the nonvolatile memory is typically loaded into RAM 1124 and executed by one or more of the N processing components in the processing portion 1126.

The N processing components in connection with RAM 1124 generally operate to execute the instructions stored in nonvolatile memory 1120 to enable processing of signals from the magnetic sensors, for instance, for determination of a number of remaining rounds in the magazine. For example, non-transitory, processor-executable code to effectuate distinguishing between follower positions between Hall effect switches or aligned with one of the Hall effect switches, where one switch is used for every two positions (see FIG. 4B) may be persistently stored in nonvolatile memory 1120 and executed by the N processing components in connection with RAM 1124. As one of ordinarily skill in the art will appreciate, the processing portion 1126 may include a video processor, digital signal processor (DSP), micro-controller, graphics processing unit (GPU), or other hardware processing components or combinations of hardware and software processing components (e.g., an FPGA or an FPGA including digital logic processing portions). In some embodiments, associations between the various Hall effect switch signals, or pairs of signals, and follower/magnet positions (and hence round count) can be stored in the nonvolatile memory 1120, for instance, in a lookup table.

Figure 31:
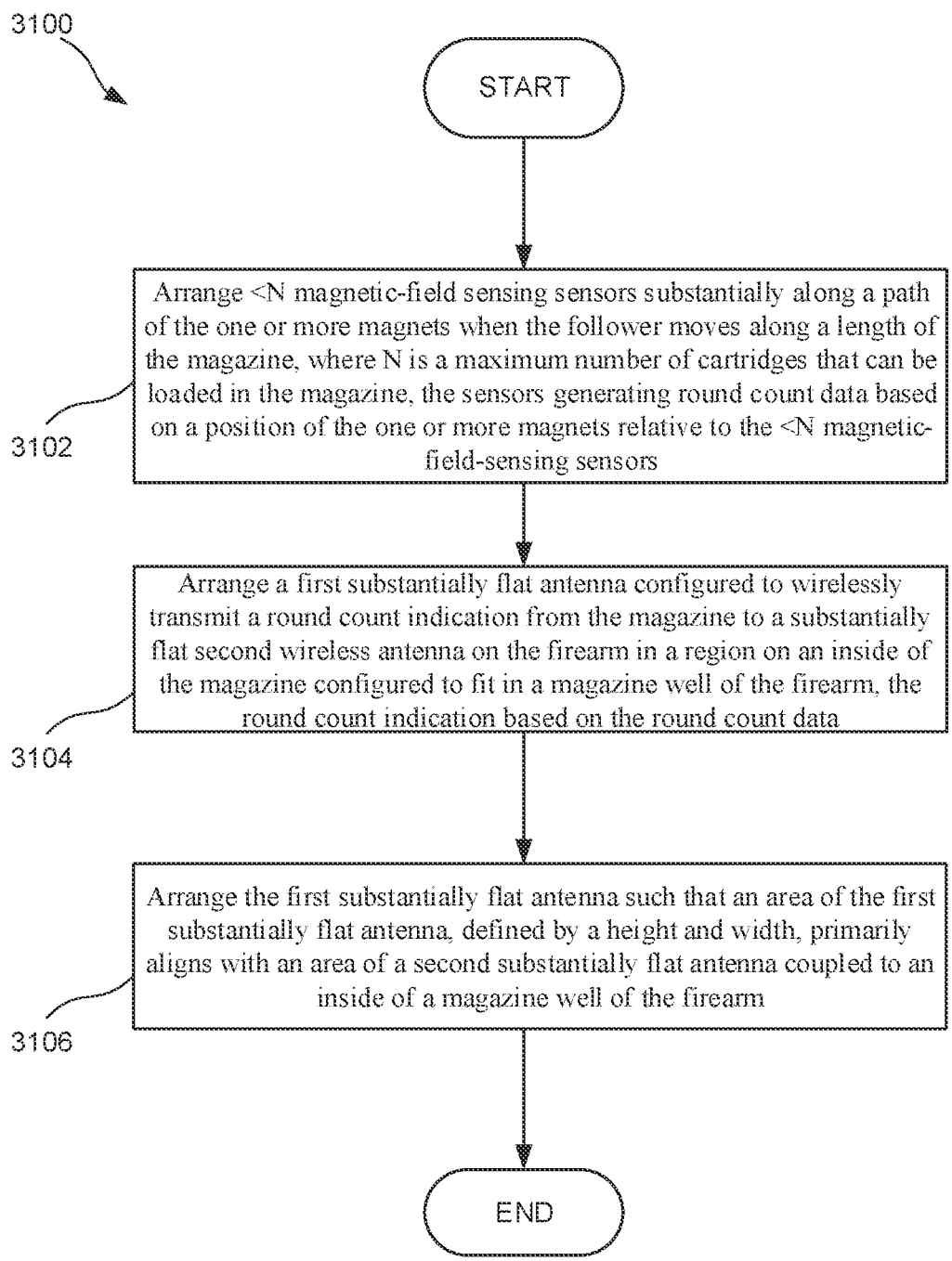
FIG. 31 is a flowchart of a method of manufacturing a magazine with a round counting system.
Figure 32:
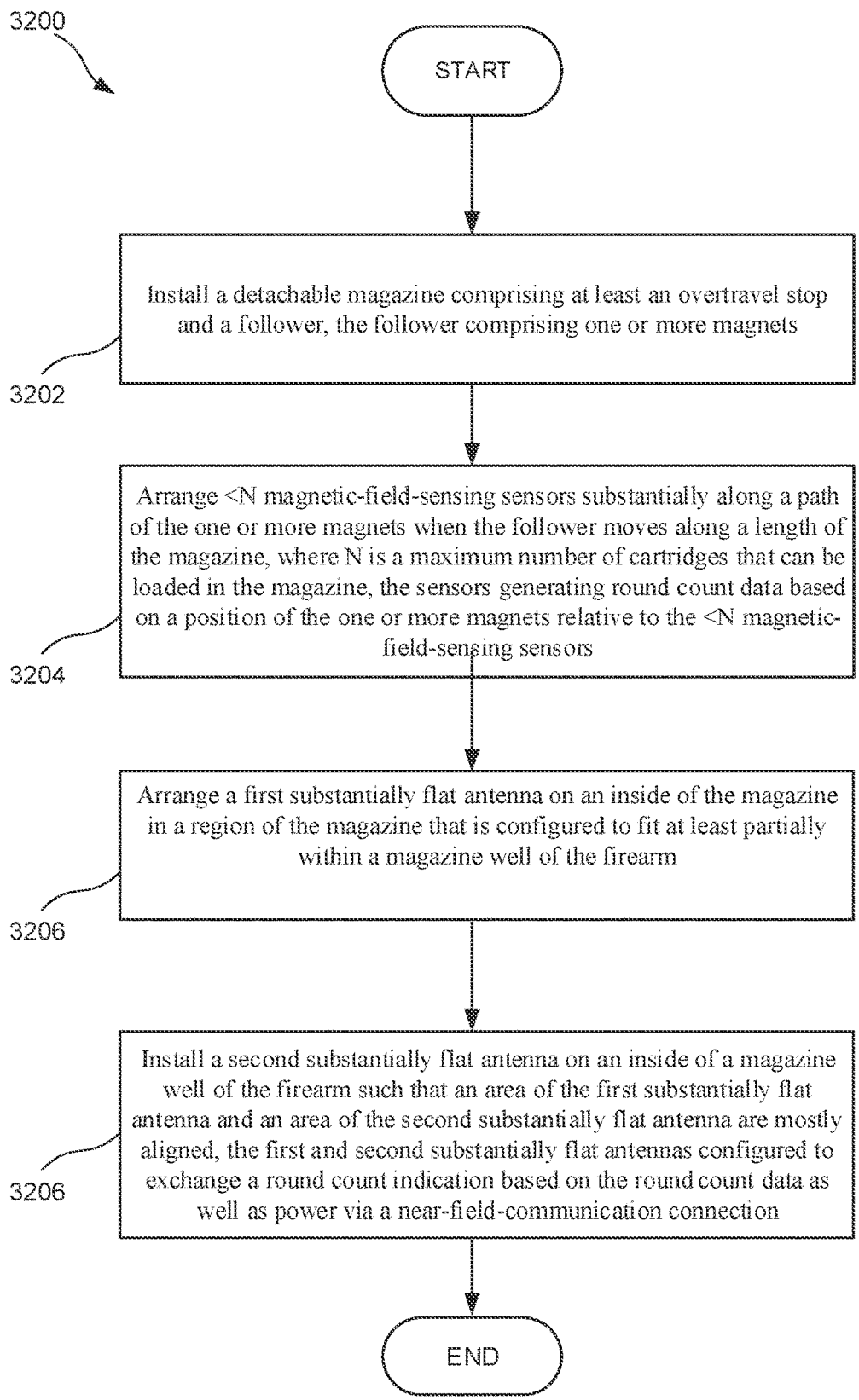
FIG. 32 is a flowchart of a method of installing a round counting system on a firearm.
Figure 33:
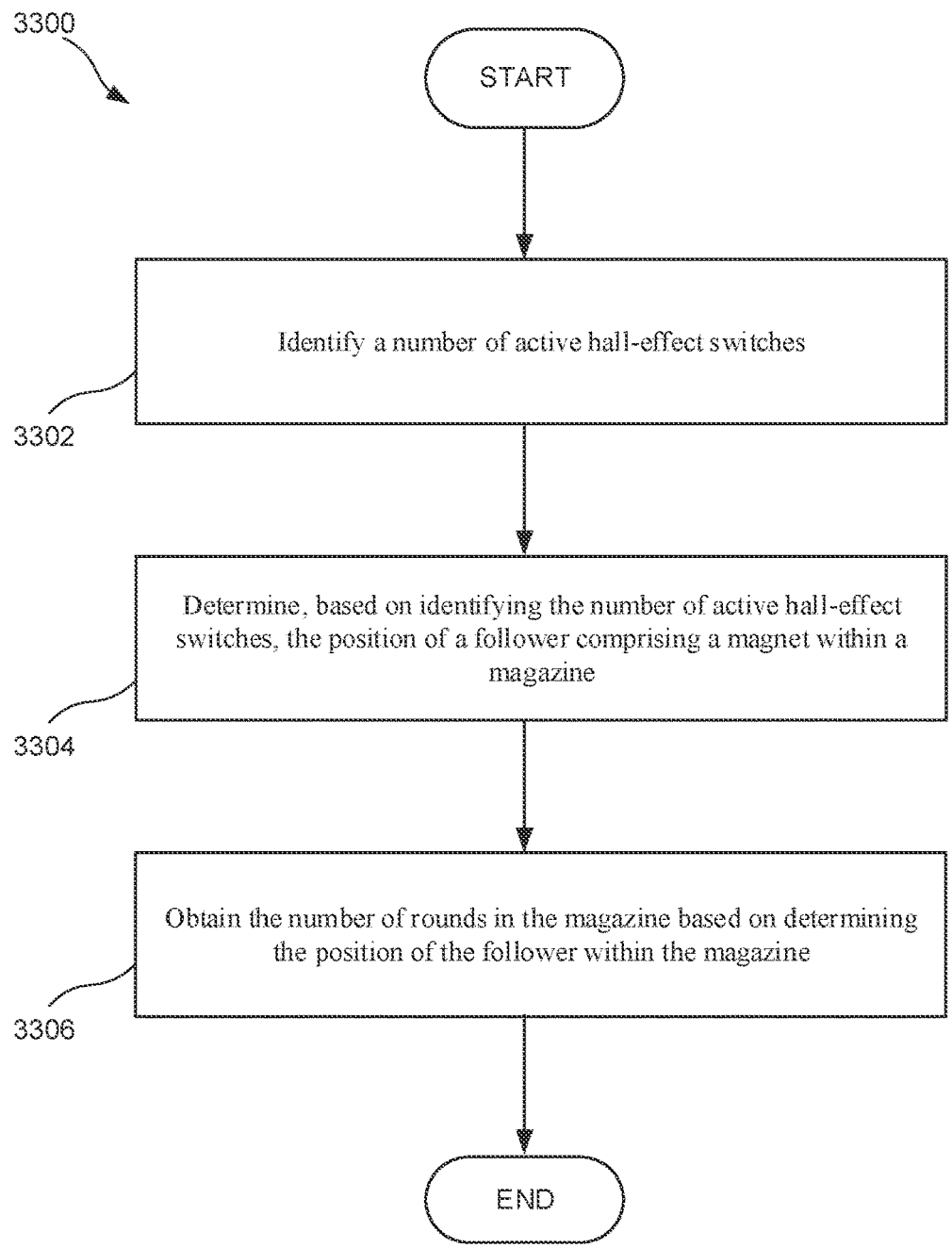
FIG. 33 is a flowchart of a method of obtaining the number of rounds in a magazine utilizing a round counting system with a Hall effect switch array.

In addition, or in the alternative, the processing portion 1126 may be configured to effectuate one or more aspects of the methodologies described herein (e.g., determining round count based on a position of one or more magnets on the follower as sensed by one or more of the magnetic sensors/switches 112, 404, 504, etc., or as seen in FIGS. 31-33 and/or 41-45). For example, non-transitory processor-readable instructions may be stored in the nonvolatile memory 1120 or in RAM 1124 and when executed on the processing portion 1126, cause the processing portion 1126 to identify a position of the follower within the magazine (e.g., FIGS. 31-33 and/or 41-45). Alternatively, non-transitory FPGA-configuration-instructions may be persistently stored in nonvolatile memory 1120 and accessed by the processing portion 1126 (e.g., during boot up) to configure the hardware-configurable portions of the processing portion 1126 to effectuate the functions of the Hall switch encoding circuitry 116 (or processor to determine round count based on Hall effect switch signals).

The input component 1130 operates to receive signals (e.g., the outputs or voltages from the magnetic sensors/switches 112, 404, 504, etc.) that are indicative of one or more aspects of the position of the follower and thus round count. The input component 1130 could also be receiving signals from the NFC interface sent from the circuitry/processor 116 of the magazine. The signals received at the input component may include, for example, a voltage from a Hall effect switch indicating that the switch is active, or voltages from two Hall effect switches indicating that the pair of switches are active. The signals received at the input component may include, for example, analogue or digital signals from the magnetic sensors/switches 112, 405, 504, etc. The output component generally operates to provide one or more analog or digital signals to effectuate an operational aspect of the magazine passing round count information to the weapon. For example, the output portion 1132 may provide the round count described with reference to the figures above. The depicted transceiver component 1128 includes N transceiver chains, which may be used for communicating with external devices via wireless or wireline networks. Each of the N transceiver chains may represent a transceiver associated with a communication scheme (e.g., Wi-Fi, Ethernet, Profibus, NFC, etc.). The transceiver component 1128 can be an NFC component and can be configured to both send and receive data as well as power simultaneously. The transceiver component 1128 may also be a more powerful second transceiver arranged on the weapon, such that NFC transfers data from the magazine to the second transceiver which then uses a more powerful radio transmitter to pass the round count to a receiver/display that is remote from the weapon (e.g., on a user or a user's goggles/spectacles). As another example, the output portion 3432 may provide a voltage indicative of the round count from the processor to a display.

Figure 12:
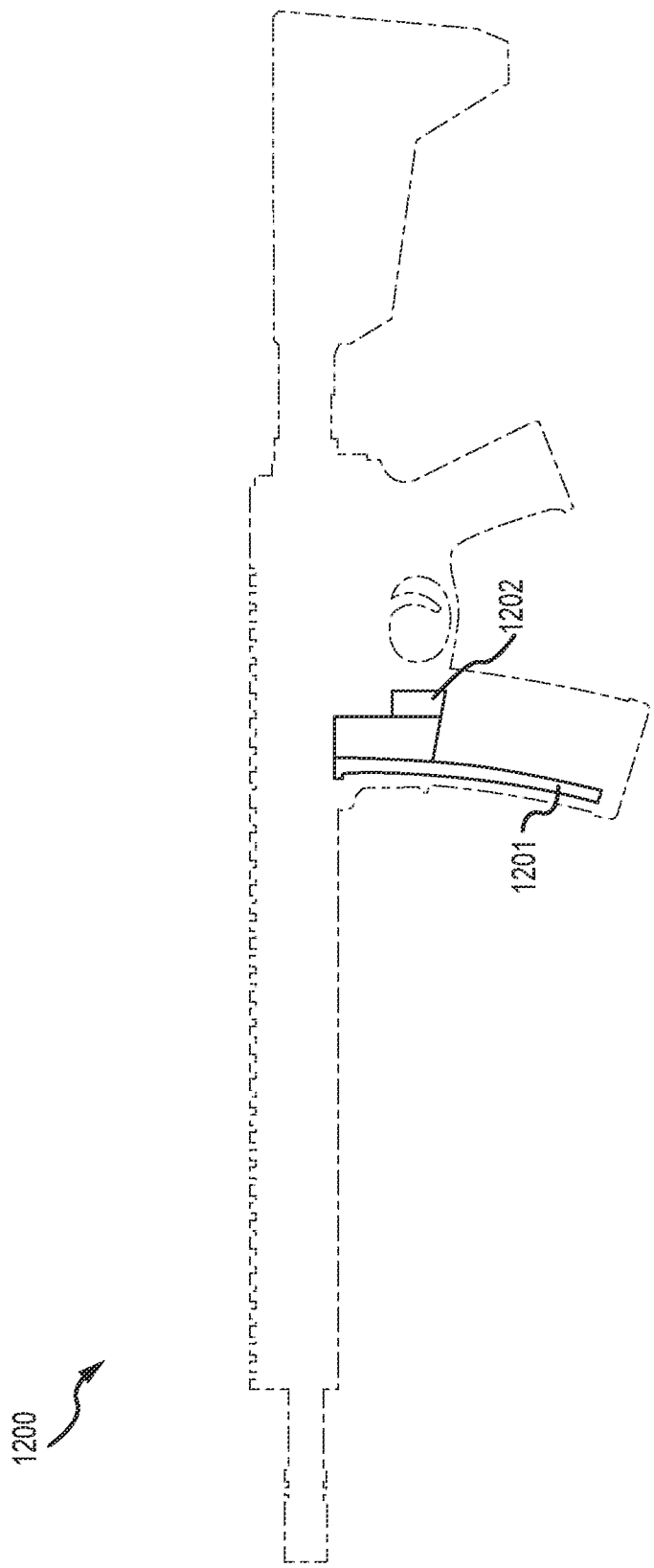
FIG. 12 is a side view of the firearm and the detachable magazine (in FIG. 5), illustrating areas for installing the magazine antenna and magnetic field-sensing sensors.
Figure 13:
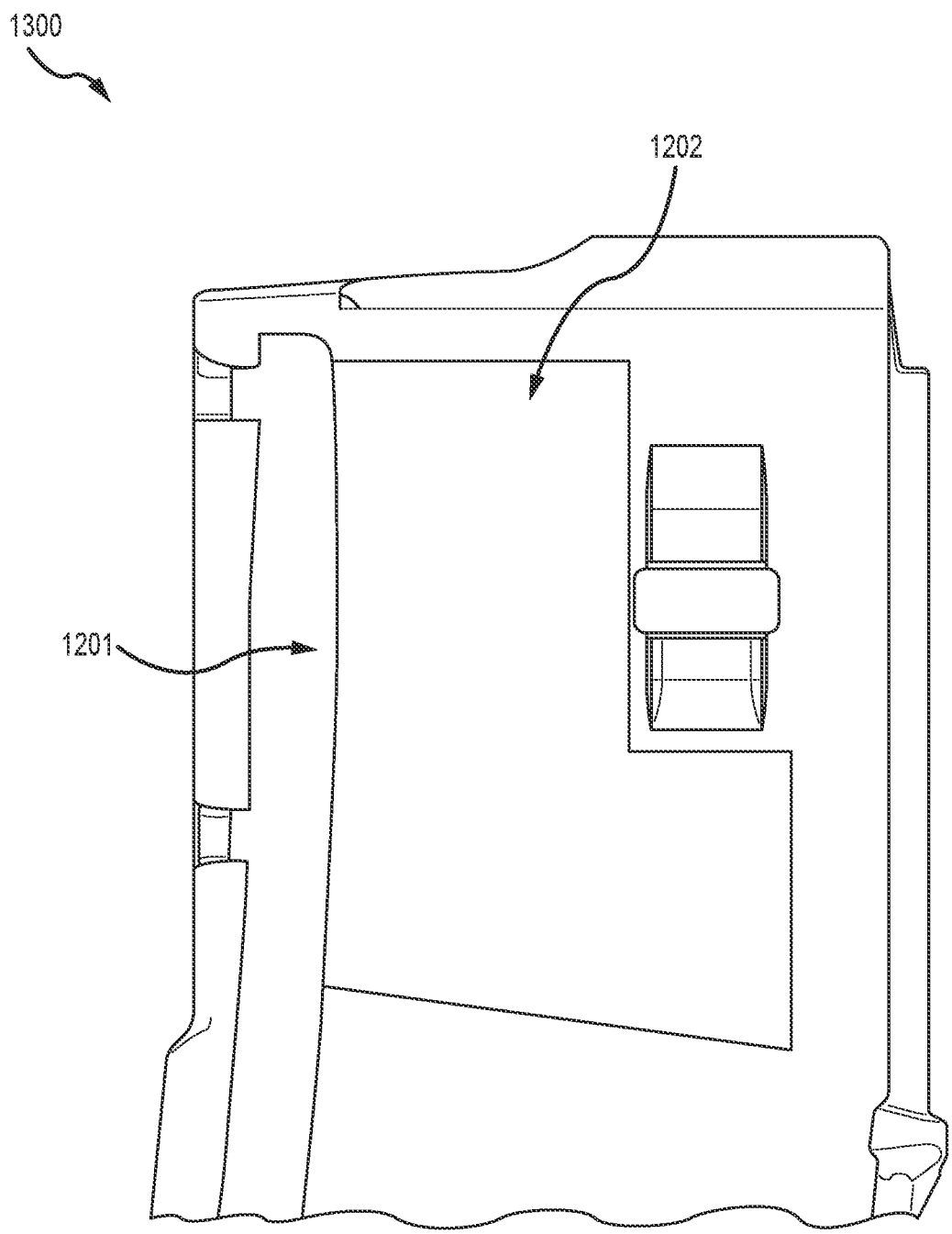
FIG. 13 is a detailed view of the detachable magazine in FIG. 12.

FIG. 12 illustrates a side view of a firearm 1200 with a sensor/switch array 1201 and magazine antenna 1202 within or coupled to the magazine. In some cases, the magazine antenna 1202 may be an example of an NFC antenna. Further, the magazine antenna 1202 and optionally a magazine processor (not shown) may be arranged on a side of the magazine parallel to a firing direction of the firearm. The second antenna (not shown), on the firearm 1200, could have an area that substantially aligns with and/or overlaps an area of the antenna 1202 (e.g., see FIG. 16). FIG. 12 also shows an alternative shape of the antenna 1202 as compared to that shown in FIG. 5. FIG. 13 illustrates a detailed view 1300 of the sensor array 1201 and magazine antenna 1202 in FIG. 12. Although the magazine antenna 1202 is shown having an L-shape, in other embodiments, other shapes for the magazine antenna 1202 could also be implemented. The magazine antenna 1202 also encompasses an area that may be said to have a height and a width. The antenna may be substantially flat, thereby enabling it to fit within the magazine without requiring modification to the functional dimensions of the inside or outside of the magazine.

Figure 14:
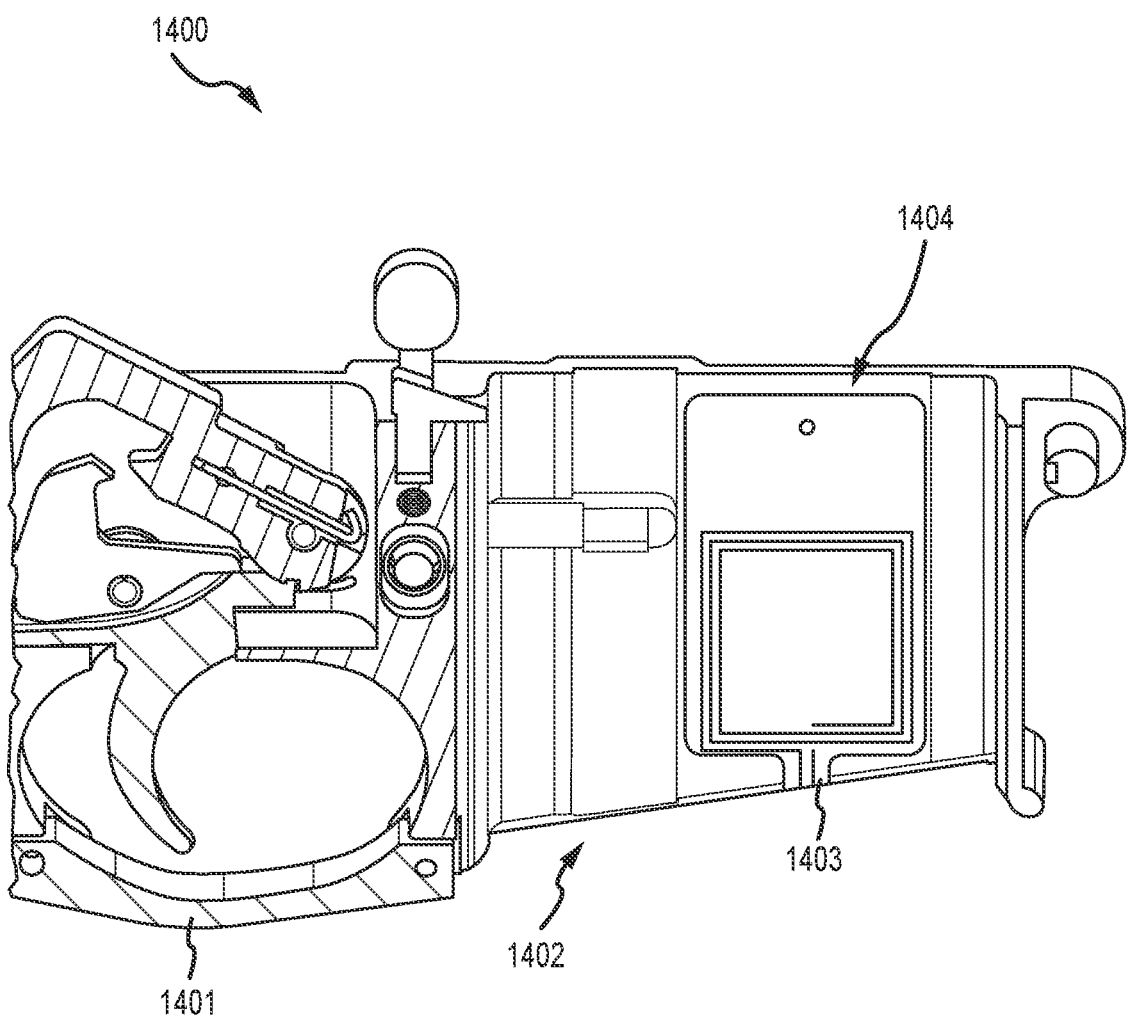
FIG. 14 illustrates an isometric view of the trigger assembly and magazine well, according to an embodiment of the disclosure.

FIG. 14 is an isometric cross-sectional view 1400 of a trigger assembly 1401 and magazine well 1402, illustrating an embodiment of the disclosure. As shown, an NFC antenna 1403 (e.g., a flat NFC antenna) can be arranged in depression 1404 in the magazine well 1402. As described above with reference to FIG. 10, one half of the NFC interface (i.e., NFC antenna 1403) can be affixed to the weapon and the other half (i.e., a second NFC antenna, not shown) can be integrated into each magazine to be used with the weapon. In this way, each magazine can wirelessly convey round count information to the weapon. As previously described, in some cases, each magazine may be identified (e.g., registered with a unique identifier if not previously registered, or identified based on a previously assigned unique identifier) when inserted into a magazine well of a firearm. Further, the magazine or firearm processor may determine a round count when a magazine is initially inserted into the firearm and may store the round count along with the associated magazine ID to memory. In this way, the firearm or magazine processor may be configured to track the round count for a plurality of magazines in use by the user of the firearm. In some embodiments, the firearm or magazine processor may be configured to display a warning on the firearm display, for instance, when a total round for a plurality of magazines is under a threshold. In some instances, the round counting system may be configured to display a last recorded magazine round count for one or more magazines used in the firearm, even including a display of rounds in magazines that are not currently inserted in the firearm. In some embodiments, the NFC interface can also be coupled to a power source on the weapon (e.g., a battery or weapon system circuitry), and this interface can wirelessly transmit power from the weapon to the magazine and the magazine sensing circuitry.

Wiring access may be provided between the antenna 1403 inside the magazine well 1402 to a display that is on the outside of the receiver. In such cases, the NFC antenna 1403 and its circuit board or circuit assembly may be fabricated on a flexible substrate, or a substrate having a flexible portion. In one example, a portion of the NFC circuit board or assembly may be flexed around a bottom of the magazine well 1402 and then affixed (e.g., stuck) to an outside of the magazine well, as further described with reference to FIG. 16. This portion of the NFC circuit board on the outside of the magazine well 1402 can then be coupled to an RF cable (see FIG. 15) also arranged outside the magazine well 1402. Such a design may circumvent the need to make any modifications (e.g., drilling/machine openings) to the receiver in order to provide a wiring path for a traditional cable or Flex circuit. In an alternative embodiment, a wiring connection could be made through the magazine release switch, for instance through a magazine release switch having a wiring aperture. It should be noted that FIG. 14 only shows one embodiment of the antenna 1403, and other shapes and locations of the antenna 1403 may also be implemented without departing from the scope or spirit of this disclosure. In one example, the firearm NFC antenna 1403 may be arranged on a bottom surface of the magazine well 1402 such that it is concentrically arranged around an NFC antenna on the magazine (e.g., the magazine NFC antenna is circumferentially arranged around an upper portion of the magazine such that it is roughly aligned with the firearm NFC antenna). In another example, the magazine NFC antenna may be installed on an outer surface of the magazine, while the NFC antenna may be arranged on an inside of the magazine well. In this case, the coils of the magazine well NFC antenna may curl or loop around an inner surface of the magazine well such that they are roughly aligned with the coils of the magazine NFC antenna coiled or looped around an outer surface of the magazine. In other words, the coils of the magazine well NFC antenna may be looped within the inner perimeter of the magazine well. In some aspects, the coils of the magazine well NFC antenna may appear to surround the coils of the magazine NFC antenna, for instance, if the two antennas are projected on to the same plane. In an alternative, the magazine NFC antenna may be arranged on an outer surface of the magazine, the circuit board comprising the processor and/or magnetic or Hall Effect switches may be arranged within the magazine, and a via or other conductive aperture in the magazine wall may enable an electrical connection between these inside and outside components of the magazine. Alternatively, a flat flex circuit configured to, for instance, descend down from the circuit board and wrap around a bottom edge of the magazine and turn upward and follow the outside surface of the magazine to reach the antenna may be utilized. In another structure, a first coiled antenna, such as an NFC antenna, may be installed at or near a flange on the magazine, where the first coiled antenna or the flange may be roughly aligned with another coiled antenna on the magazine well. A further embodiment could see a magazine well funnel or similar addition to the bottom of the magazine well, with sufficient thickness to house the firearm-side NFC antenna. In some embodiments, the antenna 1403 can be adhered to the magazine well 1402 during manufacturing of the firearm or in a retrofit process.

Although FIG. 14 shows an antenna 1403 on a flexible substrate shaped to fit within a depression 1404 unique to an AR-style magazine well, if the antenna 1403 is to be utilized in different platforms, then the antenna 1403 and flexible substrate can be tailored in shape and size to fit unique features of other magazine wells. In particular, the flexible substrate can be shaped and sized to tightly fit within a unique feature of another platform's magazine well, that may or may not include a depression such as depression 1404. For instance, where a firearm has a wider depression 1404, the flexible substrate can be formed to tightly fit within that wider depression 1404. The antenna 1403 may or may not also be enlarged. Further, since the antenna 1403 may be installed in a factory or by a user with less sophisticated and less accurate tools and means, the flexible substrate may be sized to tightly fit within a depression or other features of the magazine well, and this tight fit can make it easier for a worker or home user to align the antenna 1403 with an ideal position (i.e., in alignment with an antenna in the magazine). In some cases, the antenna 1403 and flexible substrate can be fabricated to fit multiple types, sizes, and shapes of magazine wells, where different magazine wells may have different depressions or other structural features, thereby each requiring a different flexible substrate shape and size. For such a universal antenna kit, one antenna 1403 may be used, but the flexible substrate may include lines, perforations, etc., which may be used to mark outlines on the flexible substrate for different platforms. Where a user needs to modify the flexible substrate to fit a different magazine well 1404, the user can cut along the lines or perforations and separate the "waste" flexible substrate to form a flexible substrate that tightly fits within a different magazine well 1404. Alternatively, the perforations may allow a user to pull the extra flexible substrate off.

Where a polymer or other non-metallic magazine well is used, a firearm-side of the NFC interface (i.e., a firearm-side of the NFC antenna) can be arranged on an outside of the magazine well. So far, the firearm-side of the NFC antenna has been described as arranged inside the magazine well—this being in large part because the metallic magazine well hampers wireless signals from the magazine to an outside of the magazine well. However, where the magazine well does not interfere with wireless signals (e.g., where the magazine well is non-metallic or is transparent to wireless signals), the NFC signals can be passed directly to an external antenna thus avoiding the compromises and design challenges of placing a firearm-side of the NFC interface within the magazine well and then having to route data and power to an outside of the magazine well.

Figure 15:
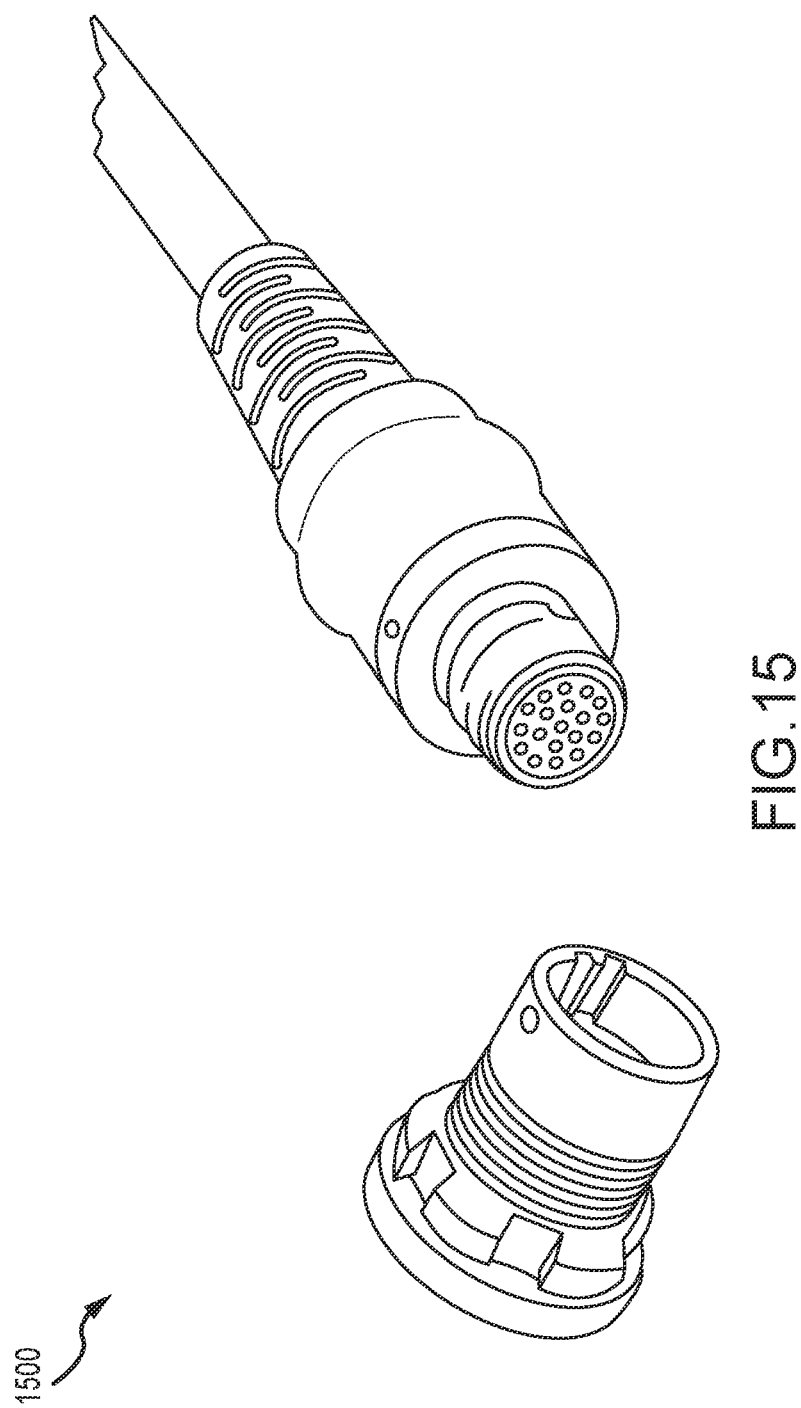
FIG. 15 illustrates a RF connector and cable for use with the NFC antenna and/or weapon system display.

FIG. 15 illustrates an example of a RF cable 1500 for connecting the antenna 1403 to a display mounted on the weapon. In some cases, the RF cable 1500 may be detachable, which may serve to provide strain relief on the antenna attachment. Additionally, or alternatively, the detachable cable 1500 may also comprise a connector with strain relief for attaching to the display. In some examples, connectors may be attached to both the antenna and display and connected via a RF cable.

Figure 16C:
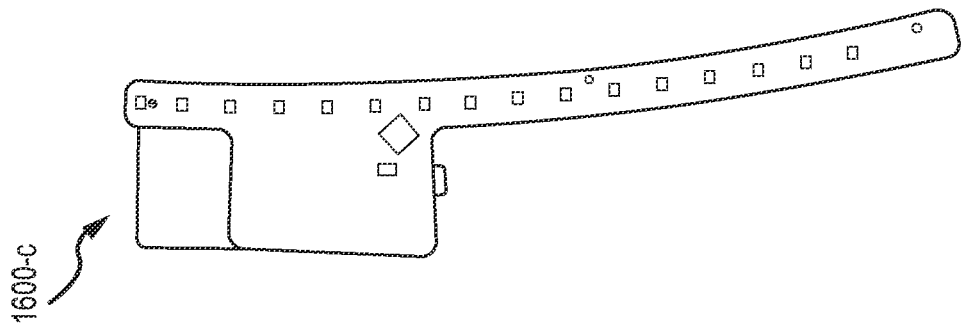
FIG. 16C illustrates an opposing view of FIG. 16B.
Figure 16B:
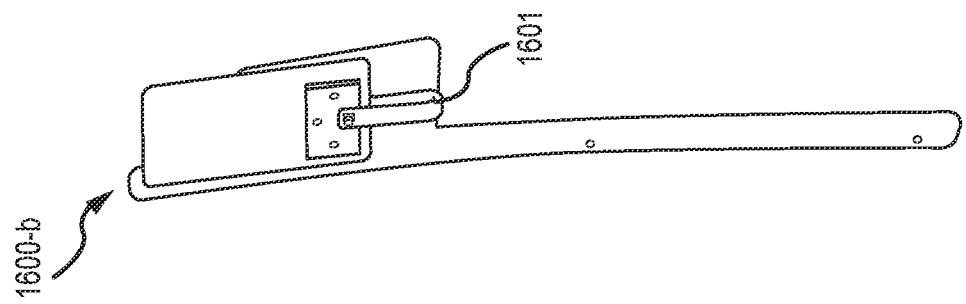
FIG. 16B shows an isolated view of a view the magazine circuit board and the firearm-side NFC circuit board.
Figure 16A:
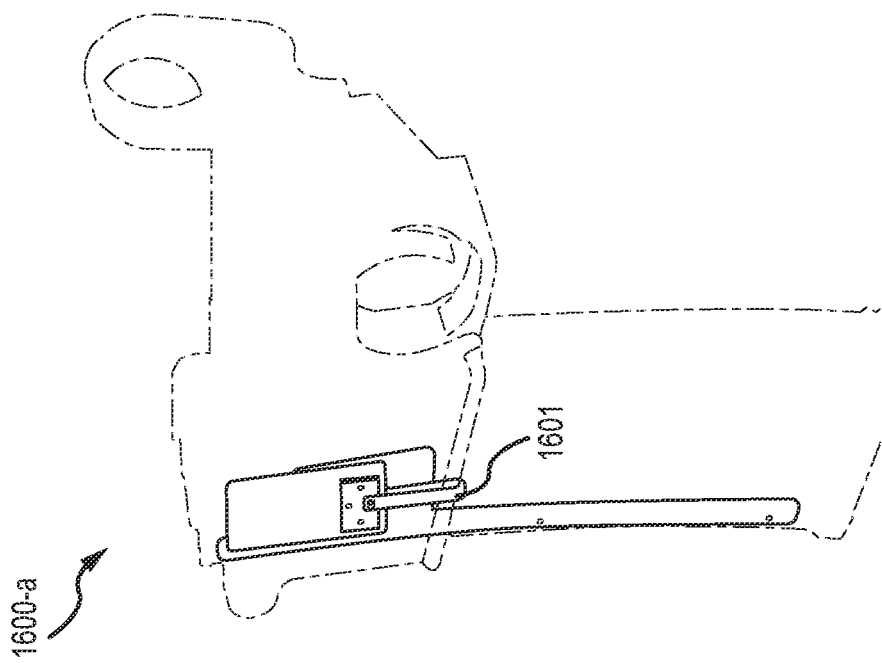
FIG. 16A a view the magazine circuit board and the firearm-side NFC circuit board flexing around the bottom of the magazine well.
Figure 17:
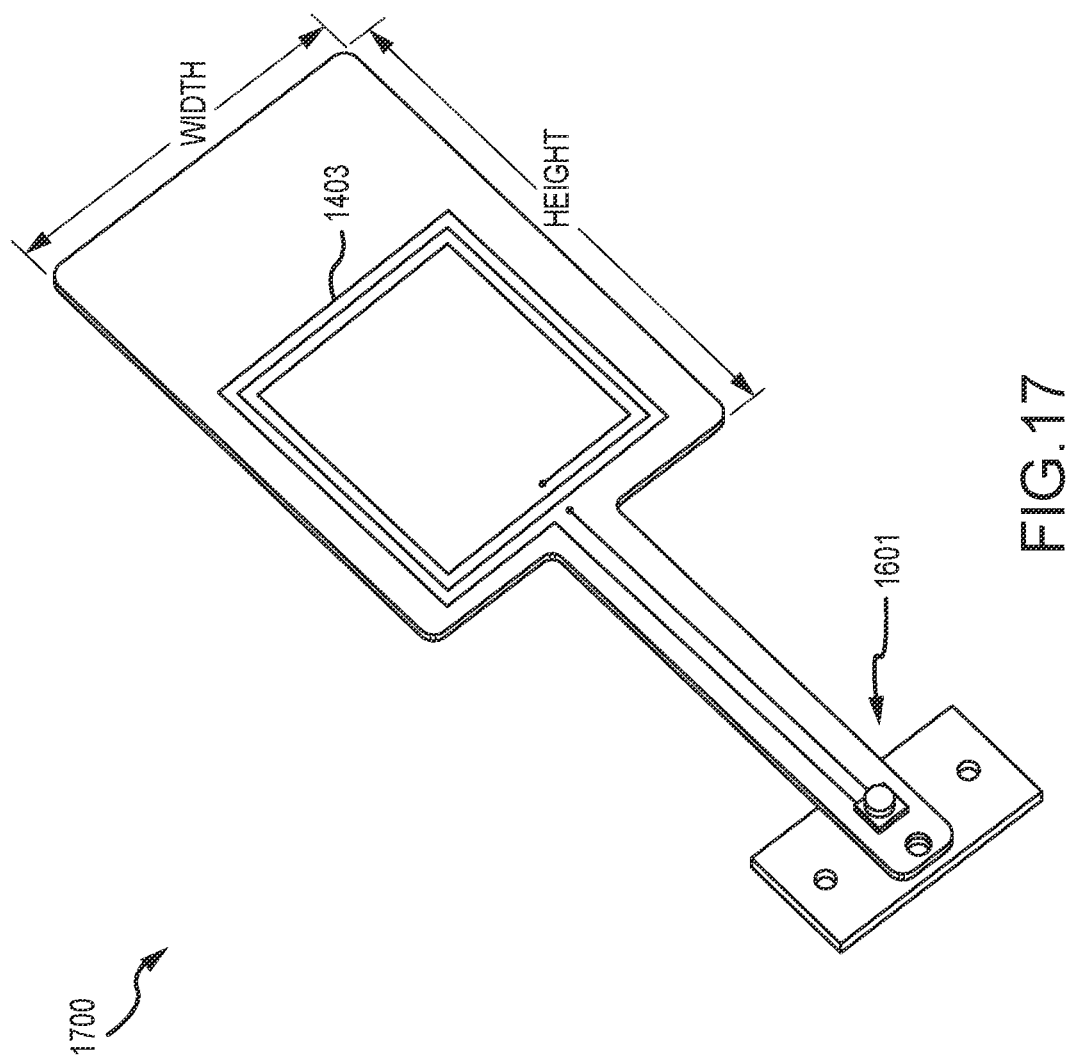
FIG. 17 is a detailed view of the NFC antenna and circuit board.

FIGS. 16A, 16B, and 16C illustrate different views of the NFC circuit board 1600-*a*, 1600-*b*, and 1600-*c*, respectively, flexing around the bottom of the magazine well (e.g., flexible lower portion 1601), and then affixed (e.g., stuck) to an outside of the magazine well where a connection to an RF cable, such as RF cable 1500 in FIG. 15, could be made. FIG. 17 illustrates a detailed view 1700 of an NFC antenna 1403 including the flexible lower portion 1601 of the circuit board that can be wrapped around the bottom of the magazine well. As described with reference to FIG. 14, the left side of an AR-15 magazine well may comprise a depression 1404 that does not contact the magazine and is just deep enough (e.g., Depth: 0.0175+/−0.0075 inches (0.44+/−0.19 mm), Width: 1.77 inches (45 mm), Height: 2 inches (50.8 mm)) to fit a thin substantially flat NFC antenna 1403 (e.g., Thickness: 0.010 inches (0.25 mm), Height: 1.6 inches (40.64 mm), W: 1.050 inches (26.67 mm)) without interfering with magazine insertion and removal. In some examples, the NFC antenna 1403 may be a microstrip patch antenna (e.g., copper, or another high conductivity material) fabricated on a dielectric substrate (e.g., ROGERS RT/DUROID or RO3000 or DiClad series composite/laminate, Gallium Arsenide (GaAs), GaN, epoxy, or any other composite or substrate for use in electromagnetic and high frequency applications). As shown, the antenna 1403 may encompass a smaller area than the main region of the circuit board. For instance, while the main portion of the circuit board in FIG. 17 has a height and a width, the antenna 1403 has a smaller width and a much smaller height (e.g., a height roughly half that of the main portion of the circuit board).

In some other cases, the flat NFC antenna 1403 may comprise a high conductivity trace (e.g., copper) fabricated on a substrate or a dielectric circuit board in the shape of a coil, a circle, an ellipse, or any other continuous shape. In some embodiments, a continuous metal layer (i.e., ground plane) may be bonded to the second side of the substrate (i.e., the one not comprising the antenna trace). At the minimum, the substrate thickness should be selected to ensure that the flat NFC antenna 1403 fits within the magazine well of the receiver. Furthermore, substrate material and thickness may also be selected based on one or more antenna performance parameters, such as resonant frequency, directivity, gain, return loss, bandwidth, etc. For instance, a high frequency (smaller wavelength) application may call for a thinner substrate than a lower frequency application. In addition to the substrate material/thickness, the 2-D geometry of the NFC antenna may also influence its radiation pattern, beam width, etc., and different shapes may be selected for different scenarios.

For instance, FIGS. 34-40 illustrate alternative NFC antenna patterns, though these different shapes have little influence on inductive coupling, power, etc. On the other hand, a number of turns in the NFC antenna can influence inductive coupling between both sides of the NFC interface. In some embodiments, the NFC antenna (e.g., magazine and/or firearm side) may also include a second layer of coils and may thus have a three-dimensional shape. Inductive coupling between the NFC antennas on either side of the NFC interface can be enhanced by increasing the number of coils, for instance. In some cases, the coil count of the NFC antennas may be increased radially or vertically (e.g., by adding layers to the NFC antenna(s)), which may serve to increase inductance and enhance coupling between the NFC antennas. Similarly, two NFC antennas may be arranged on the magazine, one on either side of the magazine, but wired in parallel such that they transmit the same signal to the firearm-side of the NFC connection. This doubling of the antennas sending the same signal may increase inductance and thus allow each of the pair of NFC antennas to be smaller than in embodiments where only one NFC antenna on the magazine is used.

In some embodiments, the magazine may include both an NFC antenna and a non-NFC antenna, such that longer-distance transmissions via the non-NFC antenna may also be made in parallel with or in lieu of the NFC transmissions. In another embodiment, a single NFC antenna could be configured to transmit both via NFC and via non-NFC means (e.g., see U.S. Pat. No. 9,793,616, which is incorporated herein by reference).

In some embodiments, the reader side of the NFC antenna (often the magazine well side of the interface) can include a larger antenna than the transmission side (often the magazine side of the interface). This difference in sizes allows for greater tolerance when placing both sides of the interface, since either can be somewhat off ideal alignment while still ensuring that all or a majority of the smaller antenna is always aligned with some portion of the larger antenna. For instance, the larger of the two antennas can be 30 mm×30 mm and the smaller can be 20 mm×20 mm. It should be noted that larger antennas draw greater power than smaller ones. Thus, a balance between ease of alignment and low power draw is desirable.

Figure 40:
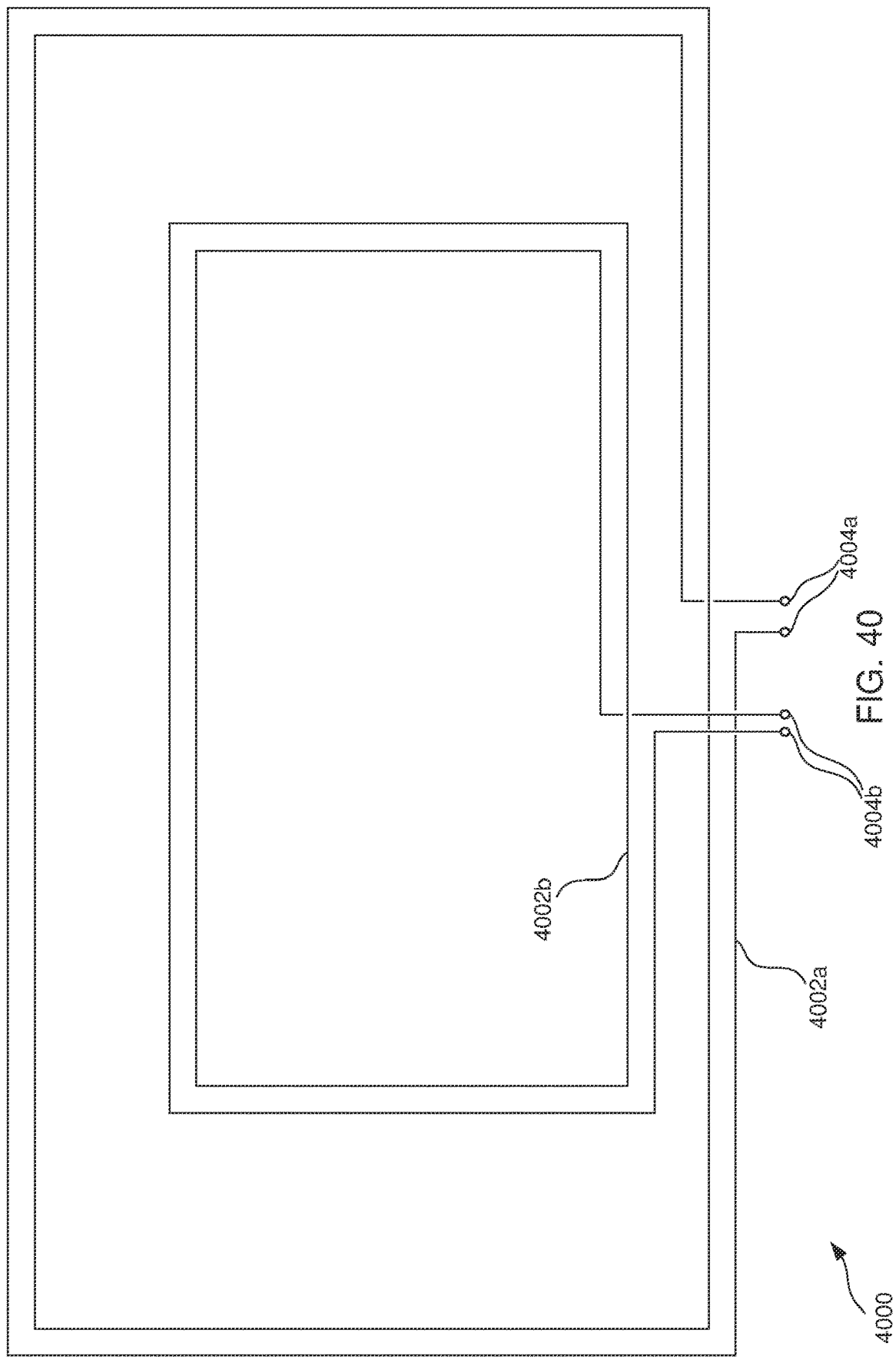
FIG. 40 shows an embodiment of an NFC antenna comprising two loops arranged in roughly concentric manners.

In other embodiments, the NFC antenna may include two distinct NFC coils on each of the transmitting and receiving sides of the interface (e.g., see FIG. 40). A first of these antennas can be configured to transmit data, while the second can be configured to transmit power. Similarly, an NFC antenna formed from two separate interfaces can increase coupling and thus data and power transfer. In this example, two separate interfaces implies two separate pairs of inductively coupled coils, for instance, a first pair of inductively coupled coils, and a second pair of coils that are also inductively coupled. In an embodiment, the magazine may include a first coil on a first side of the round stack (e.g., a first side of the magazine parallel to the firing direction of the firearm) and a second coil on a second side of the round stack (e.g., a second side of the magazine opposing the first side, where the second side is also parallel to the firing direction of the firearm). Furthermore, the magazine well may include a third coil on a first side of the magazine well that aligns and couples with the first coil in the magazine, as well as a fourth coil on a second side of the magazine well that couples with the second coil in the magazine. Alternatively, each of the two pairs of NFC antennas (e.g., two interfaces and four antennas) may be arranged at an angle (e.g., orthogonal or 90°) to the other pair, thereby minimizing coupling between the pairs. In some circumstances, arranging pairs of NFC antennas such that they are orthogonal to each other may serve to optimize signal-to-noise ratio (SNR). Additionally or alternatively, such an arrangement may also allow the two NFC antenna pairs to operate via different protocols and/or to communicate different data.

Figure 18:
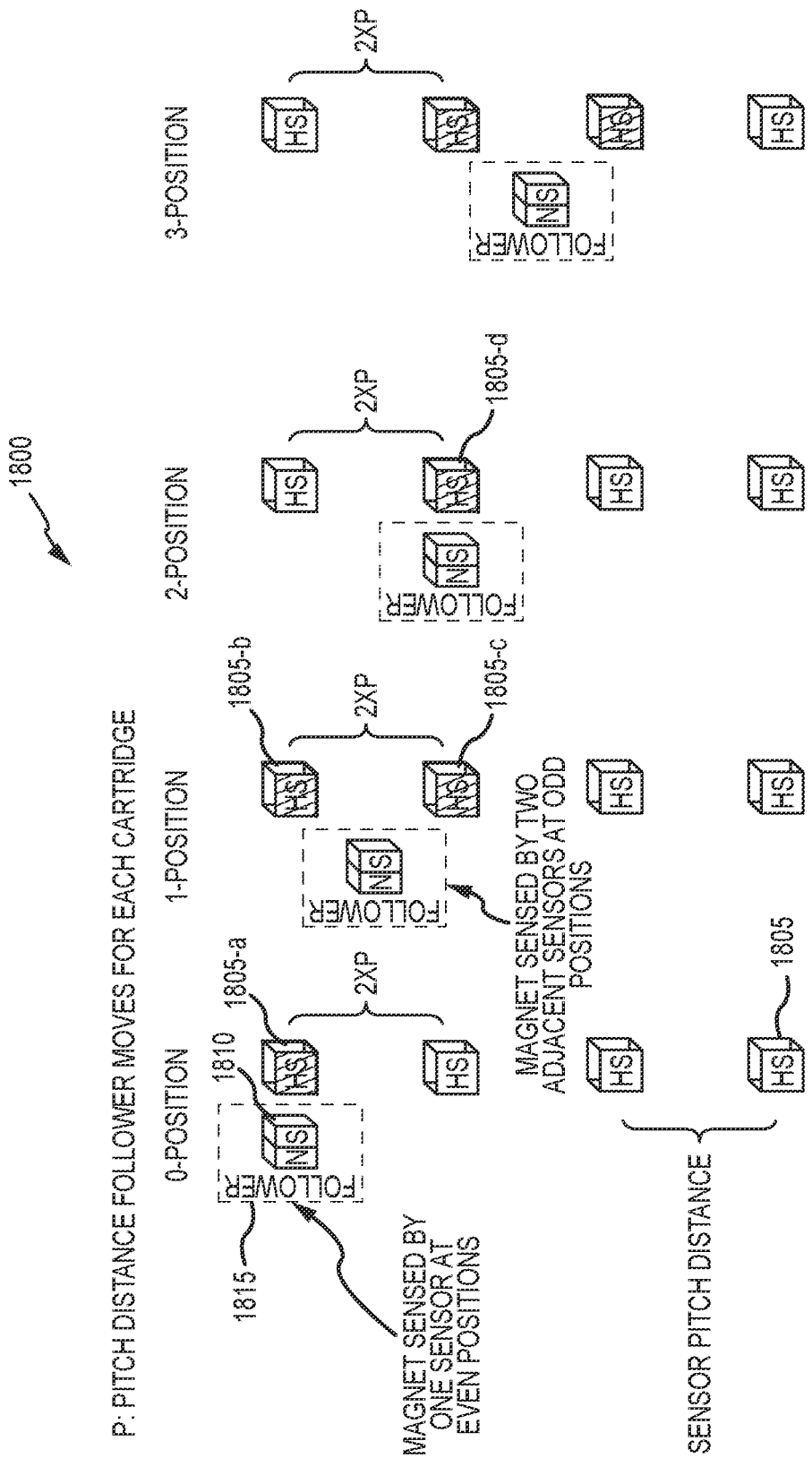
FIGS. 18, 19, and 20 illustrate magnetic position sensing using Hall effect sensors or switches for one, two, and three magnets on the follower, respectively.
Figure 19:
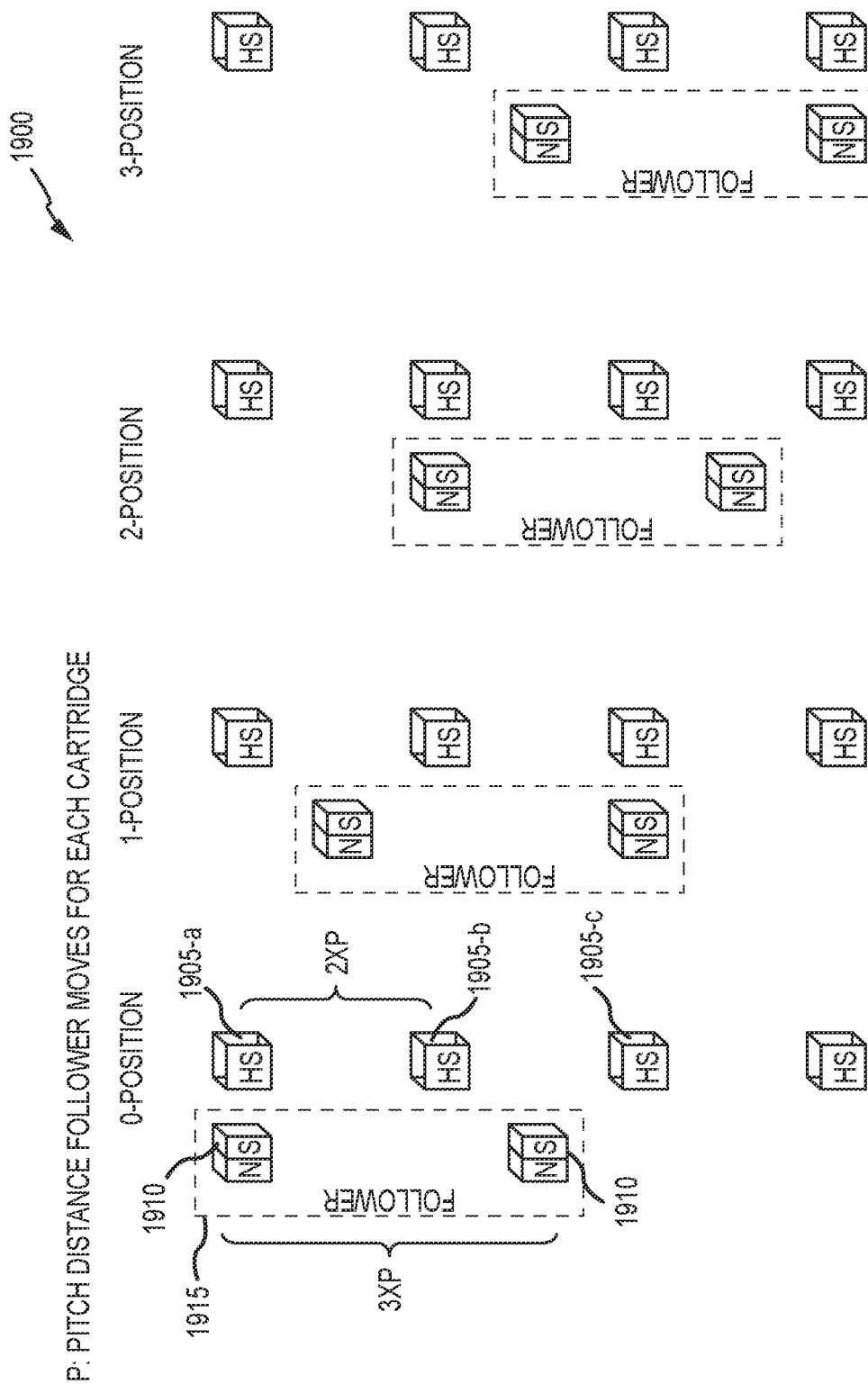
Figure 20:
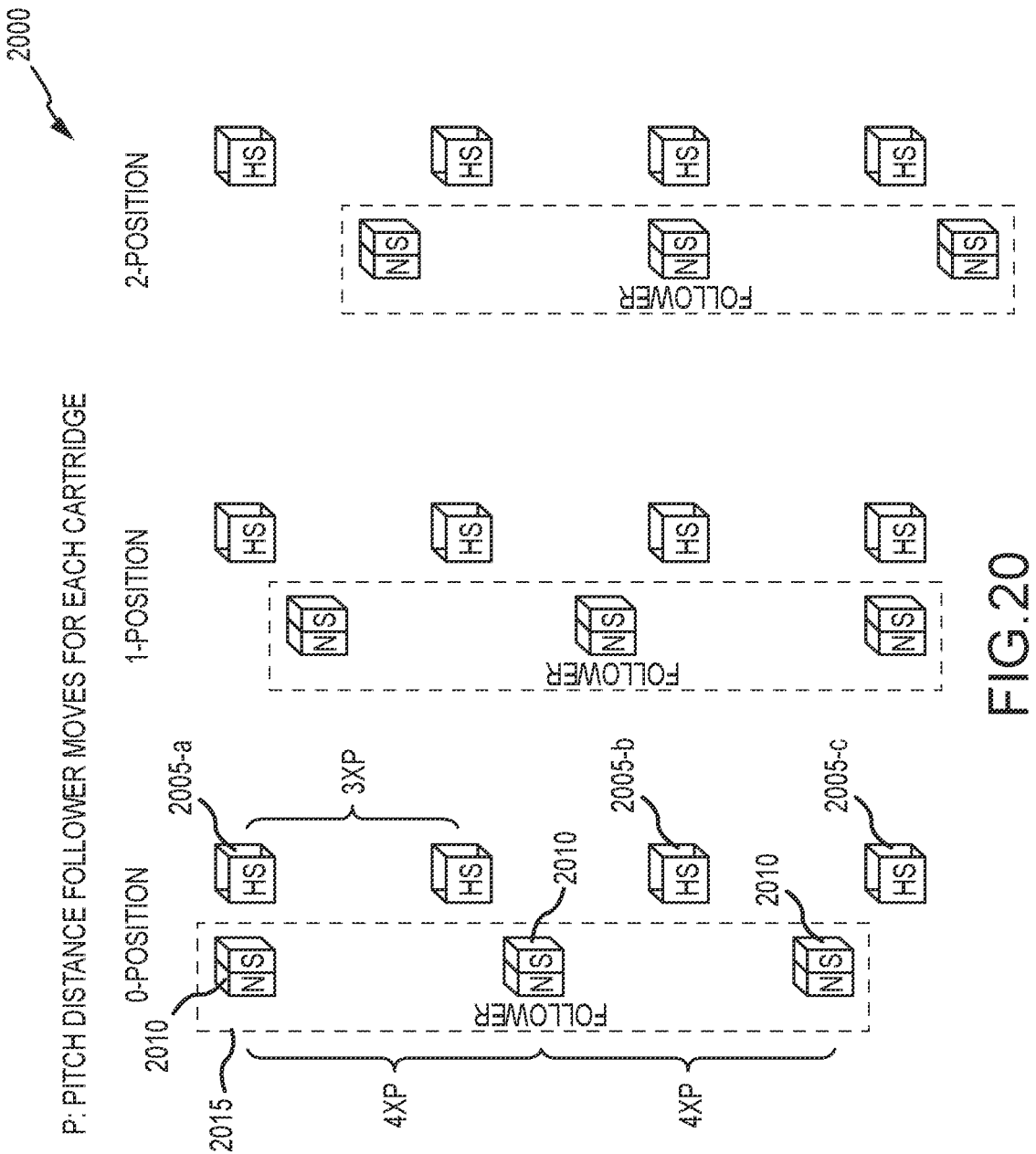

FIG. 18 illustrates magnet position sensing 1800 with Hall effect switches 1805, according to an embodiment of the disclosure, where a single magnet 1810 is positioned on a follower 1815 and a number of Hall effect switches 1805 is N/2 or N/2+1. In some cases, the magazine may be lined with magnets instead of hall effect switches. In such cases, one or more hall effect switches and associated electronics may be placed on the follower. As shown, at the 0-position (e.g., empty magazine), the magnet 1805 may be sensed by one sensor or switch 1805-*a*. Next, at 1-position, an odd position, the magnet 1805 may be sensed by two adjacent switches 1805-*b* and 1805-*c*. It should be noted that, in this example, 'P' is the pitch distance the follower 1815 moves for each round, and the switches 1805 are spaced two (2) pitch distances apart. Thus, at the 1-position the magnet 1810 on the follower 1815 would be approximately equidistant from the first two switches 1805-*b* and 1805-*c*. Similarly, at 2-position, an even position, the magnet may be in line with the second sensor or switch 1805-*d*, since it has moved two (2) pitch distances from the 0-position. Hence, it follows that for a single magnet 1810 on the follower 1815, the magnet 1810 is sensed by a single sensor or switch 1805 at even positions and sensed by two adjacent switches 1805 at odd positions. FIGS. 19 and 20 show different embodiments using two and three magnets 1910 and 2010 on the followers 1915 and 2015, respectively. FIG. 19 could also be implemented using Hall effect sensors where outputs of each sensor may be provided to a comparator such that only sensors seeing a certain signal strength would register as an active sensor.

As noted above, unlike Reed switches, hall effect switches may need a power supply in order to operate. For efficient power management of Hall switches, only the switches that are actively sensing a magnet may need to be powered. When a magnet leaves the currently active sensor, the sensor generates a digital signal (e.g., an interrupt). In such cases, since the active switches for the next states may be known, only those switches may be activated until the location of the magnet on the follower has been determined. Thus, the amount of current drawn by the switches may be minimized, improving battery life. In some circumstances, an accelerometer may be installed to wake up the round counting system. For instance, the accelerometer may be configured to detect movement of the follower, allowing the Hall effect switches to be shut off when the weapon is inactive or during storage. Additionally or alternatively, the Hall switches may be shut off after some period of inactivity (e.g., 30, 60, 90 seconds, etc.), and the last active Hall sensor may be polled periodically (e.g., every 10, 20, 30 seconds, etc.) to check for a change of state prior to resuming operation. In yet other cases, an accelerometer may be coupled to the follower, where the accelerometer may be in electronic communication with the magazine processor. Further, the accelerometer may be configured to identify an upward "jerking" motion of the follower, which may be indicative of a topmost round in the magazine being loaded into the chamber following the firearm being fired. In such cases, the magazine processor may subtract the current round count by 1 based on the measurements from the accelerometer. In some cases, the accelerometer coupled to the follower may only provide acceleration readings that exceed a threshold, which may serve to filter out false positive readings associated with normal movement of the firearm. In some examples, the data from the Hall-effect switches may be used in conjunction with other data, including, but not limited to, capacitance data related to an air gap between the follower and the floor plate, spring inductance data, and/or accelerometer data to identify when a round count needs to be updated (e.g., subtracted by 1).

FIG. 19 illustrates magnet position sensing 1900 with Hall effect sensors or switches 1905, according to an embodiment of the disclosure where two magnets 1910 are positioned roughly three (3) pitch distances apart on the follower 1915. As shown, in 0-position, the magnet may be sensed by the first three (3) sensors or switches 1905-a, 1905-b, and 1905-c, where an output from the first sensor 1905-a may have the highest magnitude and the outputs from the second and third sensors 1905-b and 1905-c of equal but smaller magnitudes. Further, at 1-position, the first and second sensors 1905 may have an equal magnitude and the third sensor 1905 may have a larger magnitude. In this way, the processor or MCU hardware may be able to distinguish between 0-position and 1-position, even though the same number of sensors 1905 are active, for instance, by using a comparator. Similar to FIG. 18, N/2 or N/2+1 Hall effect switches may be deployed in such a setup.

FIG. 20 illustrates magnet position sensing 2000 with Hall effect switches 2005, according to an embodiment of the disclosure. In this example, three magnets 2010 are positioned four (4) pitch distances apart on the follower 2015 (or between three (3) and four (4) pitches apart). Further, N/3 hall effect switches 2005 may be needed in such a setup. Similar to FIGS. 18 and 19, a processor may be able to determine the follower 2015 position and subsequent round count based on analyzing and comparing the outputs from the active switches 2005. In the 0-position, switches 1, 2, and 4 (i.e., switches 2005-a, 2005-b, and 2005-c) may be active. Similarly, in the 1-position, switches 1, 3, and 4 are active. In the 2-position, switches 2, 3, and 4 are active. Hall effect sensors could also be implemented in this embodiment. Although more complicated than FIG. 19 from a magnet and processing standpoint, FIG. 20 could provide a less expensive solution since fewer Hall effect switches/sensors 2005 are needed (e.g., N/3 v. N/2).

In both of the examples of FIGS. 19 and 20, a stronger magnet capable of triggering more switches than a weaker magnet may be used. As a result, it may be possible, for instance, for the follower magnet to trigger three Hall effect switches at a time, and less than three Hall effect switches when the follower is in other positions. This embodiment may allow more accurate sensing of follower position or may allow for fewer Hall effect switches to be used (e.g., <N/2 switches).

FIG. 21 illustrates an example of a display housing 2101 mounted on the weapon, according to an embodiment of the disclosure. As shown, the display housing 2101 may comprise a screen or a display (see FIG. 22) with a user interface including display graphics and control buttons. In some examples, the display housing 2101 may be used to indicate the round count 2201, round fired since last reset 2202, a fuel gauge round count indicator 2203 for quick reference along the side and/or top of the display, etc. The user interface/display may also implement features such as a flashing indicator when the round count falls below a threshold (e.g., 9 rounds or less), or the ability to change the brightness (i.e., set by the user, or auto set based on ambient light). For instance, different colored lights may be used to indicate round count or a range of remaining rounds in the magazine. A scope, such as a red dot scope, could include one or more LEDs around its periphery that provide indication of round count. In another embodiment, a ring of light around the scope could be used to indicate round count (e.g., via brightness, color, or number of LEDs that are lit). These visual indicators could also be integrated into the sighting optics or overlaid onto the sighting optics (e.g., via an add-on device such as COTI Thermal overlays). Audio and haptic feedback indicators can also be used in addition to or in place of light indicators.

In some cases, a user may make changes to the display type using one or more buttons. The user interface may also be capable of communicating wirelessly (e.g., Bluetooth) with other devices, for instance a device on another soldier's weapon/body or a commanding unit. The display housing 2101 may be powered via an internal battery and this same battery may provide power through the NFC connection to the magazine. The display housing 2101 may alternatively receive power from a battery stored in the stock or in the pistol grip of the firearm. In some embodiments, power can be provided via an electrified accessory rail.

As previously described, in some embodiments, the display housing may be configured to indicate a round count for a plurality of magazines registered by the firearm (e.g., a distinct round count for each magazine or an aggregated total for all the magazines). In some examples, upon insertion of a magazine into a magazine well of the firearm, the NFC antenna in the magazine well may be configured to receive a unique identifier associated with the magazine, for instance, from the magazine processor and/or the NFC antenna in the magazine. In some cases, the unique identifier and magazine round count may be stored by the firearm processor in its internal memory or another memory device electronically coupled to the firearm. In some cases, the user may be able to view round count indications for a plurality of magazines previously used by the same user (or other users) in the firearm. For instance, the display housing 2101 may display multiple round counts for multiple magazines on a red dot scope display, to name one non-limiting example.

Figure 23:
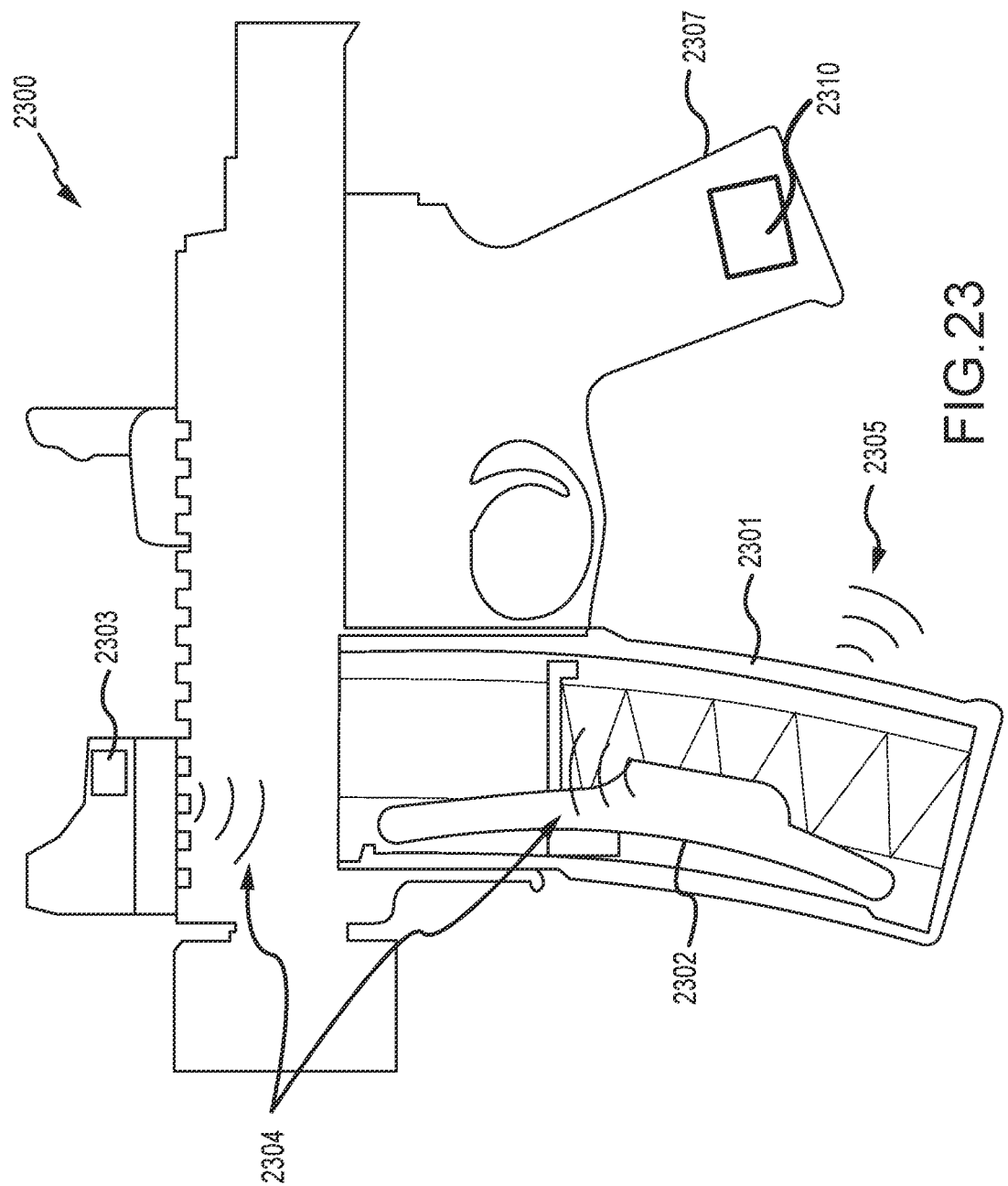
FIG. 23 illustrates a round counting system utilizing a wireless mesh network communication system for transmitting information from the magazine sensing circuitry to a display on the weapon or to/from other magazines.

FIG. 23 illustrates a wireless mesh network communication system 2300 for communication from a magazine 2301 to a weapon system 2303 (e.g., to the weapon system circuitry and display), or for communicating between the magazine 2301 and other devices or even other magazines (not shown). Magazine sensing circuitry 2302 may establish a wireless mesh network 2304 for magazine to weapon communication, such as, for transmitting and displaying a magazine round count on the weapon system 2303. In some cases, the weapon system may comprise at least a display housing, similar to display housing 2101 described in relation to FIGS. 21 and 22. Additionally, or alternatively, magazine sensing circuitry 2302 may establish wireless mesh network 2305 for communication with other magazines. In some cases, magazine sensing circuitry 2302 may be an example of the round counting systems or magazine processing circuits described with reference to any of the figures herein.

Wireless mesh networks 2304 and/or 2305 may operate using the Thread protocol, Bluetooth Low Energy (BLE) protocol, or Zigbee protocol, to name a few non-limiting examples. In some circumstances, the magazine 2301 may normally be in a sleep state (i.e., to conserve power). Further, if the number of rounds in the magazines changes (increases or decreases), the magazine may wake up, send out a new round count to the weapon system 2303, as well as a unique magazine ID, and then return to a sleep state. In some cases, the waking up procedure may be based in part on an accelerometer in the weapon or magazine 2301 being triggered. In one example, the accelerometer may be installed on the follower, although other locations are contemplated in different embodiments. In some cases, the accelerometer on the follower may also be utilized in conjunction with other data (e.g., from magnetic or Hall effect switches) to deduce an accurate round count. In some cases, the magazine 2301 may also report a round count and unique ID to any other nearby magazines or firearms on mesh network 2305. The magazine sensing circuitry 2302 may be embedded on a side of the magazine 2301 along with a battery source. Alternatively, as shown, the battery source 2310 may be in the grip of the firearm. In yet other cases, the battery source may be at or near, or in the display or weapon system 2303. It should be noted that the battery source 2310 may be rechargeable or chargeable (i.e., primary or secondary type).

Figure 24:
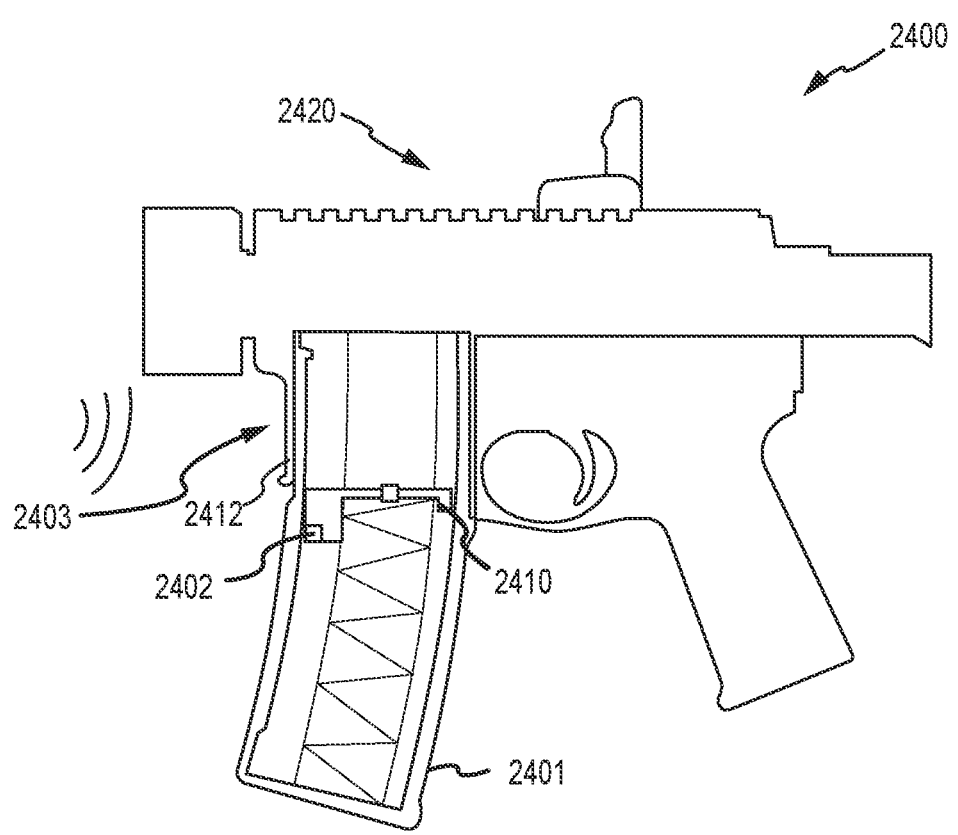
FIG. 24 is a side view of a firearm receiver and a detachable magazine, illustrating a round counting system utilizing an ultra-high frequency or millimeter-wave (mmW) transceiver, according to an alternate embodiment of the disclosure.

FIG. 24 illustrates a round counting system 2400 utilizing an ultra-high frequency (UHF) radar or mmW transceiver (e.g., operating around 60 GHz), according to an embodiment of the disclosure. In some circumstances, a mmW transceiver may transmit electromagnetic waves and analyze their reflection from objects, which may be referred to as active scanning. In some other cases, a mmW transceiver may create images or detect objects using only ambient radiation and/or radiation emitted from human body or objects, which may be referred to as passive scanning.

As shown in FIG. 24, a firearm 2420 may comprise a magazine 2401, an object 2402 with a high radar profile installed on a follower 2410 of the magazine 2401, as well as a slot opening 2403 in the front of the magazine well 2412. A mmW transceiver may be used to detect the position of the follower 2410 within the magazine 2401 by emitting UHF waves (the slot opening 2403 can allow the UHF waves to pass through the magazine well 2412) and subsequently detecting the reflected waves. In some cases, the follower position (and round count) may be determined based on the time required for the reflections (i.e., time delay), phase of reflected waves, any frequency changes, etc. In other words, by analyzing subtle changes in the reflected signal over time, the mmW transceiver and its processing circuitry may be used to accurately locate the position of the follower 2410 within the magazine 2401, and hence the round count.

Figure 25:
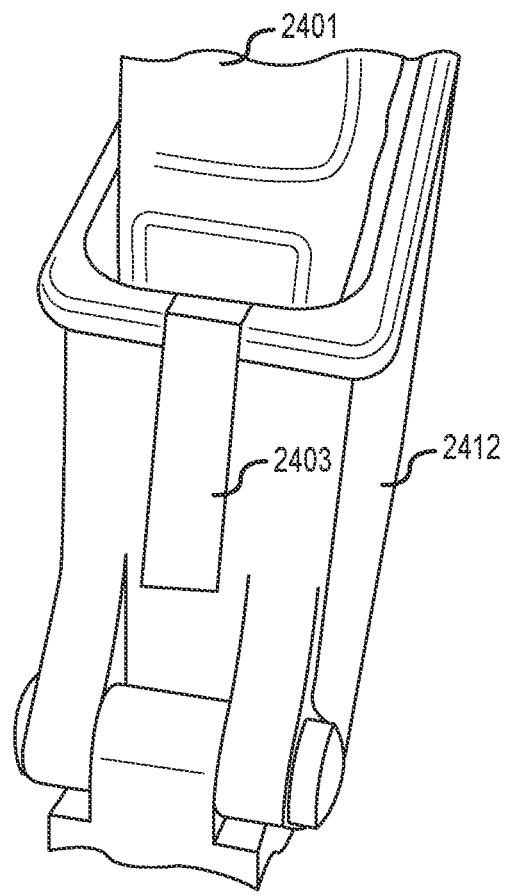
FIG. 25 is a detailed view of the magazine well in FIG. 24, illustrating the slot opening.

In some cases, the mmW based round counting system 2400 may need limited modifications to the magazine 2401, besides the addition of the high radar profile object 2402 on the follower. Further, since the mmW transceiver is placed on the weapon and all the processing is done on the reflected waves received at the transceiver, no battery may be needed in the magazine. However, such a system may require minor modifications to the magazine well (i.e., slot opening 2403 in the magazine well 2412, also seen in FIG. 25), and overall power requirements may be comparable to or greater than using Hall effect switches in the magazine, albeit less than RFID tags.

Figure 26A:
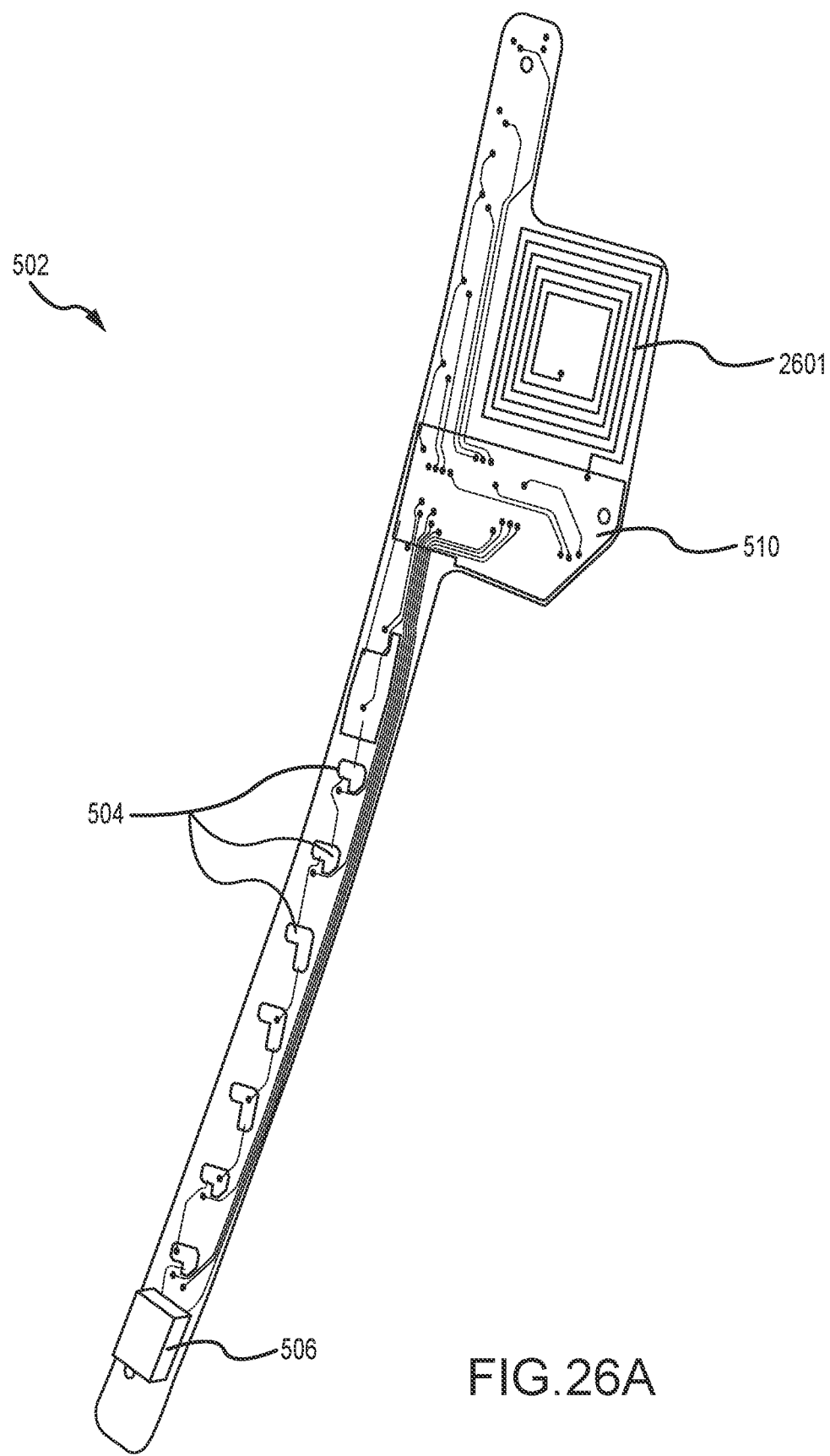
FIG. 26A is a front view of the magazine board in FIG. 5, illustrating the PCB layout.
Figure 26B:
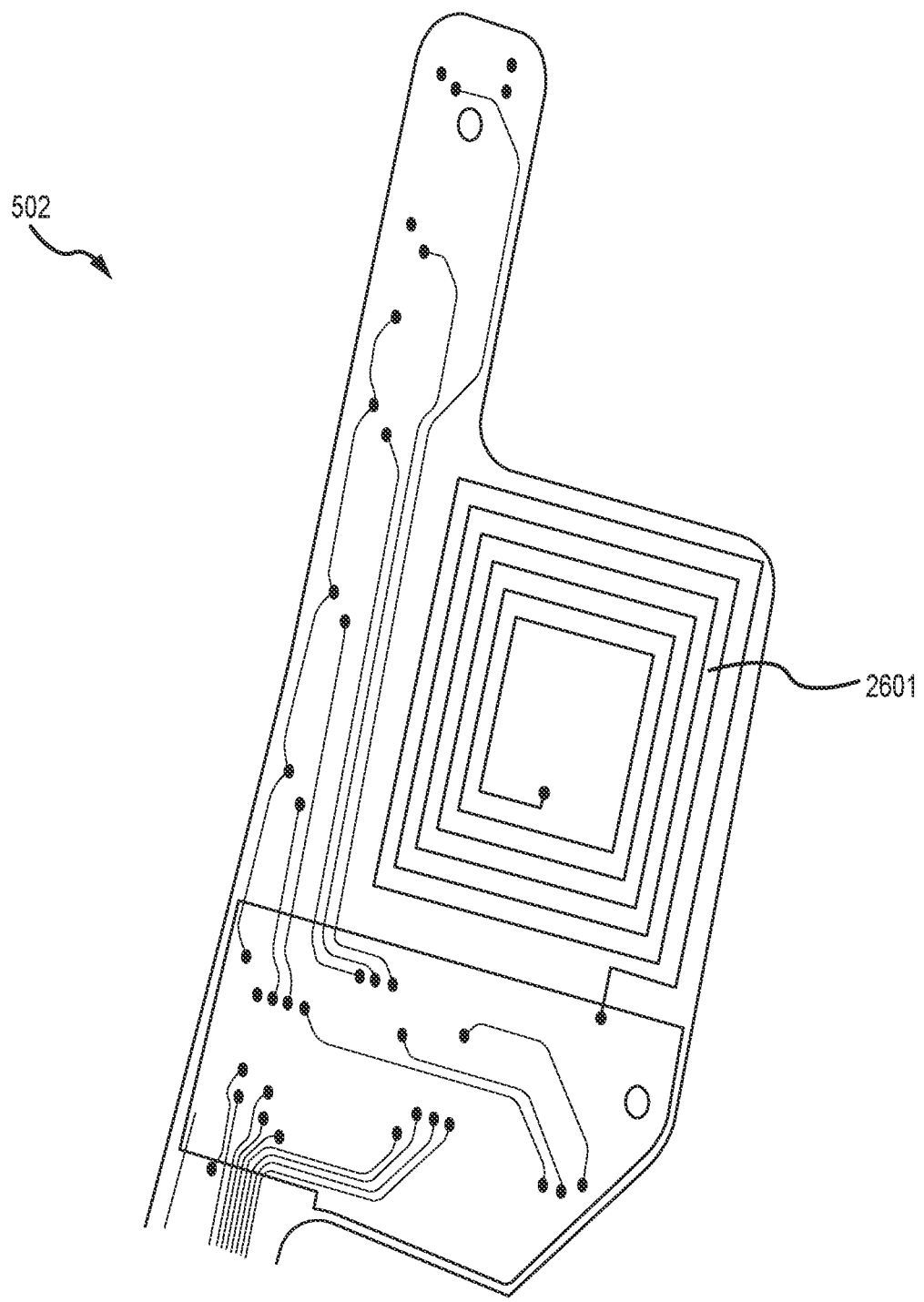
FIG. 26B is a detailed view of the magazine board in FIG. 26A.

FIG. 26A is a front view of the magazine board 502 in FIG. 5, illustrating the PCB layout and a substantially flat antenna 2601, such as an NFC antenna. FIG. 26B is a detailed view of the NFC antenna 2601 of the magazine board 502 in FIG. 26A.

Figure 27A:
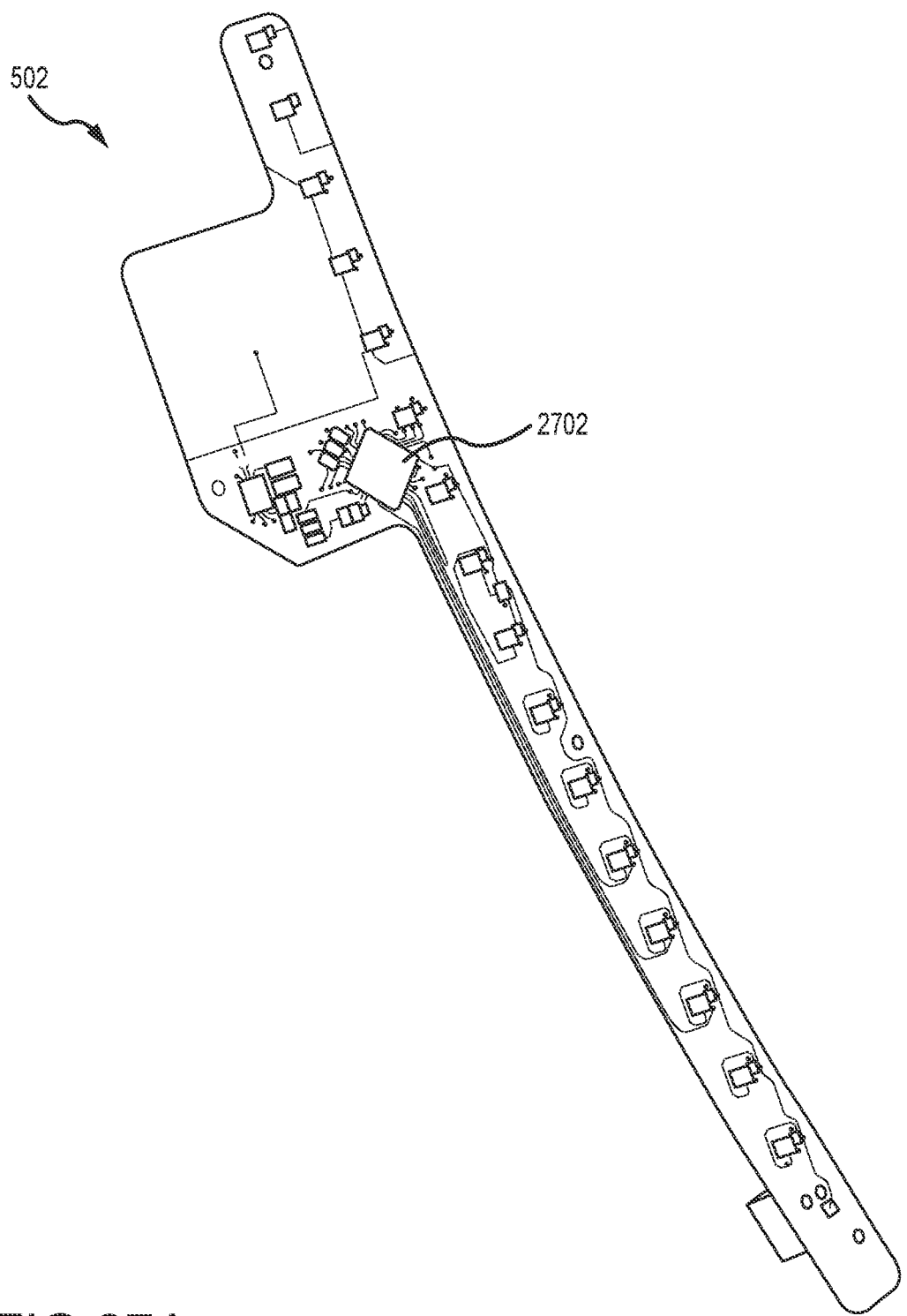
FIG. 27A is a rear view of the magazine board in FIG. 26A, illustrating the PCB layout.
Figure 27B:
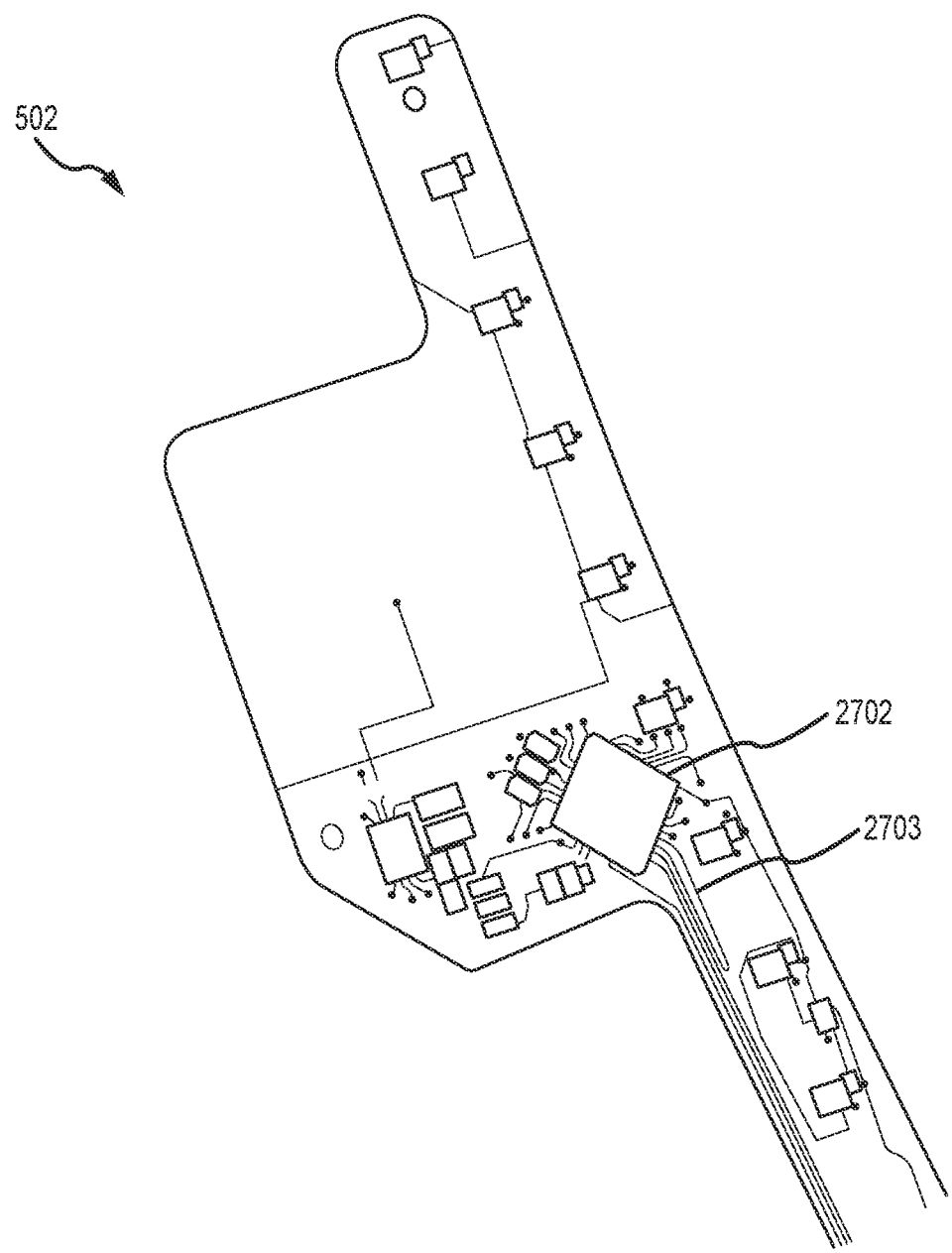
FIG. 27B is a detailed rear view of the processing circuit of the magazine board in FIG. 27A.

FIG. 27A is a rear view of the magazine board 502 in FIG. 26A, illustrating a magnetic processing circuit 2702 of the magazine board. FIG. 27B is a detailed view of the magnetic processing circuit 2702 in FIG. 27A. An example of the magnetic processing circuit 2702 is the processor 6108 in FIG. 6. The magazine board in FIGS. 26 and 27 may be the circuit board 510 seen in FIG. 5 or the circuit board seen in FIGS. 12 and 13 or also as seen in FIG. 16.

Some jurisdictions impose regulations limiting the number of rounds a magazine can have (e.g., 10 rounds or less, 30 rounds or less, etc.). In such cases, separate round counting systems may need to be produced for the 10-round and 30-round magazines (i.e., with different number of Hall effect switches or sensors, or Reed switches). While the number of switches or sensors may need to vary for different magazine sizes, a single PCB may be able to accommodate the two sizes. In some cases, the magnetic processing circuit 2702 may comprise an extra loop 2703 which may be severed (e.g., for a smaller magazine), and retained for a larger magazine. In some other cases, the extra loop 2703 may be formed when connecting two pins on the magnetic processing circuit 2702. In such cases, the extra loop 2703 may be initially left as 'open' for a smaller magazine (i.e., the two pins are left unconnected or open) and 'shorted' prior to installation in a larger magazine (or vice versa). In some embodiments, the two pins may be shorted via soldering (i.e., soldering two ends of a wire to the first and second pins), or the two pins may be connected to each other using the same bus on the PCB. In this way, only a single PCB may need to be designed and produced, and the extra loop may serve to optimize production of different versions of the magazine and round counting system.

The circuit boards shown in FIGS. 26 and 27 can be adhered to an inside of a magazine during manufacturing or in a retrofit process. For instance, the circuit board may be thin enough to slip inside the magazine and adhere it to the inner surface thereof, such that the circuit board does not interfere with operation/movement of the follower. Alternatively, a recess shaped to accept the circuit board can be formed on an inside of the magazine, for instance, via drilling or CNC milling.

FIG. 28 illustrates a block diagram 2800 of an embodiment of the round counting system including a magazine 2801 with a magazine circuit board (also shown as magazine circuit board 502 in FIGS. 5, 26, and 27), a substantially flat antenna, such as an NFC antenna 2802 on the firearm, and a display assembly 2803.

The magazine 2801 may comprise one or more magnets 2804 and a follower. The magnets may be installed on the follower along with an optional accelerometer. Further, the magazine circuit or circuit board can include a number of Hall effect switches 2805 equal to a number of follower positions (i.e., a number of rounds) or <N Hall effect switches 2805 (e.g., N/2, N/3, N/4, N/2+1, N/3+1, or N/4+1). The circuit board or assembly may also include a processor comprising MCU 2806 and an EEPROM 2807, and an NFC antenna coil 2809-*a*. The NFC antenna coil may be fabricated on a printed circuit board. In some examples, the EEPROM 2807 may be an integrated circuit (IC). Optionally, the circuit may also include a filter 2808 and an NFC controller (e.g., NFC tag 2807).

The NFC antenna system 2802 on the firearm can include an NFC antenna coil 2809-*b*, whose area may substantially overlap with an area of the NFC antenna coil 2809-*a*. The NFC antenna system 2802 may also include a connector 2810, a coax (or RF) cable 2811, and a plug RF connector 2812-*a*. The one or more subcomponents of the NFC antenna system 2802 may be interconnected to each other via one or more buses. In some cases, both power and data may be exchanged using the one or more buses.

The display assembly 2803 can include a RF connector 2812 for reception from the NFC antenna 2802, as described with reference to FIGS. 14 and 15. The display assembly 2803 may also include an NFC reader 2813, a MCU reader 2814, a regulator 2815, a battery 2816, an accelerometer 2817 (optional), an ambient light sensor 2818 (optional), an EEPROM 2819, a Bluetooth module 2820, a backlight 2821, a display (e.g., Memory In Pixel (MIP)) 2822, and one or more menu buttons 2823. As illustrated, the one or more subcomponents of the display assembly 2803 may be connected via one or more buses to the MCU reader 2814. In some embodiments, a separate NFC connection may be used between the firearm and the display assembly 2803, thereby simplifying digital connection between the display assembly 2803 and the firearm (e.g., eliminating the need for a wired connection between the display assembly 2803 and the NFC receiver on the magazine well).

Figure 29:
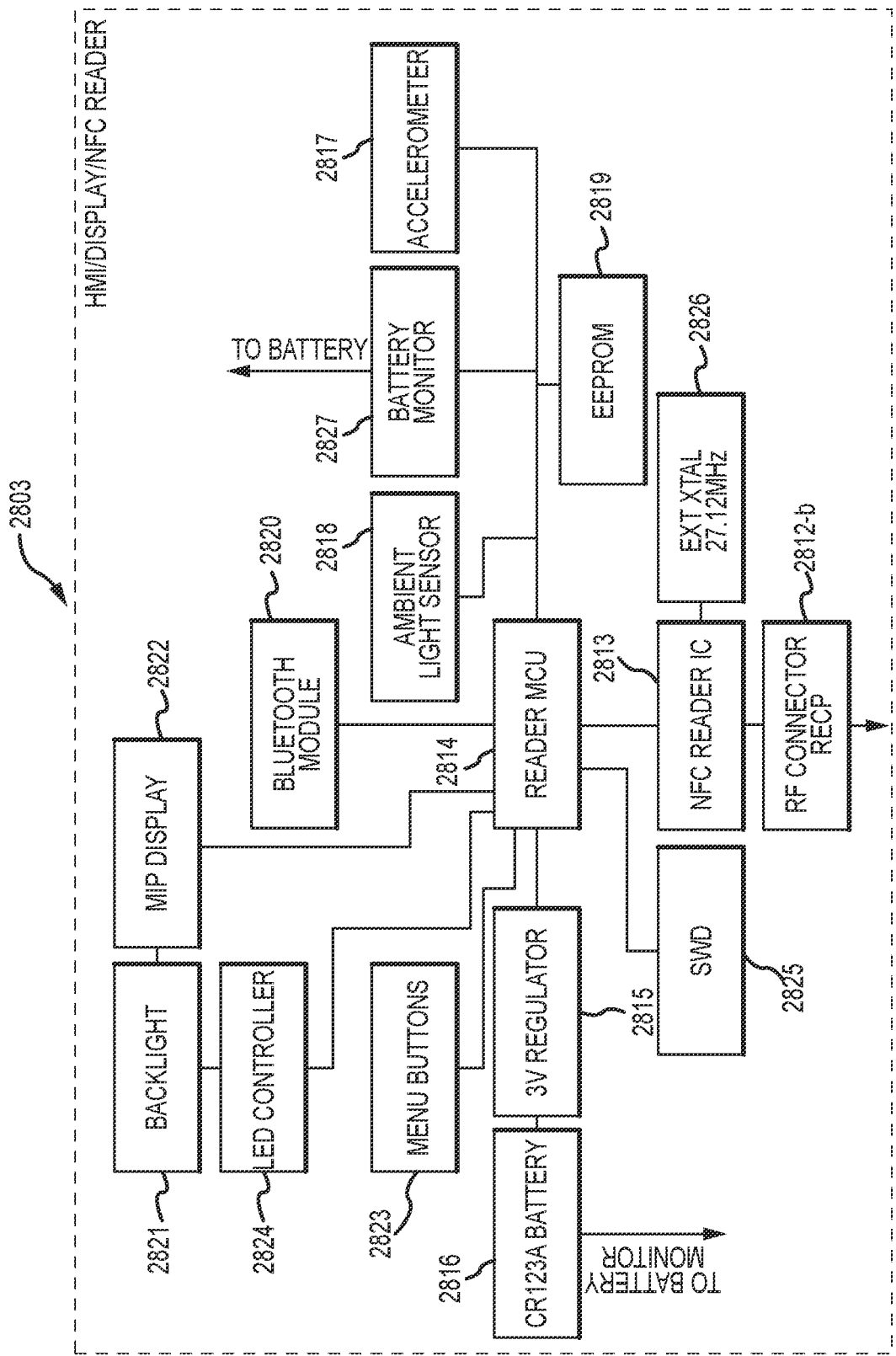
FIG. 29 is a low-level system block diagram of the display in FIG. 28.

FIG. 29 illustrates a lower level block diagram of an embodiment of the display assembly 2803. As illustrated, the one or more subcomponents of the display assembly 2803 may be connected via one or more buses to the MCU reader 2814.

The display assembly 2803 can include a RF connector 2812-*b* for reception from the NFC antenna system 2802 (not shown), further described with reference to FIGS. 14 and 15. The display assembly 2803 may also include a MCU reader 2814 in connection with NFC reader 2813, a regulator 2815, one or more menu buttons 2823, LED controller 2824, an accelerometer 2817 (optional), an ambient light sensor 2818 (optional), battery monitor 2827, an EEPROM 2819, a Bluetooth module 2820, and a display (e.g., Memory In Pixel (MIP)) 2822.

Further, the regulator 2815 (e.g., 3V regulator) may be connected to the battery 2816, which may be in connection with the battery monitor 2827. In some examples, the LED controller 2824 may be connected to the backlight 2821, where the backlight brightness may be adjusted based on an output from the ambient light sensor 2818. In some examples, the MCU reader 2814 may also communicate with a Serial Wire Debug (SWD) interface to enable a tester to gain access to system memory, peripheral, and/or debug registers. In some circumstances, the NFC reader 2813 may connect to an external crystal oscillator or clock 2826 (e.g., operating at 27.12 MHz), which may be used in lieu of a built-in internal oscillator of the MCU Reader 2814 or the NFC reader 2813. In some cases, built-in oscillators may be susceptible to errors when serial communication is being used, or when a fast clock or exact timing is needed, and the external clock 2826 may be used to improve accuracy.

Figure 30:
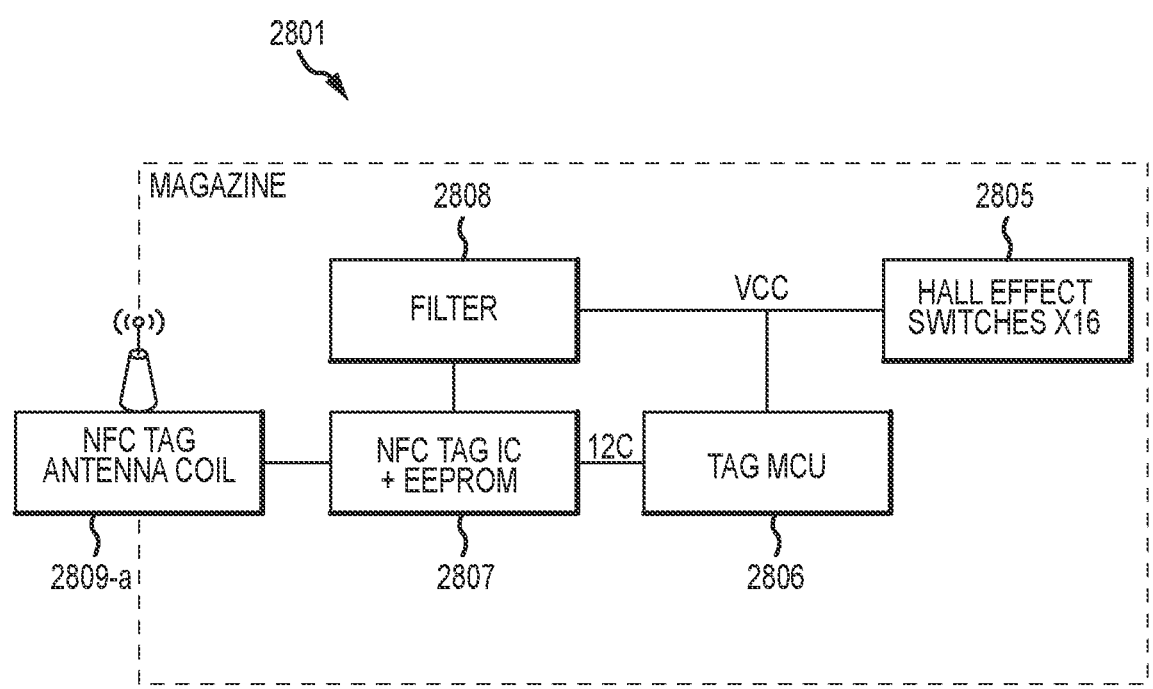
FIG. 30 is a low-level system block diagram of the magazine in FIG. 28.

FIG. 30 illustrates a lower level block diagram of an embodiment of the magazine 2801. FIG. 30 implements one or more aspects of the figures described herein, including at least FIG. 28B.

Turning now to FIG. 31, a method 3100 of manufacturing a magazine with a round counting system is now described. In some cases, the magazine may comprise at least an overtravel stop and a follower, where the follower comprises one or more magnets.

The method may include arranging 3102 magnetic-field-sensing sensors (e.g., <N magnetic switches or sensors) substantially along a path of the one or more magnets when the follower moves along a length of the magazine, where N is a maximum number of cartridges that can be loaded in the magazine, the sensors generating round count data based on a position of the one or more magnets relative to the magnetic-field-sensing sensors. In some cases, magnetic switches, such as Hall effect switches, may be utilized in place of sensors.

The method may also include arranging 3104 a first substantially flat antenna on an inside of the magazine at or above the overtravel stop (or in a region of the magazine that is configured to fit at least partially within a magazine well of the firearm), the first substantially flat antenna configured to wirelessly transmit a round count indication from the magazine to a second substantially flat antenna on the firearm, the round count indication based on the round count data. In some examples, the second substantially flat antenna may transmit power in the reverse direction to the data flow to the first substantially flat antenna, for instance, from a power source located on the firearm (e.g., firearm grip). In this way, the magnetic processing circuitry and sensors in the magazine may receive power without needing a power source in the magazine.

Further, the method may include arranging 3106 the first substantially flat antenna such that an area of the first substantially flat antenna, defined by a height and width, primarily aligns with an area of a second substantially flat antenna coupled to an inside of a magazine well of the firearm.

FIG. 32 illustrates a method 3200 of installing a round counting system on a firearm. The method may comprise installing 3202 a detachable magazine comprising at least an overtravel stop and a follower, the follower comprising one or more magnets.

The method may further comprise arranging 3204 magnetic-field-sensing sensors (e.g., <N) substantially along a path of the one or more magnets when the follower moves along a length of the magazine, where N is a maximum number of cartridges that can be loaded in the magazine, the sensors generating round count data based on a position of the one or more magnets relative to the magnetic-fieldsensing sensors. Similar to FIG. 31, in some embodiments, magnetic switches, such as Hall effect switches may be utilized in lieu of sensors.

In some cases, the method may comprise arranging 3206, at or above the overtravel stop (or in a region of the magazine that is configured to fit at least partially within a magazine well of the firearm), a first substantially flat antenna on an inside of the magazine. The method may also comprise installing 3208 a second substantially flat antenna on an inside of a magazine well of the firearm such that an area of the first substantially flat antenna and an area of the second substantially flat antenna are mostly aligned, where the first and second substantially flat antennas are configured to exchange a round count indication based on the round count data as well as power via a near-field-communication (NFC) connection.

It should be noted that, the methods 3100 and 3200 can be OEM or retrofit procedures.

FIG. 33 illustrates a method 3300 for obtaining the number of rounds in a magazine utilizing a round counting system with a Hall effect switch array. The method 3300 may be carried out via one or more processors receiving computer readable instructions from one or more tangible programmable computer readable media. The processors may receive data from and provide data and instructions to other portions of the system, such as from the Hall effect switch array. At a minimum the system includes a processor on or in the magazine for assessing data from the array of Hall effect switches. In some cases, this processor may be referred to as a magazine processor. Additionally or alternatively, the processor can be on the firearm. Furthermore, at a minimum, the system includes the array of Hall effect switches and an electrical data connection between the switches and the processor. If on the magazine, the magazine processor may be configured to transmit round count data to a wireless interface that spans an air gap between the magazine and the firearm. This may include an NFC interface with two opposing NFC antennas, one arranged on or in the magazine and one on the firearm (e.g., within the magazine well). The firearm side of the NFC interface can be configured to pass the round count to a second processor (i.e., a firearm processor) that is on the firearm. The round count can be used in various ways from this second processor (e.g., sending instructions to a display or sending the round count off firearm).

In some embodiments, the number of switches deployed in method 3300 may be <N, but this is not required. Furthermore, method 3300 may be carried out via analogue devices within the magazine, analogue devices outside the magazine (e.g., on the receiver or a scope), digital devices within the magazine, digital devices outside the magazine (e.g., on the receiver or a scope), or a combination of analogue and digital devices. For instance, analogue sensors, such as Hall effect switches can be used to generate analogue signals that a digital processor can analyze to determine a position of the follower, the last cartridge, and hence a number of rounds remaining in the magazine. It should be noted that N represents the round capacity of the magazine. In some cases, the method may comprise identifying 3302 a number of active Hall effect switches. In some circumstances, a processor, such as a magazine and/or a firearm processor, may be used to assess the signals from the array of Hall effect switches.

The method may further comprise determining 3304 the position of a follower comprising a magnet within the magazine based on identifying the number of active Hall effect switches. For instance, if a single Hall effect switch is active, then the processor may be programmed to identify a first round count based on the active signal from a single Hall effect switch (e.g., the "0" or "2" positions in FIG. 18), where each Hall effect switch either provides a unique signal or each Hall effect switch is coupled to a different input on the processor. Either way, the processor is configured to distinguish between a signal from each of the various Hall effect switches. In some cases, the processor may be configured to store an association between each Hall effect switches' signal and the remaining rounds occurring when a respective switch is aligned with the magnet on the follower in memory (e.g., on the processor, or another memory device in electronic communication with the processor). Alternatively, there may be two Hall effect switches active (e.g., the "1" or "3" position in FIG. 18). In this case, the processor may be programmed to associate this identification of a second round count based on the two active signals from the two adjacent Hall effect switches. In some other cases, if two Hall effect switches are active, the follower may be roughly between the two switches, as illustrated in FIG. 18.

Although the method 3300 only refers to a single magnet interacting with one or two Hall effect switches, in other embodiments, more than two magnets may be used. For instance, two magnets as shown in FIG. 19, or three magnets as shown in FIG. 20.

In some cases, the method may also comprise obtaining 3306 the number of rounds in the magazine based on determining the position of the follower within the magazine. For instance, using the two scenarios described in 3304, a processor may be able to distinguish between each and every cartridge position, even where <N Hall effect switches are used.

Figure 41:
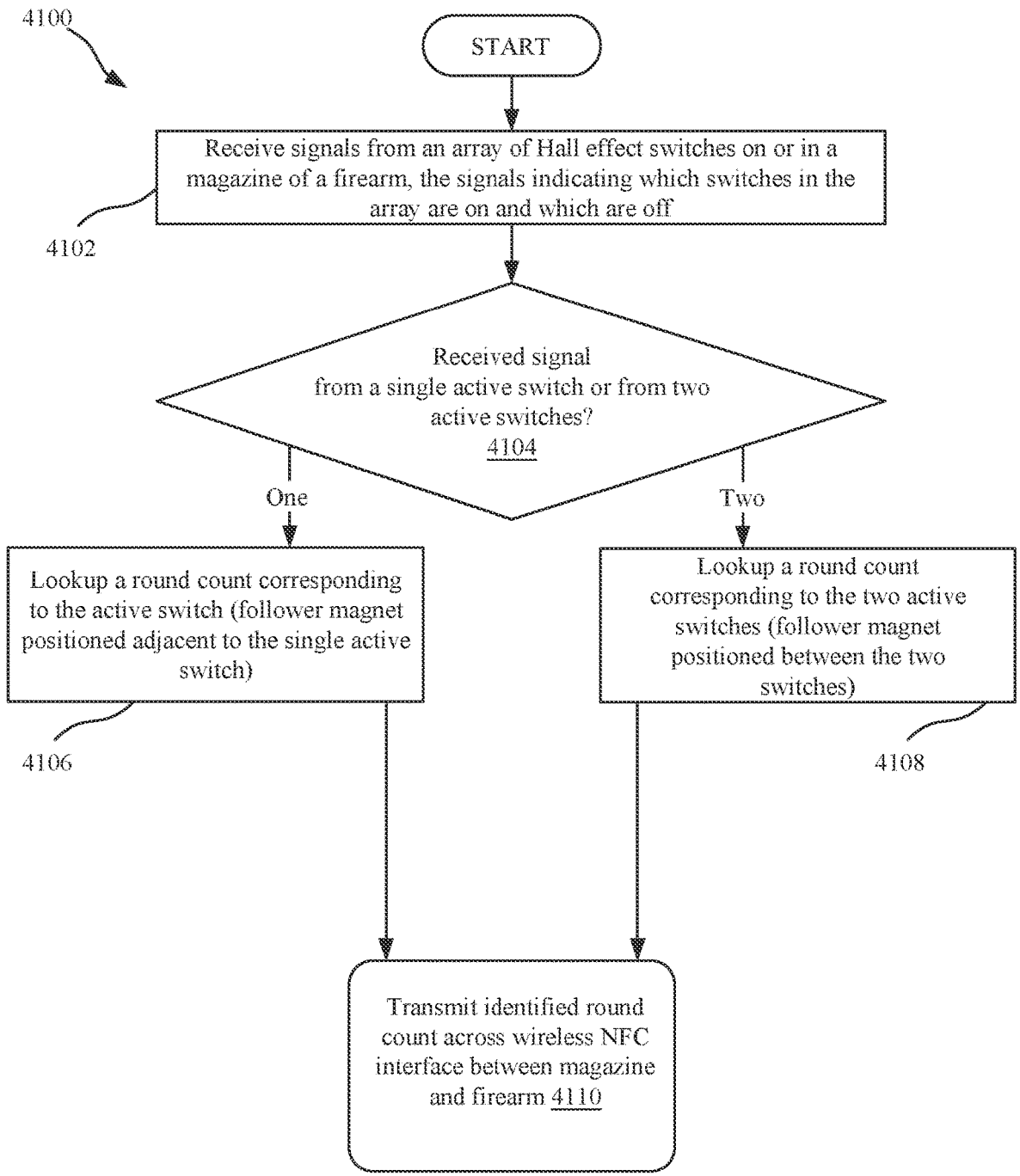
FIG. 41 illustrates a method of performing round counting using an array of sensors or Hall effect switches, a processor, and a wireless NFC interface between a magazine and a firearm.

FIG. 41 illustrates a method 4100 for obtaining the number of rounds in a magazine utilizing a round counting system with a Hall effect switch array. The method 4100 may be carried out via a processor receiving computer readable instructions from one or more tangible programmable computer readable media. In some cases, the computer readable media may be arranged on the processor or on the same system-on-chip as the processor. The processor may receive data from and provide data and instructions to other portions of the system, such as from the Hall effect switch array. At a minimum the system includes a processor on or in the magazine, also referred to as a magazine processor, for assessing data from the array of Hall effect switches. In some cases, the processor can be on the firearm, and may be referred to as a firearm processor. At a minimum, the system may further include the array of Hall effect switches and an electrical data connection between the switches and the processor, such as the magazine processor. If on the magazine, the magazine processor may be configured to transmit round count data to a wireless interface that spans an air gap between the magazine and the firearm. This may include an NFC interface with two opposing NFC antennas, one arranged on or in the magazine and one on the firearm (e.g., within the magazine well). In some embodiments, the firearm side of the NFC interface can be configured to pass the round count to a second processor that is on the firearm. The round count can be used in various ways from this second processor (e.g., sending instructions to a display or sending the round count off firearm).

The processor, such as the magazine processor, can be configured to monitor signals from the Hall effect switches in the array to determine a round count in the magazine. These can be analogue signals. Alternatively, the analogue signals may first pass through an analogue-to-digital converter, thereby providing a digital signal to the processor. In some embodiments, the processor is configured to analyze a number of different signal configurations from the Hall effect switches. However, to reduce a number of switches used, the processor may be configured to determine a round count based on signals from fewer switches (or sensors) than a number of cartridges that can be loaded into the magazine. For instance, N, can be defined as a maximum number of rounds that a magazine can hold. In an embodiment, there can be N/2 switches, and the processor can be configured to determine an accurate round count based on signals from N/2 switches (or sensors). This allows a fewer number of switches per round positions thereby reducing cost. However, to implement this cost reduction, the processor may need to determine round positions in the magazine by distinguishing between positions aligned or adjacent to a switch and positions that are between two switches.

In some circumstances, when one or two signals are received by the processor (Block 4102), the processor may be configured to first determine whether one or two signals were received (Decision Block 4104). Decision 4104 may entail determining whether one or two signals are received (i.e., whether a magnet on the follower is aligned with one switch or is aligned with a position between two switches). If the processor determines that a single switch is active, it may be configured to query a lookup table with an identification of the active switch and receive a round count in response (Block 4106). Alternatively, if the processor determines that two magnetic switches are active, it may be configured to query the lookup table with identifications of the two active switches and receive a round count in response (Block 4108). In some cases, other techniques for matching a set of signals to a corresponding value may be implemented without departing from the scope of this disclosure. In some embodiments, the magazine processor can be configured to transmit the round count corresponding to the active switch or active switches via an NFC antenna or another substantially flat antenna in the magazine. In some cases, this can include transmitting (Block 4110) the round count across a wireless NFC interface to another processor, such as a firearm processor, that can convert the round count to display instructions that instruct a display to indicate the round count via a display or other means, as described in relation to FIGS. 21 and 22 for instance.

As previously described, in some cases, the NFC interface can include a magazine-side of the NFC interface, which may include a first NFC or other type of antenna (e.g., a first substantially flat antenna), and a firearm-side of the NFC interface, which may include a second NFC or other type of antenna (e.g., a second substantially flat antenna). In some embodiments, the magazine-side antenna can be arranged within the magazine, for instance within a depression in the magazine covered with an insulating or dielectric material such as a similar polymer to that which could form the magazine. In some other cases, the magazine-side antenna (i.e., the first substantially flat antenna) and/or the circuit board or circuit assembly coupled to the antenna may be overmolded by the same material used to form the magazine. In some examples, the firearm-side antenna (i.e., the second substantially flat antenna) can be arranged within a magazine well of the firearm. In some cases, the first substantially flat antenna may be arranged in a region of the magazine that is configured to fit at least partially within a magazine well of the firearm and parallel to a firing direction of the firearm. Furthermore, both the first and second substantially flat antennas can be roughly aligned such that one antenna (e.g., the firearm-side antenna) completely covers the other antenna (e.g., the antennas are aligned, and one antenna is larger than the other antenna). The firearm-side antenna may be arranged on a circuit board or flexible circuit board and be shaped and sized to self-align with features of the magazine well such that the firearm-side antenna can easily be installed by a factory worker or user and still maintain alignment with the magazine-side antenna.

In another aspect of the disclosure, a round-counting kit can be added to a firearm. In one embodiment, the kit can include a modified magazine and an antenna that is attachable to the firearm. In another embodiment, the kit can include a replacement follower for an existing magazine, a magazine sub-assembly, and an antenna that is attachable to the firearm. A method of retrofitting a firearm with the kit can include replacing a follower of the firearm's magazine with a follower having a magnet or adding a magnet to the existing follower. The retrofit may also include adding a Hall effect switch array to the magazine. This addition may include sliding a thin circuit board into the magazine and adhering it to an inside surface of the magazine in a final position similar to that seen in FIG. 5. Alternatively, holes can be drilled through a side of an existing magazine into the interior of the magazine such that a Hall effect switch can be secured within each hole. A processor can then be affixed to an inside or outside of the magazine, and electrical leads can be formed between the switches and the processor. For instance, these leads could pass along an exterior surface of the magazine and could be individually attached or deposited on the magazine's surface. Alternatively, the leads may be attached as part of a single thin circuit board affixable to an exterior of the magazine, yet in electrical communication with the Hall effect switches. For instance, a small amount of fluid conductor could be deposited in each hole above and in contact with each Hall effect switch to act as an electrical "via" between each switch and an exterior surface of the magazine. A circuit board or electrical leads could then be conductively coupled to these vias and to the processor. In another alternative, an inside or outside surface of the magazine can be hollowed out or initially formed with an elongated depression. A circuit board can then be affixed to a surface of the depression and the circuit board can be over molded thereby securing it to the magazine and protecting the board from impact, corrosion, dirt, etc. In another embodiment, conductive ink can be printed directly onto the magazine surface or into the depression previously mentioned in lieu of the circuit board.

While the circuit board or circuit assembly (e.g., PCB, Hall Effect switches, processor, and/or magazine antenna) has mostly been described as being inside the magazine, in other embodiments, these components can be split between an inside and outside of the magazine. For instance, the Hall Effect switches and the processor may be arranged inside the magazine and the NFC antenna can be arranged on an outside surface of the magazine. Alternatively, the Hall Effect switches can be arranged inside the magazine and the processor and antenna can be arranged on an outside surface of the magazine. In any of these variations, a flexible circuit board may be utilized, where the flexible circuit board or assembly may wrap or fold around a bottom of the magazine to provide an electrical path for data and/or power between the interior and exterior components of the magazine. Alternatively, one or more vias may be used to connect the interior and exterior components of the magazine. In some cases, fewer vias than a number of Hall Effect switches can be used. In such cases, multiplexing may be used to send multiple signals from the plurality of Hall Effect switches through a single via to the processor on the outer surface of the magazine. In some embodiment, the processor, such as the magazine processor, may be configured to recover the separate signals via a process called demultiplexing (or demuxing). In some cases, a via may refer to any hole or opening between the inside and outer surface of the magazine, wherein the hole or opening is filled, or mostly filled, with a conductive material.

Furthermore, in some cases, the processor may include or may be coupled to an antenna such as an RF or NFC antenna. Additionally, another substantially flat antenna, such as an NFC antenna, can be affixed (e.g., glued) to an inside of the magazine well, for instance as shown in FIG. 14. In some embodiments, a flat thin flexible wire/conductor from the antenna can be wrapped or folded around a lower edge of the magazine well, thereby providing an electrical connection to components on an outside of the firearm, such as a display. In this way, a firearm and magazine can be retrofitted such that the herein disclosed round counting systems and methods can be implemented on a firearm that otherwise did not have a round counting system.

While the NFC antenna is often shown as a flat coil structure (e.g., see FIG. 14), various other antenna shapes can be implemented without departing from the scope of the disclosure. FIGS. 34-40 show some variations in the antenna (e.g., the flat coiled antenna seen in FIG. 5, antenna 1403 in FIGS. 14 and 17, and the flat coiled antenna seen in FIGS. 26A and 26B).

Figure 34:
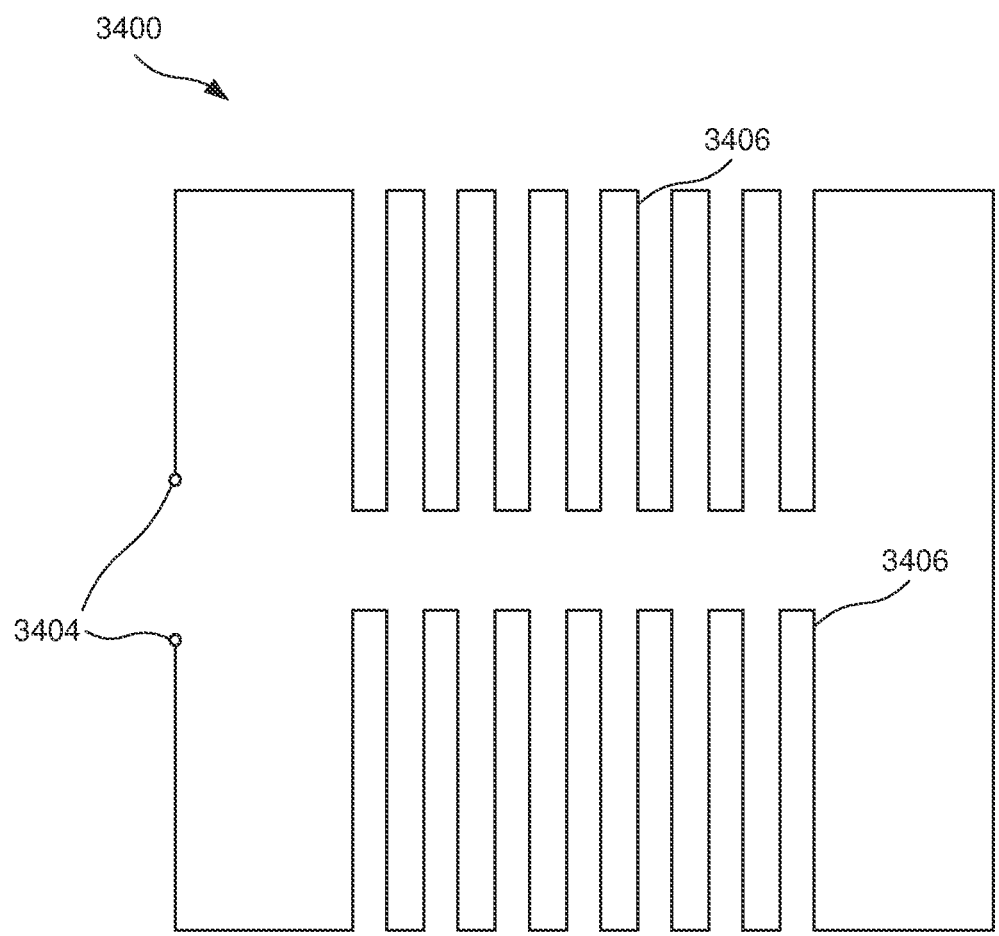
FIG. 34 shows an embodiment of an NFC antenna roughly forming a loop, but with a number of jogs that help to increase inductive coupling and flux between this antenna and a corresponding one (not shown) on an opposing side of the NFC interface.

FIG. 34 shows an embodiment of an NFC antenna 3400 roughly forming a loop, but with a number of jogs 3406 that serve to enhance inductive coupling and flux between this antenna 3400 and a corresponding one (not shown) on an opposing side of the NFC interface. As shown, the NFC antenna 3400 may include two input/output connections 3404. Further, the NFC antenna 3400 may comprise a conductive trace fabricated on a substrate or a dielectric circuit board, where the respective conductive trace comprises a loop and the one or more jogs 3406. This illustration helps to show that other topologies besides a flat coil may be utilized for the NFC antenna.

Figure 35:
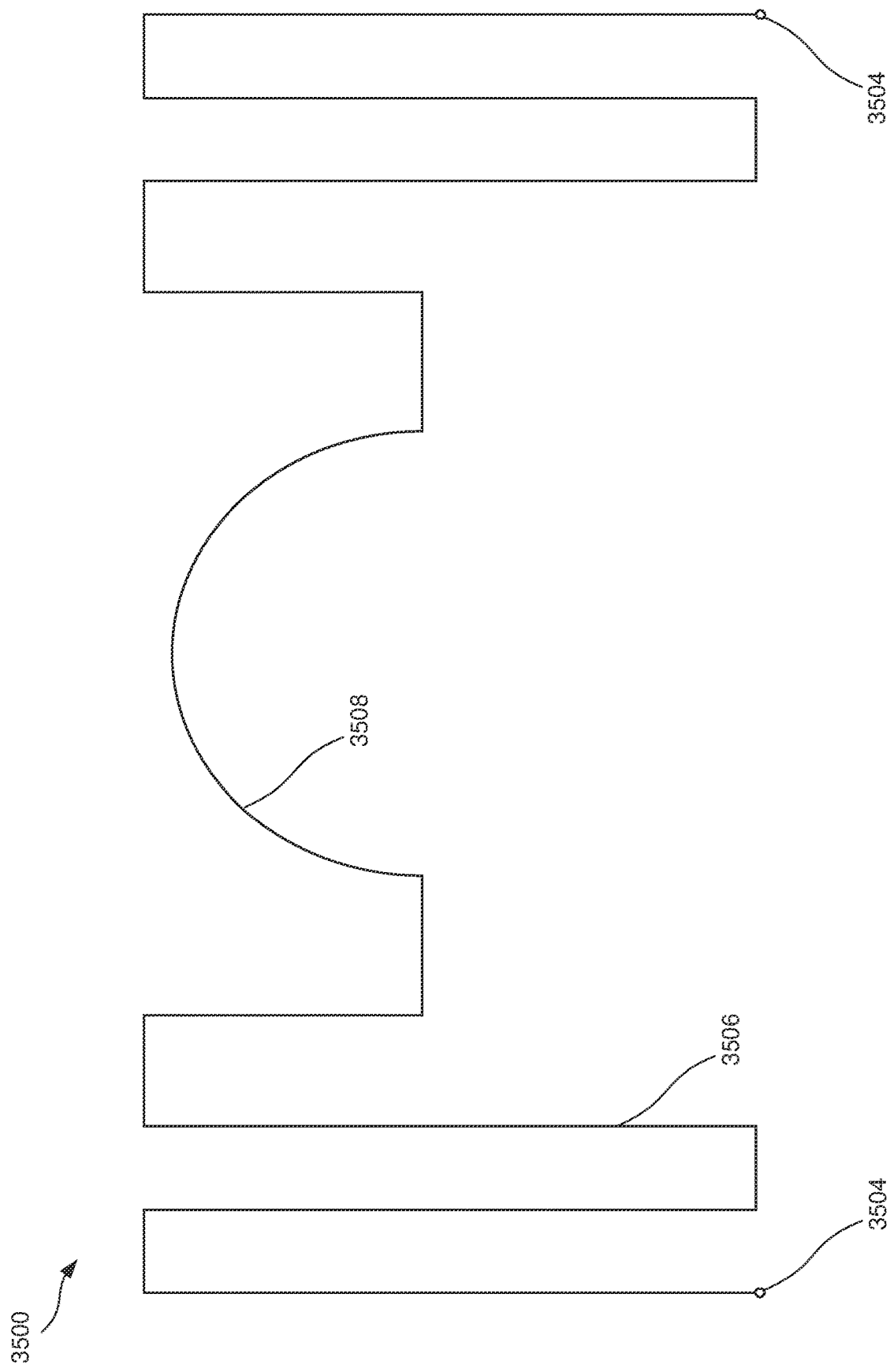
FIG. 35 shows an embodiment of an NFC antenna including a number of jogs on either side of a curved or semicircular length of the NFC antenna.

FIG. 35 shows an embodiment of an NFC antenna 3500 including a number of jogs 3506 on either side of a curved or semicircular length 3508 of the NFC antenna 3500. Similar to FIG. 34, the antenna 3500 may comprise a conductive trace having one or more jogs 3506 and at least one curved or semicircular section 3508, wherein the one or more jogs 3506 are arranged on one or more sides of the at least one curved or semicircular section 3508. This antenna 3500 includes two input/output connections 3404. This illustration shows that even an NFC antenna having other than a coiled topology can also be deployed.

Figure 36:
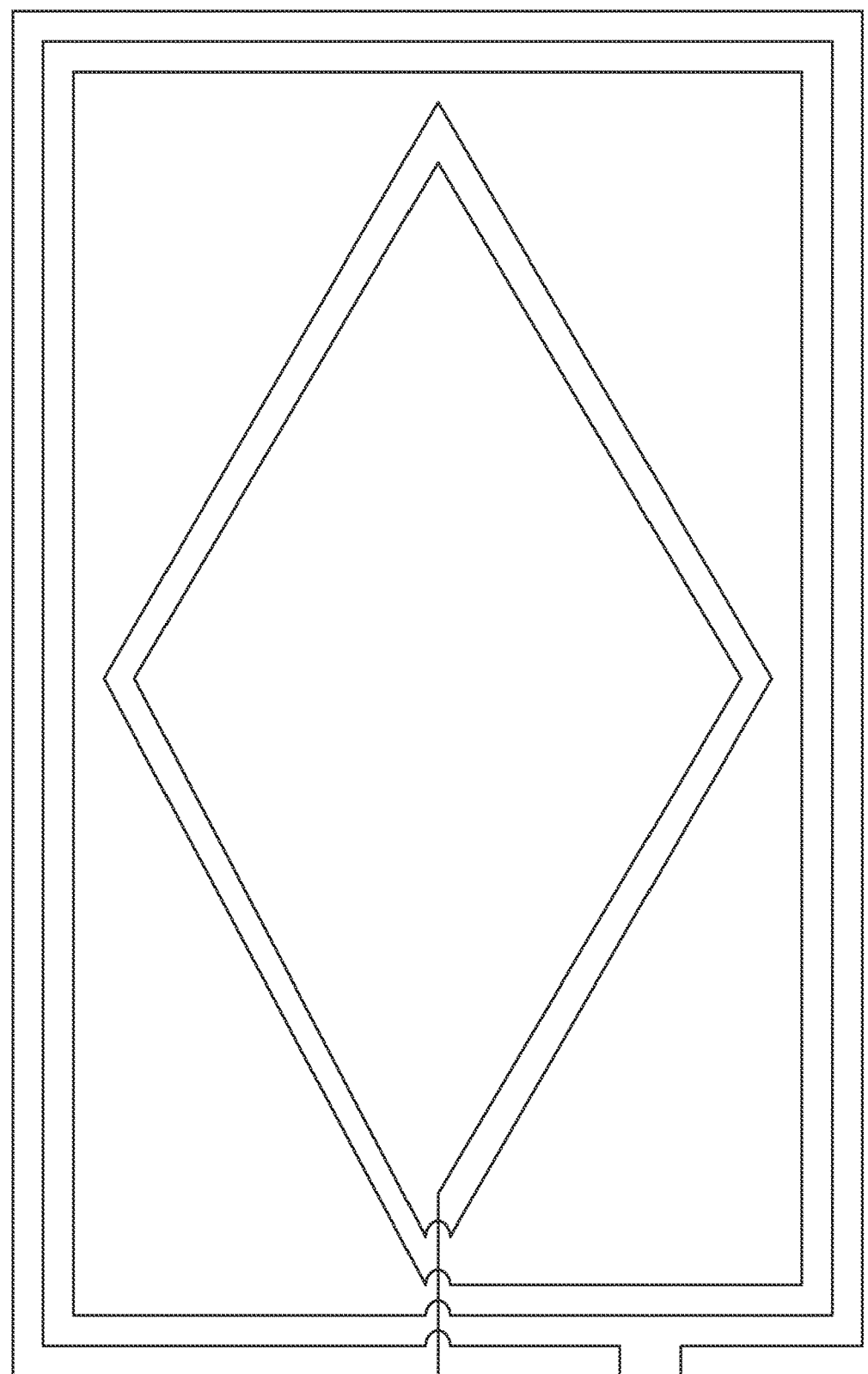
FIG. 36 shows an embodiment of an NFC antenna including two types of coils formed from the same conductor.

FIG. 36 shows an embodiment of an NFC antenna 3600 including two types of coils formed from the same conductor. In other words, the NFC antenna may comprise a conductive trace fabricated on a substrate or dielectric circuit board, similar to the antennas illustrates in FIGS. 34 and 35. In particular, this variation shows a rectangular set of loops or a rectangular coil along with a diamond set of loops. Again, two input/output connections 3604 are also used.

Figure 37:
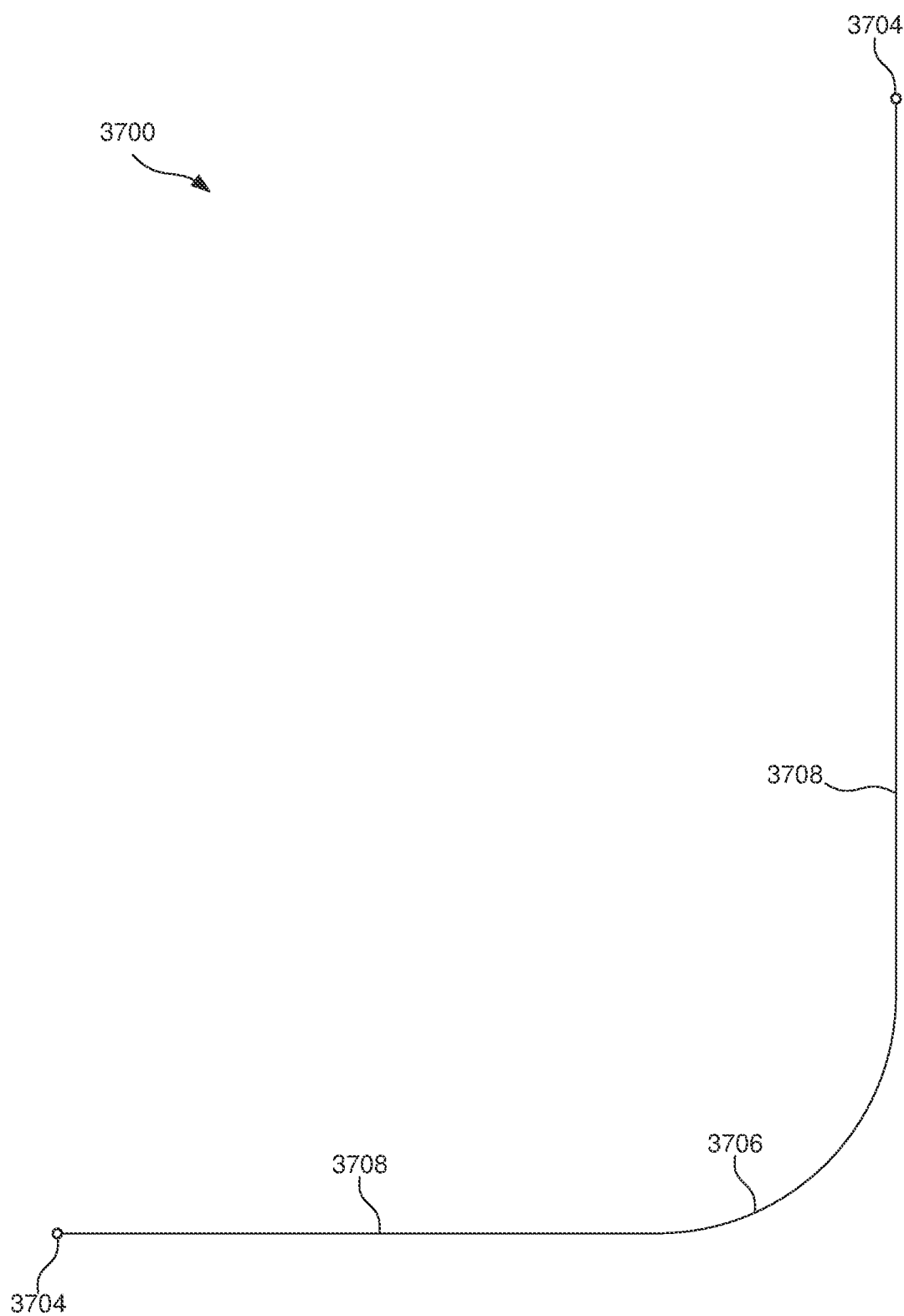
FIG. 37 shows an embodiment of an NFC antenna having two linear sections and a curved section and two input/output connections.

FIG. 37 shows an embodiment of an NFC antenna 3700 comprising a conductive trace fabricated on a substrate or a dielectric circuit board, where the respective conductive trace comprises two linear sections 3708 and a curved section 3706. Further, the NFC antenna 3700 comprises two input/output connections 3704.

Figure 38:
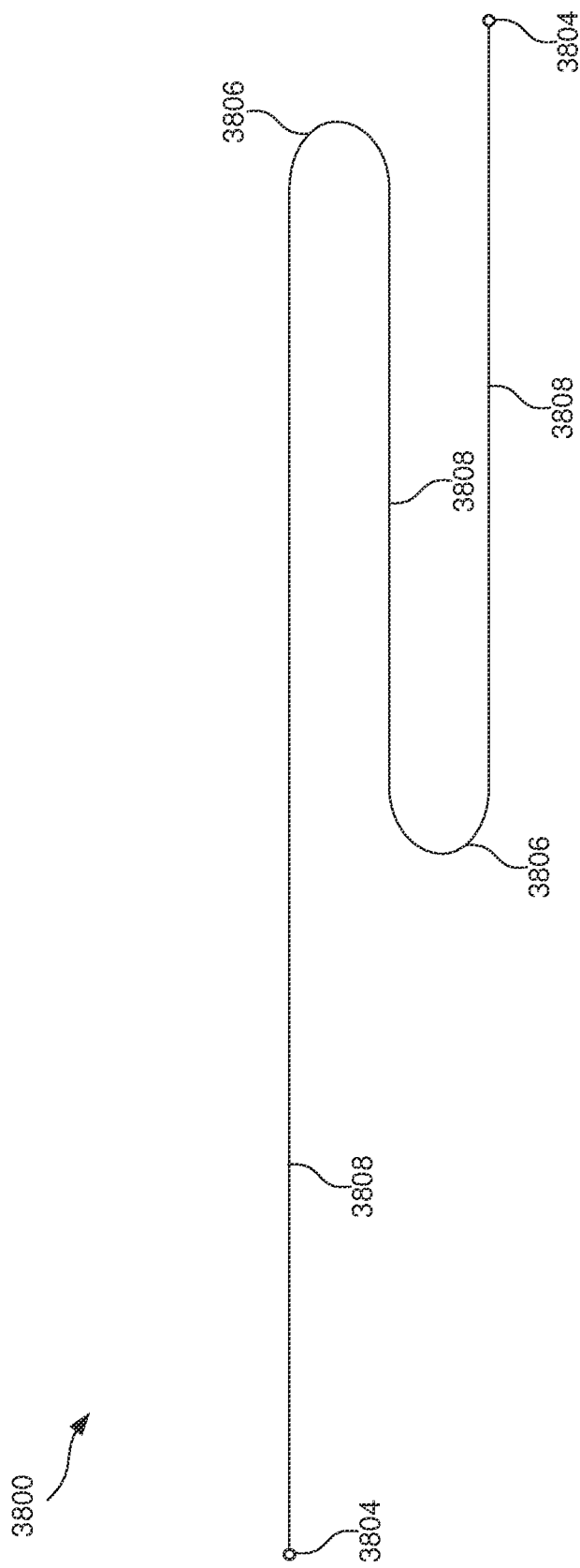
FIG. 38 shows an embodiment of an NFC antenna having three linear sections parallel to each other and two curved section connecting the three linear sections together.

FIG. 38 shows an embodiment of an NFC antenna 3800 comprising a conductive trace fabricated on a substrate or a dielectric circuit board, where the respective conductive trace comprises three linear sections 3808 parallel to each other and two curved section 3806 connecting the three linear sections 3808 together. This NFC antenna 3800 also includes two input/output connections 3804.

Figure 39:
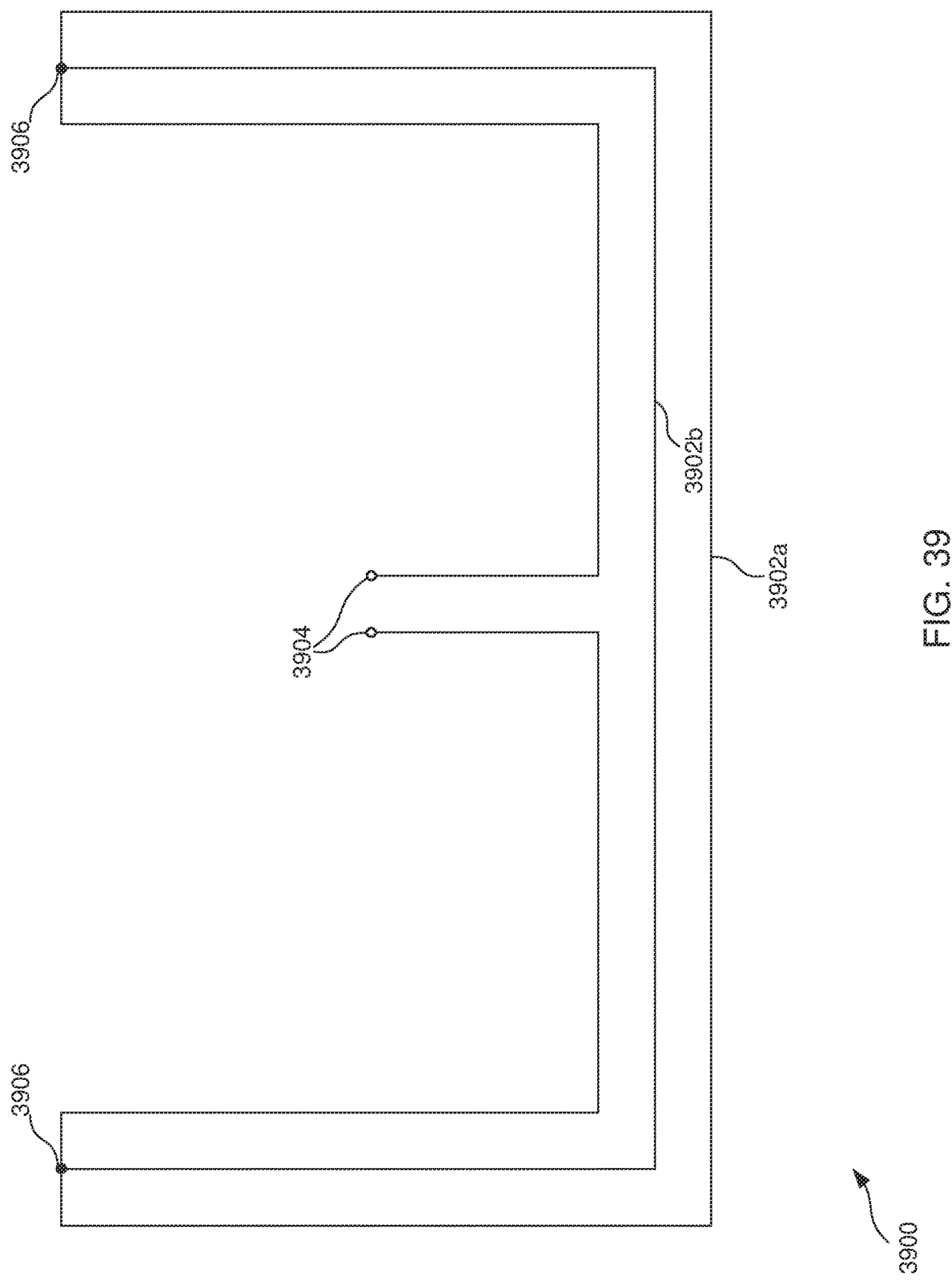
FIG. 39 shows an embodiment of an NFC antenna comprising a loop with a secondary conductor shorting two sides of the loop.

FIG. 39 shows an embodiment of an NFC antenna 3900 comprising a conductive trace fabricated on a substrate or a dielectric circuit board, where the respective conductive trace comprises a loop 3902a with a secondary conductor 3902b shorting two sides of the loop 3902a. This NFC antenna 3900 also includes two input/output connections 3904.

FIG. 40 shows an embodiment of an NFC antenna 4000 comprising a conductive trace fabricated on a substrate or a dielectric circuit board, where the respective conductive trace comprises two independent conductor loops 4002a and 4002b. In this embodiment both the independent conductor loops have a rectangular shape and different dimensions. However, in other embodiments, the two loops could have overlapping sections of conductor. In some embodiments, one of the conductor loops may be configured to send or receive power, while the second conductor loop may be configured to transmit data. Alternatively, both loops 4002a and 4002b may be configured to transmit the same or separate streams of data.

Figure 42:
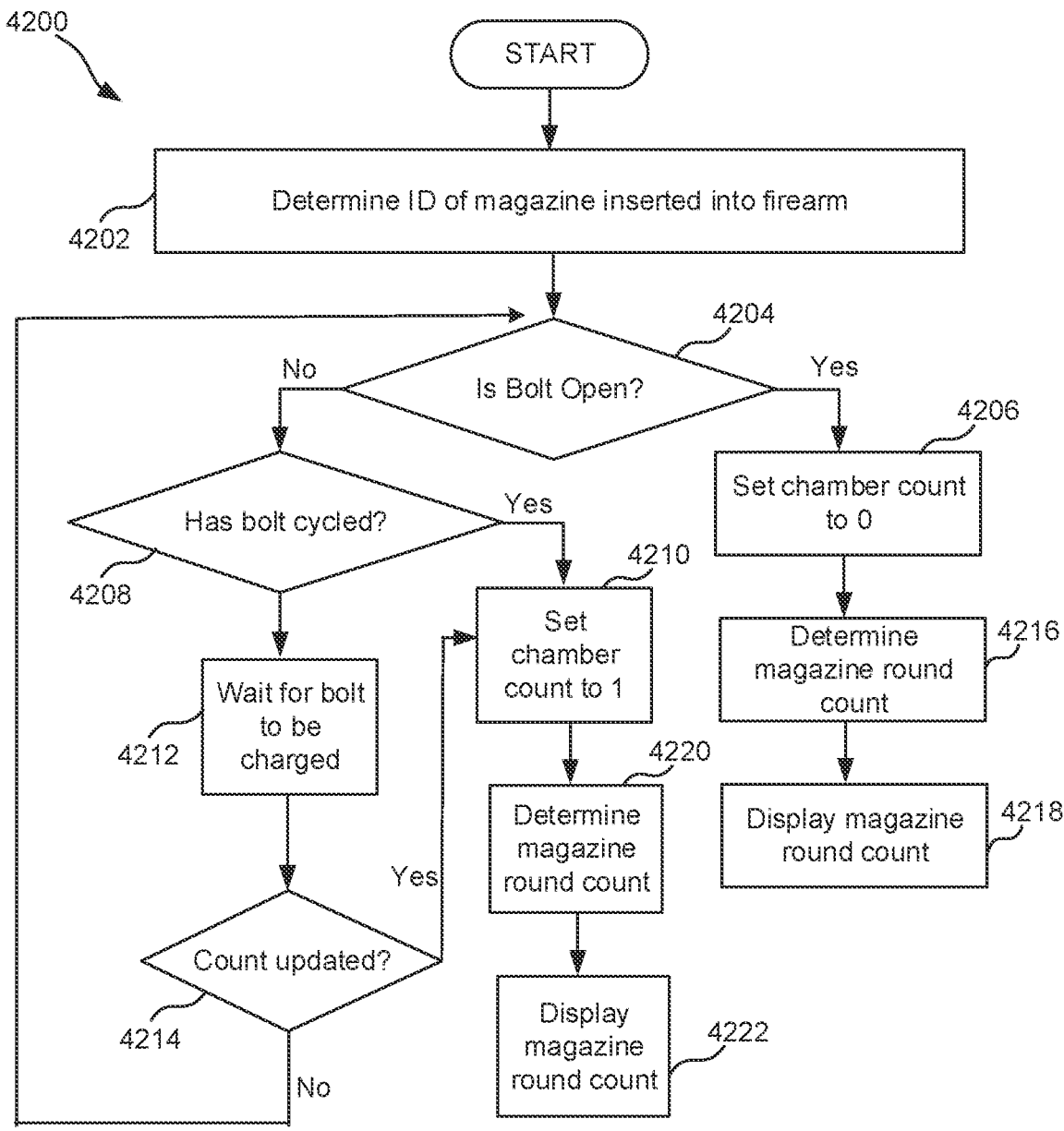
FIG. 42 illustrates a flowchart for a round count display process in accordance with one or more implementations.

FIG. 42 illustrates a flowchart 4200 of an embodiment of a magazine round count display process. The method in flowchart 4200 may be carried out via a processor receiving computer readable instructions from one or more tangible programmable computer readable media. In some cases, the computer readable media may be arranged on the processors or on the same system-on-chip as the processor. The processor may receive data from and provide data and instructions to other portions of the system, such as from the Hall effect switch array. At a minimum, the system includes a processor on or in the magazine for assessing data from the array of Hall effect switches, which may be referred to as a magazine processor. In some cases, the processor can be on the firearm and may be referred to as a firearm processor. At a minimum, the system may also include the array of Hall effect switches and an electrical data connection between the switches and the processor. If on the magazine, the processor can transmit round count data to a wireless interface that spans an air gap between the magazine and the firearm. This may include an NFC interface with two opposing NFC antennas, one arranged on or in the magazine and one on the firearm (e.g., within the magazine well). In some cases, the NFC antenna in the magazine and/or on the firearm may be parallel or substantially parallel to a firing direction of the firearm. In other words, the magazine NFC antenna may be installed along a side of the magazine, rather than the spine. In some embodiments, the firearm side of the NFC interface can then pass the round count to a second processor that is on the firearm. The round count can be used in various ways from this second processor (e.g., sending instructions to a display or sending the round count off firearm).

As previously described, the processor, such as the magazine processor, may be configured to monitor signals from the Hall effect switches in the array to determine a round count in the magazine. These can be analogue signals. Alternatively, the analogue signals may pass through an analogue-to-digital converter, thereby providing a digital signal to the processor. In some embodiments, the processor may be configured to analyze a number of different signal configurations from the Hall effect switches. Furthermore, to reduce a number of switches used, the processor may be configured to determine a round count based on signals from fewer switches (or sensors) than a number of cartridges that can be loaded into the magazine. For instance, N, can be defined as a maximum number of rounds that a magazine can hold. In an embodiment, there can be N/2 switches, and the processor can be configured to determine an accurate round count based on signals from N/2 switches (or sensors). In some other cases, N/3 or N/4 switches may be utilized. In some aspects, reducing the number of switches per round position may serve to reduce the cost and/or complexity of installing the round counting system. It should be noted, however, to implement this cost reduction, the processor may need to determine round positions in the magazine by distinguishing between magnet positions aligned or adjacent to a switch and magnet positions that are between two switches.

In some cases, the process may begin at block 4202 where the processor may determine a unique identifier (or ID) associated with the magazine. In some embodiments, the NFC chip or antenna of the magazine may be associated with a unique identifier. In such cases, the NFC antenna on the firearm or in the magazine well of the firearm may retrieve the unique ID, for instance, upon insertion of the magazine into the magazine well. In some embodiments, the processor (e.g., the firearm processor) may be configured to instruct the firearm display to display a current round count for the magazine. In some embodiments, a user may also view the last recorded round counts for any other magazines previously registered by the firearm and/or inserted into the magazine well of the firearm.

At optional decision block 4204, the processor may proceed to determine whether the bolt (if any) of the firearm is open. In some cases, the firearm may comprise an optical sensor, for instance at or near a buffer tube, for determining whether the bolt is open. In some cases, the firearm processor may be coupled to the optical sensor and may determine whether the bolt is open or closed based on measurements from the optical sensor. Other types of sensors for determining the state of the bolt are contemplated in different embodiments. In some cases, if it is determined at decision block 4204 that the bolt is open, the processor may determine that the chamber of the firearm is empty. In such cases, the processor may set a chamber round counter (i.e., corresponding to whether there is a round in the chamber) to 0 (Block 4206). As shown, after Block 4206, the process may include determining the magazine round count at Block 4216 and displaying the magazine round count on a visual display of the firearm at 4218. In some cases, the determining and displaying may be performed according to the techniques described throughout this disclosure, including at least FIG. 41.

Alternatively, if it is determined at decision block 4204 that the bolt is not open, the processor may determine whether the bolt has cycled at decision block 4208. Alternatively, the processor may determine whether there is a round in the chamber based on readings from the optical sensor or another sensor near the buffer tube. If yes, the processor may set the chamber count to 1 at block 4210. Further, the process may include determining the magazine round count at Block 4220 and displaying the magazine round at 4222 (or transmitting the round count to a display). In some cases, in addition to display the magazine round count, the processor may also be configured to display a total round count (i.e., chamber count and magazine round count). For instance, at Block 4222, the process may include adding one (i.e., the chamber count) to the magazine round count determined at Block 4220 and displaying the result on the visual display of the firearm (or transmitting the round count to a display).

In some cases, if it is determined at decision block 4208 that the bolt has not cycled, the process may include waiting for the bolt to be cycled/charged (block 4212). After the bolt is charged, the process may comprise determining if the round count has been updated at decision block 4214. For instance, the process may include determining if the round count has been reduced by 1 based on a round being loaded into the chamber. If yes, the process may include setting the chamber count 1 at block 4210, determining the magazine round count at 4220, and displaying the round count (e.g., magazine round count and/or total round count including chamber count) at block 4222.

Figure 43:
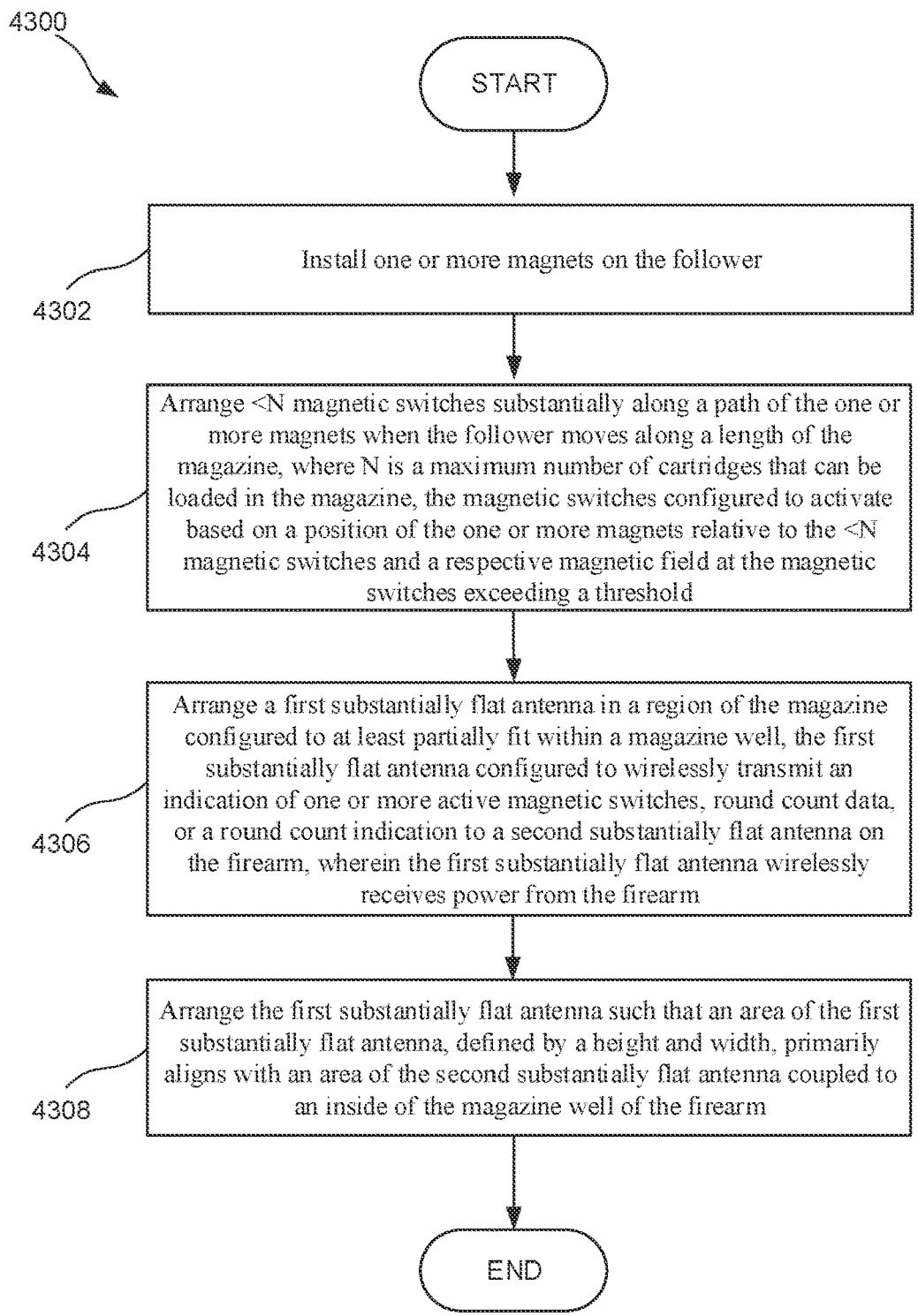
FIG. 43 illustrates a method for retrofitting a magazine with a round counting system in accordance with one or more implementations.

Turning now to FIG. 43, a method 4300 of retrofitting a magazine with a round counting system is now described. In some cases, the magazine may comprise at least an overtravel stop and a follower.

In some embodiments, the method 4300 may comprise installing 4302 one or more magnets on the follower.

Furthermore, the method may include arranging 4304 a plurality of magnetic switches (e.g., <N magnetic switches, such as Hall effect switches) substantially along a path of the one or more magnets when the follower moves along a length of the magazine, where N is a maximum number of cartridges that can be loaded in the magazine. In some embodiments, the magnetic switches may be configured to activate based on a position of the one or more magnets relative to the <N magnetic switches and a respective magnetic field at the magnetic switches exceeding a threshold. In one example, a magnetic switch may output (e.g., a digital or pulsed output) a high signal when the magnetic field detected by the switch exceeds a magnetic field threshold. Conversely, the magnetic switch may output a low signal when the magnetic field detected by the switch is under the magnetic field threshold. In some cases, magnetic-field sensing sensors, such as Hall effect sensors may be utilized in place of magnetic switches.

The method 4300 may also include arranging 4306 a first substantially flat antenna on an inside of the magazine at or above the overtravel stop (or in a region of the magazine that is configured to fit at least partially within a magazine well of the firearm and parallel to a firing direction of the firearm), the first substantially flat antenna configured to wirelessly transmit at least one of an indication of one or more active magnetic switches, round count data, or a round count indication from the magazine to a second substantially flat antenna on the firearm. In some examples, the round count indication may be based on the round count data, where the round count data relates to a follower position within the magazine, and the round count indication relates to a number of rounds remaining in the magazine. In other words, the first substantially flat antenna may either pass raw data (i.e., an indication of active magnetic switches), semi-processed data (i.e., round count data), or fully processed data (i.e., round count indication) to the second substantially flat antenna. In some embodiments, the first substantially flat antenna may pass raw data or semi-processed data based on an absence of a magazine processor or limited computational capabilities of the magazine processor, respectively. In other cases, the second substantially flat antenna may directly receive a final round count indication that can be displayed on the firearm display with minimal processing needed on the firearm side. In some examples, the second substantially flat antenna may transmit power in the reverse direction (i.e., to the data flow) to the first substantially flat antenna, for instance, from a power source located on the firearm (e.g., firearm grip or stock). In this way, the magnetic processing circuitry and sensors or switches in the magazine may receive power without needing a power source in the magazine. As noted above, Hall effect switches may require a power source to operate.

In some embodiments, the method may further include arranging 4308 the first substantially flat antenna such that an area of the first substantially flat antenna, defined by a height and width, primarily aligns with an area of the second substantially flat antenna coupled to an inside of the magazine well of the firearm. Additionally, the first and second substantially flat antennas may be examples of NFC antennas, although other types of RF antennas may be utilized in different embodiments. In some cases, the size and shape of the NFC antennas may be based in part on the data and power requirements of the round counting system. In some embodiments, the first substantially flat antenna (e.g., magazine side antenna) may be of different dimensions (e.g., smaller) than the second substantially flat antenna, which may serve to ease in alignment of the two antennas, since the larger antenna may substantially overlap the smaller antenna even if it is not perfectly aligned with the smaller antenna.

Figure 44:
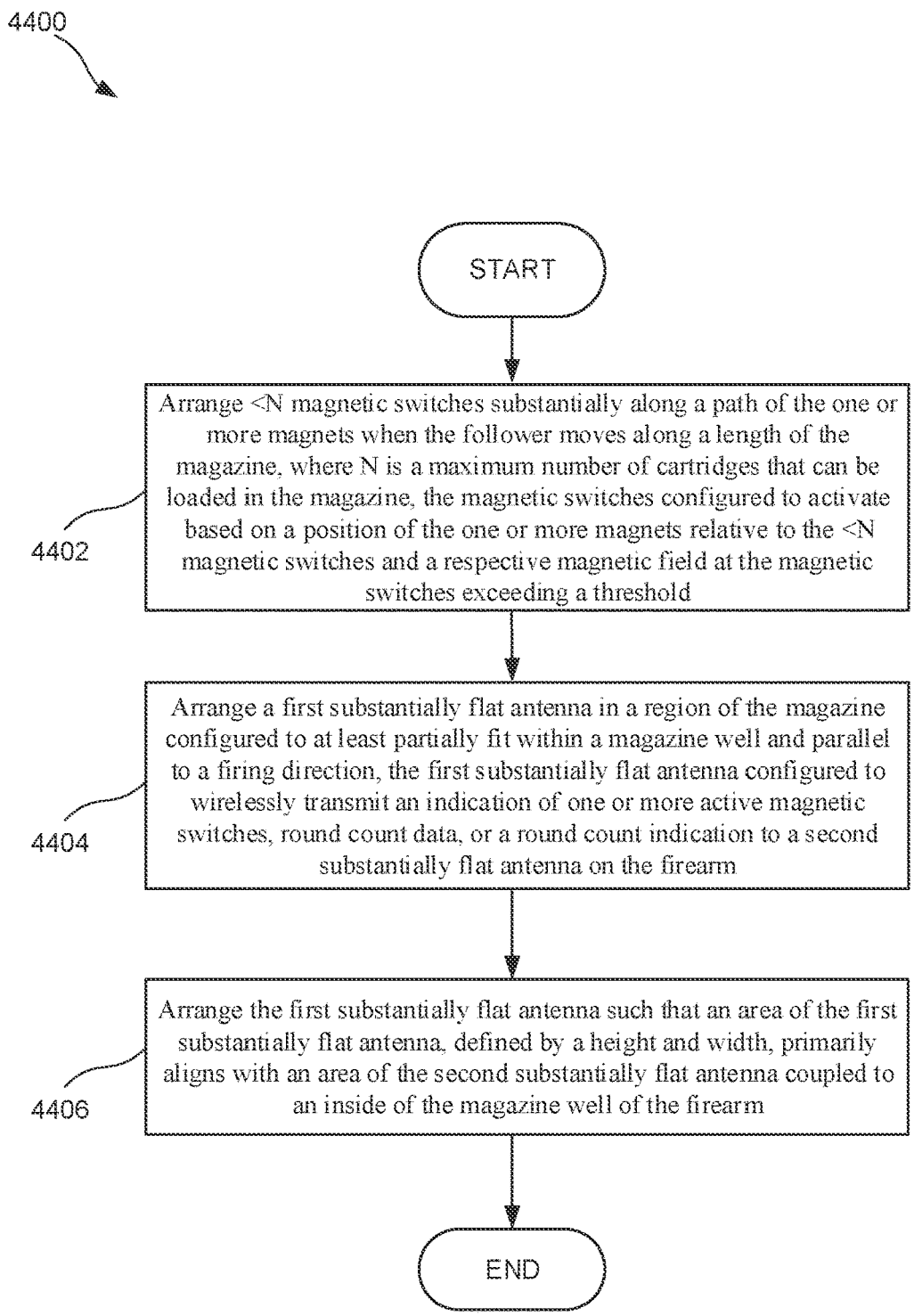
FIG. 44 illustrates a method of manufacturing a magazine with a round counting system in accordance with one or more implementations.

Turning now to FIG. 44, a method 4400 of manufacturing a magazine with a round counting system is now described. In some cases, the magazine may comprise at least an overtravel stop and a follower, where the follower comprises one or more magnets. In some examples, method 4400 implements one or more aspects of the figures described herein.

The method may include arranging 4404 a plurality of magnetic switches (e.g., <N magnetic switches, such as Hall effect switches) substantially along a path of the one or more magnets when the follower moves along a length of the magazine, where N is a maximum number of cartridges that can be loaded in the magazine. In some embodiments, the magnetic switches may be configured to activate based on a position of the one or more magnets relative to the <N magnetic switches and a respective magnetic field at the magnetic switches exceeding a threshold. In one example, a magnetic switch may output (e.g., a digital or pulsed output) a high signal when the magnetic field detected by the switch exceeds a magnetic field threshold. Conversely, the magnetic switch may output a low signal when the magnetic field detected by the switch is under the magnetic field threshold. In some cases, magnetic-field sensing sensors, such as Hall effect sensors may be utilized in place of magnetic switches.

The method 4400 may also include arranging 4404 a first substantially flat antenna on an inside of the magazine at or above the overtravel stop (or in a region of the magazine that is configured to fit at least partially within a magazine well of the firearm and parallel to a firing direction of the firearm), the first substantially flat antenna configured to wirelessly transmit at least one of an indication of one or more active magnetic switches, round count data, or a round count indication from the magazine to a second substantially flat antenna on the firearm. In some examples, the round count indication may be based on the round count data, where the round count data relates to a follower position within the magazine, and the round count indication relates to a number of rounds remaining in the magazine. In other words, the first substantially flat antenna may either pass raw data (i.e., an indication of active magnetic switches), semi-processed data (i.e., round count data), or fully processed data (i.e., round count indication) to the second substantially flat antenna. In some embodiments, the first substantially flat antenna may pass raw data or semi-processed data based on an absence of a magazine processor or limited computational capabilities of the magazine processor, respectively. In other cases, the second substantially flat antenna may directly receive a final round count indication that can be displayed on the firearm display with minimal processing needed on the firearm side. In some examples, the second substantially flat antenna may transmit power in the reverse direction (i.e., to the data flow) to the first substantially flat antenna, for instance, from a power source located on the firearm (e.g., firearm grip). In this way, the magnetic processing circuitry and sensors or switches in the magazine may receive power without needing a power source in the magazine. As noted above, Hall effect switches may require a power source to operate.

Further, the method may include arranging 4406 the first substantially flat antenna such that an area of the first substantially flat antenna, defined by a height and width, primarily aligns with an area of the second substantially flat antenna coupled to an inside of the magazine well of the firearm.

Figure 45:
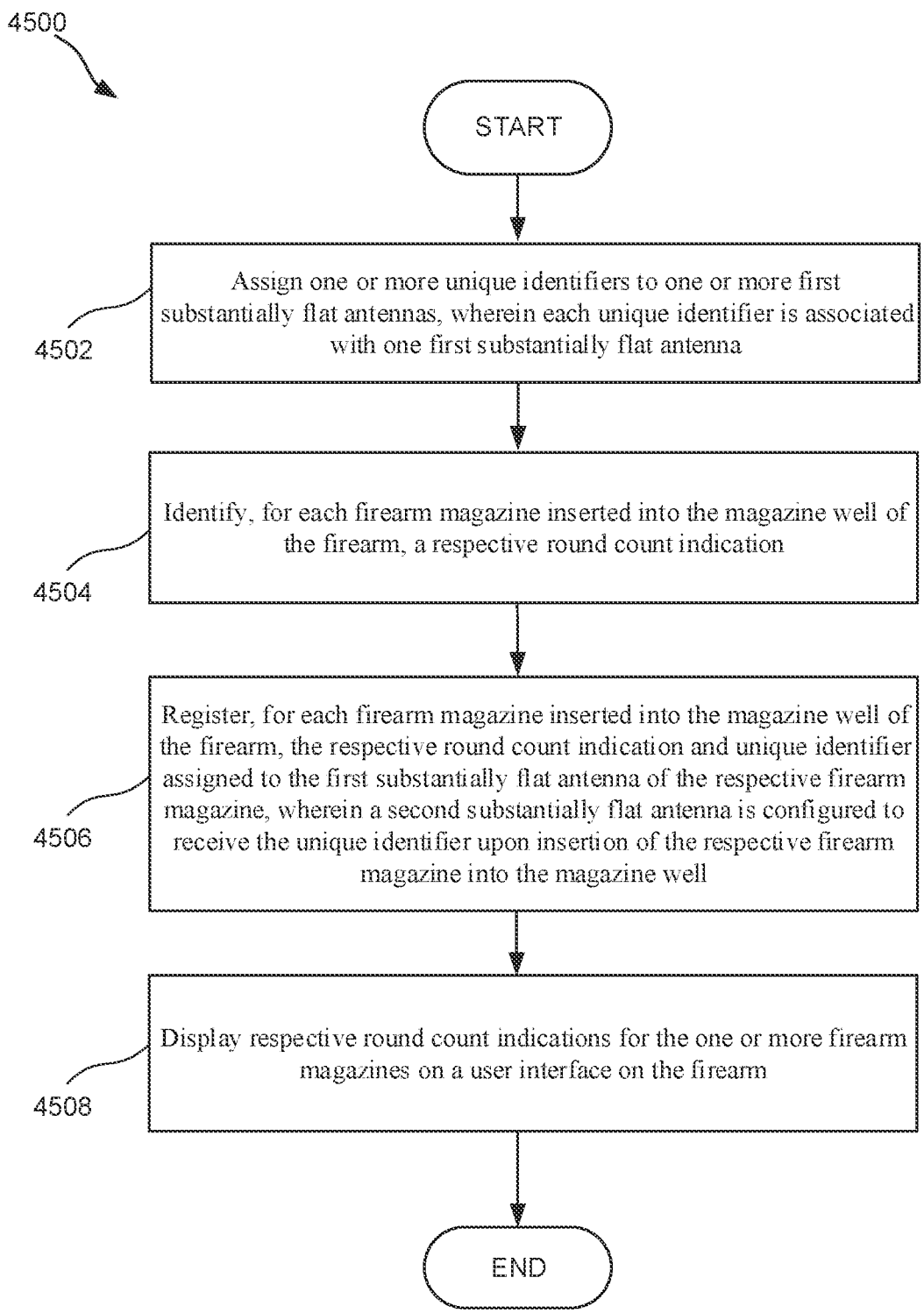
FIG. 45 illustrates a method for detecting and displaying a number of cartridges remaining in one or more firearm magazines in accordance with one or more implementations.

FIG. 45 illustrates a method 4500 for detecting and displaying a number of cartridges remaining in one or more firearm magazines, each firearm magazine comprising: a follower, the follower comprising one or more magnets, magnetic switches arranged substantially along a path of the one or more magnets when the follower moves along a length of the magazine, and wherein the magnetic switches are configured to activate based on a respective magnetic field at the magnetic switches exceeding a threshold. In some embodiments, the magnetic switches may comprise Hall effect switches, although other types of magnetic switches such as Reed switches are contemplated in different embodiments. Alternatively, magnetic-field sensing sensors, such as Hall effect sensors, may be utilized in place of magnetic switches in some embodiments. Method 4500 implements one or more aspects of the figures described herein. Furthermore, method 4500 may be implemented by a non-transitory, tangible computer readable storage medium, encoded with processor readable instructions.

In some examples, the non-transitory, tangible computer readable storage medium, encoded with processor readable instructions (also described in relation to FIG. 11) may be configured to assign 4502 one or more unique identifiers to one or more first substantially flat antennas, wherein each unique identifier is associated with one first substantially flat antenna.

The method 4500 may further include identifying 4504, for each firearm magazine inserted into a magazine well of the firearm, a respective round count indication. In some embodiments, the method 4500 may comprise registering 4506, for each firearm magazine inserted into the magazine well of the firearm, the respective round count indication and unique identifier assigned to the first substantially flat antenna of the respective firearm magazine, wherein a second substantially flat antenna is configured to receive the unique identifier upon insertion of the respective firearm magazine into the magazine well. In some embodiments, the first and second substantially flat antennas may be examples of NFC antennas, although other types of RF antennas are also contemplated. As noted above, in some cases, the first substantially flat antenna may be arranged in a region of the magazine configured to at least partially fit within a magazine well of the firearm and/or parallel to a firing direction of the firearm. Additionally, the first substantially flat antenna may be configured to transmit data (e.g., an indication of active magnetic switches, round count data, round count indication) to the second substantially flat antenna and wirelessly receive power from the second substantially flat antenna. In some cases, the second substantially flat antenna may be coupled to a power source or battery in the firearm, where the power source or battery may be located in the stock, at or near the trigger guard, in a grip of the firearm, to name a few non-limiting examples.

In some cases, the registering may include storing the round count indication and unique identifier for each magazine previously inserted into the firearm, as well as the round count indication and unique identifier for a magazine currently in the firearm. In some embodiments, the round count indications and unique identifiers may be stored in memory of the firearm, for instance, internal memory of the firearm processor or another memory device of the firearm in electronic communication with the firearm processor. Additionally, the round count indications and unique identifiers may also be stored to internal memory of the magazine processor, which may allow a user to recall the round count indications for other magazines previously registered to the user even though the user is using a registered magazine in a different firearm.

In some embodiments, the method 4500 may further comprise displaying respective round count indications for the one or more firearm magazines on a user interface on the firearm, wherein the user interface is selected from the group consisting of: a number (or numbers) displayed on a red dot scope or a targeting display, a frequency of a blinking light; a color of one or more lights; a number displayed on a multi-pixel display; a number of LED lights lit up on an LED display; an audible signal; a fuel gauge indicator, or a bar graph indicator. In some cases, the user may be able to filter the round count indications displayed on the user interface based on a type of weapon (e.g., automatic or semi-automatic rifle, pistol, shotgun, sniper rifle, crew-served weapon, to name a few non-limiting examples). This may be applicable where the display is linked to multiple weapons and hence multiple reader antennas/processors. For instance, the display may provide loadout data on all weapons in a squad for a squad leader, or may provide loadout data for multiple weapons being carried by a single solider or law enforcement officer.

Additional Embodiments

Some embodiments of the disclosure may be characterized as a round counting system for a firearm with a detachable magazine, the system comprising: a magazine comprising at least a follower, the follower comprising one or more magnets, and the magazine comprising: <N magnetic-field-sensing sensors arranged substantially along a path of the one or more magnets when the follower moves along a length of the magazine, where N is a maximum number of cartridges that can be loaded in the magazine, the sensors generating round count data based on a position of the one or more magnets relative to the <N magnetic-field-sensing sensors; and a first substantially flat antenna on an inside of the magazine arranged at in a region of the magazine that is configured to fit at least partially within a magazine well of the firearm, the wireless antenna configured to wirelessly transmit a round count indication from the magazine to a substantially flat second wireless antenna on the firearm; and the substantially flat second antenna configured to be affixed to an inside of a magazine well of the firearm and having an area that mostly overlaps with an area of the first substantially flat antenna Other embodiments of the disclosure may also be characterized as a round counting system for a firearm with a detachable magazine, the system comprising: a magazine comprising a follower, the follower comprising one or more magnets, and the magazine comprising: Hall effect switches arranged substantially along a path of the one or more magnets, where N is a maximum number of cartridges that can be loaded in the magazine, the Hall effect switches each generating a high or low signal based on a position of the one or more magnets relative to each of the Hall effect switches; and a magazine processor coupled to each of the Hall effect switches and configured to convert the high or low signal from each of the Hall effect switches into a single round count indication for the magazine; a magazine antenna on an inside of the magazine arranged in a region of the magazine that is configured to fit at least partially within a magazine well of the firearm, the magazine antenna configured to wirelessly transmit the round count indication from the magazine to a magazine well antenna on the firearm; and the magazine well antenna configured to be affixed to an inside of a magazine well of the firearm and having an area, a majority of which, overlaps with an area of the magazine antenna.

Other embodiments of the disclosure can be characterized as a method of manufacturing a magazine with a round counting system, the magazine comprising a follower, wherein the follower comprises one or more magnets, the method comprising arranging <N magnetic-field-sensing sensors substantially along a path of the one or more magnets when the follower moves along a length of the magazine, where N is a maximum number of cartridges that can be loaded in the magazine, the sensors generating round count data based on a position of the one or more magnets relative to the <N magnetic-field-sensing sensors; and arranging a first substantially flat antenna on an inside of the magazine in a region of the magazine that is configured to fit at least partially within a magazine well of the firearm, the first substantially flat antenna configured to wirelessly transmit a round count indication from the magazine to a substantially flat second wireless antenna on the firearm, the round count indication based on the round count data, wherein the first substantially flat antenna is arranged such that an area of the first substantially flat antenna, defined by a height and width, primarily aligns with an area of a second substantially flat antenna coupled to an inside of a magazine well of the firearm.

Other embodiments of the disclosure can be characterized as a method of installing a round counting system on a firearm, the method comprising installing a detachable magazine comprising a follower, the follower comprising one or more magnets, and the magazine comprising: <N magnetic-field-sensing sensors arranged substantially along a path of the one or more magnets when the follower moves along a length of the magazine, where N is a maximum number of cartridges that can be loaded in the magazine, the sensors generating round count data based on a position of the one or more magnets relative to the <N magnetic-field-sensing sensors; and a first substantially flat antenna on an inside of the magazine arranged in a region of the magazine that is configured to fit at least partially within a magazine well of the firearm; and installing a second substantially flat antenna on an inside of a magazine well of the firearm such that an area of the first substantially flat antenna and an area of the second substantially flat antenna are mostly aligned, the first and second substantially flat antennas configured to exchange a round count indication based on the round count data as well as power via a near-field-communication connection.

Other embodiments of the disclosure can be characterized as a non-transitory, tangible computer readable storage medium, encoded with processor readable instructions to perform a method for detecting and displaying a number of cartridges remaining in a firearm magazine, the firearm magazine comprising a follower, and the follower comprising one or more magnets, the method comprising: arranging <N magnetic-field-sensing sensors substantially along a path of the one or more magnets when the follower moves along a length of the firearm magazine, where N is a maximum number of cartridges that can be loaded in the firearm magazine, the sensors generating round count data based on a position of the one or more magnets relative to the <N magnetic-field-sensing sensors; arranging a first substantially flat antenna on an inside of the firearm magazine in a region of the magazine that is configured to fit at least partially within a magazine well of the firearm, the first substantially flat antenna configured to exchange a round count indication based on the round count data as well as power via a near-field communication connection with a second substantially flat antenna coupled to an inside of a magazine well of the firearm, wherein the first substantially flat antenna is arranged such that an area of the first substantially flat antenna, defined by a height and width, primarily aligns with an area of the second substantially flat antenna coupled to the inside of the magazine well of the firearm.

In some embodiments, the magazine can include a display indicating the round count. This display could be powered via power from the firearm as passed to the magazine via the NFC interface. When the magazine is removed from the firearm, the display can enter a static mode that does not consume energy (e.g., LCD). Alternatively, such a magazine display could be powered via a battery on the magazine.

While this disclosure has discuss particular locations of the magnet on the follower, typically to orient the magnet as close to the Hall effect switches as possible, in some embodiments, the magnet could be arranged on other portions of the follower.

Embodiments herein have discussed a magnet and a distance between magnet and Hall effect switches, that allows one or two switches to be engaged or surpass a switching threshold at a time. However, in some embodiments, a stronger magnet, or multiple magnets could be used, and in these cases three or more switches may be engaged when the follower is in particular positions, which could lead to more reliable follower position sensing and/or could lead to the ability to use fewer than N/2 switches.

Some portions of this disclosure are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A round counting system for a firearm, the system comprising:
 a magazine, a follower, the follower comprising one or more magnets, and the magazine comprising:

magnetic switches arranged substantially along a path of the one or more magnets when the follower moves along a length of the magazine, the magnetic switches configured to activate based on a position of the one or more magnets relative to the magnetic switches and a respective magnetic field at the magnetic switches exceeding a threshold;

a first antenna arranged on or within the magazine, the first antenna configured to fit within an inner perimeter of a magazine well of the firearm and parallel to a firing direction of the firearm when the magazine is inserted into the magazine well, the first antenna configured to wirelessly transmit at least one of an indication of one or more active magnetic switches of the magnetic switches, round count data, or a round count indication to a second antenna within the inner perimeter of the magazine well of the firearm, wherein the first antenna wirelessly receives power from the firearm, and wherein the power from the firearm is used to power the magnetic switches; and the second antenna having an area that mostly overlaps with an area of the first antenna.

2. The system of claim 1, further comprising a firearm processor configured to correlate signals from two adjacent magnetic switches exceeding the magnetic field threshold as a follower position between those two switches and correlate a signal from a single magnetic switch exceeding the magnetic field threshold as a follower position aligned with that single switch.

3. The system of claim 1, wherein the second antenna is within a depression in the magazine well.

4. The system of claim 1, wherein the magazine comprises <N of the magnetic switches, wherein N is a maximum number of rounds that can be loaded in the magazine.

5. The system of claim 1, wherein the first antenna is associated with a unique identifier, and wherein the second antenna is configured to receive the unique identifier upon insertion of the magazine into the magazine well of the firearm.

6. The system of claim 5, further comprising a firearm processor configured for coupling to the firearm and in electrical communication with the second antenna, the firearm processor including a tangible computer readable medium encoded with computer readable instructions, and wherein the firearm processor is configured to store the round count indication and the unique identifier associated with the first antenna and another round count indication and another unique identifier associated with another antenna of another magazine previously inserted into the magazine well of the firearm.

7. The system of claim 1, wherein the first antenna is within a depression of the magazine.

8. The system of claim 1, wherein the first antenna is arranged underneath a skin of the magazine or overmolded by a material used to form the magazine.

9. The system of claim 1, wherein the first antenna comprises a first independent conductor loop and a second independent conductor loop, the second independent conductor loop having different dimensions than the first independent conductor loop, and wherein the first independent conductor loop is configured to receive the power from the firearm via the second antenna and the second independent conductor loop is configured to transmit the round count data to the second antenna.

10. The system of claim 1, wherein the first antenna and the second antenna are substantially flat.

11. The system of claim 1, wherein the magazine is further configured to:
correlate signals from two adjacent magnetic switches exceeding the magnetic field threshold as a follower position between those two switches, and
correlate a signal from a single magnetic switch exceeding the magnetic field threshold as a follower position aligned with that single switch, such that the magazine comprises <N of the magnetic switches, wherein N is a maximum number of rounds that can be loaded in the magazine.

12. The system of claim 1, wherein the magazine comprises N/2 of the magnetic switches, wherein N is a maximum number of rounds that can be loaded in the magazine.

13. The system of claim 1, wherein the first antenna is further configured to send the round count indication from the first antenna to the second antenna, and the second antenna is further configured to send the power from the second antenna to the first antenna.

14. The system of claim 13, wherein the first antenna and the second antenna are configured to simultaneously send the round count data from the first antenna to the second antenna, and the power from the second antenna to the first antenna.

15. The system of claim 1, wherein the second antenna is disposed on a flexible substrate that fits within a depression of the magazine well.

16. The system of claim 1, wherein the first antenna is installed along a side of the magazine.

17. The system of claim 16, wherein the second antenna is installed along a side of the magazine well.

18. The system of claim 17, wherein the first antenna and the second antenna are flat.

19. The system of claim 18, wherein, with the magazine inserted into the magazine well, the first antenna and the second antenna overlap one another.

20. The system of claim 19, wherein the first antenna and the second antenna align along a plane that is parallel to the firing direction of the firearm.

* * * * *